United States Patent
Raleigh et al.

(10) Patent No.: US 11,563,592 B2
(45) Date of Patent: Jan. 24, 2023

(54) MANAGING SERVICE USER DISCOVERY AND SERVICE LAUNCH OBJECT PLACEMENT ON A DEVICE

(71) Applicant: Headwater Research LLC, Tyler, TX (US)

(72) Inventors: Gregory G. Raleigh, Woodside, CA (US); Jeffrey Green, Sunnyvale, CA (US); Jose Tellado, Mountain View, CA (US)

(73) Assignee: HEADWATER RESEARCH LLC, Tyler, TX (US)

( * ) Notice: Subject to any disclaimer, the term of this patent is extended or adjusted under 35 U.S.C. 154(b) by 105 days.

(21) Appl. No.: 16/927,424

(22) Filed: Jul. 13, 2020

(65) Prior Publication Data

US 2021/0105145 A1    Apr. 8, 2021

Related U.S. Application Data

(63) Continuation of application No. 15/681,730, filed on Aug. 21, 2017, now Pat. No. 10,715,342, which is a continuation of application No. 13/441,821, filed on Apr. 6, 2012, now Pat. No. 9,755,842, and a continuation-in-part of application No. 12/380,780, filed on Mar. 2, 2009, now Pat. No. 8,839,388, and a continuation-in-part of application No. 12/380,778, filed on Mar. 2, 2009, now Pat. No. 8,321,526.

(Continued)

(51) Int. Cl.
*H04L 12/14* (2006.01)
*H04M 15/00* (2006.01)
(Continued)

(52) U.S. Cl.
CPC .......... *H04L 12/14* (2013.01); *H04L 41/0806* (2013.01); *H04L 41/0893* (2013.01);
(Continued)

(58) Field of Classification Search
CPC .......... H04W 4/24; H04W 4/50; H04W 4/60; H04M 15/8022; H04M 15/80;
(Continued)

(56) References Cited

U.S. PATENT DOCUMENTS 5,131,020 A    7/1992  Liebesny et al.
5,283,904 A    2/1994  Carson et al.
(Continued)

FOREIGN PATENT DOCUMENTS

CA    2688553 A1    12/2008
CN    1310401 A     8/2001
(Continued)

*Primary Examiner* — Andrew Joseph Rudy
(74) *Attorney, Agent, or Firm* — Farjami & Farjami LLP

(57) ABSTRACT

Methods and apparatuses to manage service user discovery and service launch object placement on a device. A method comprising: obtaining information to assist in identifying a portion of a user interface of a wireless device, the wireless device communicatively coupled to a network system over a wireless access network; determining a differentiating attribute of the identified portion of the user interface; obtaining one or more service launch objects for placement in the identified portion of the user interface; and sending configuration information to the wireless device over the wireless access network to assist the wireless device in placing the one or more service launch objects in the identified portion of the user interface.

20 Claims, 18 Drawing Sheets

Related U.S. Application Data

(60) Provisional application No. 61/472,606, filed on Apr. 6, 2011, provisional application No. 61/550,906, filed on Oct. 24, 2011, provisional application No. 61/589,830, filed on Jan. 23, 2012, provisional application No. 61/610,876, filed on Mar. 14, 2012, provisional application No. 61/610,910, filed on Mar. 14, 2012, provisional application No. 61/206,354, filed on Jan. 28, 2009, provisional application No. 61/206,944, filed on Feb. 4, 2009, provisional application No. 61/207,393, filed on Feb. 10, 2009, provisional application No. 61/207,739, filed on Feb. 13, 2009.

(51) Int. Cl.
| | | |
|---|---|---|
| *H04L 41/0893* | (2022.01) | |
| *H04W 4/24* | (2018.01) | |
| *H04W 4/50* | (2018.01) | |
| *H04W 4/60* | (2018.01) | |
| *H04L 41/5054* | (2022.01) | |
| *H04L 41/0806* | (2022.01) | |
| *H04L 41/5025* | (2022.01) | |
| *H04L 41/5003* | (2022.01) | |

(52) U.S. Cl.
CPC ........ *H04L 41/5054* (2013.01); *H04M 15/00* (2013.01); *H04M 15/51* (2013.01); *H04M 15/58* (2013.01); *H04M 15/80* (2013.01); *H04M 15/8022* (2013.01); *H04M 15/8033* (2013.01); *H04M 15/8083* (2013.01); *H04M 15/8094* (2013.01); *H04W 4/24* (2013.01); *H04W 4/50* (2018.02); *H04W 4/60* (2018.02); *H04L 41/5003* (2013.01); *H04L 41/5025* (2013.01)

(58) Field of Classification Search
CPC .... H04M 5/8094; H04M 15/00; H04M 15/51; H04M 15/8033; H04M 15/58; H04M 15/8083; H04L 41/0893; H04L 41/5003; H04L 12/14; H04L 41/5054; H04L 41/0806; H04L 41/5025; H04L 12/24
USPC .......................................................... 705/16
See application file for complete search history.

(56) References Cited

U.S. PATENT DOCUMENTS

| | | |
|---|---|---|
| 5,325,532 A | 6/1994 | Crosswy et al. |
| 5,572,528 A | 11/1996 | Shuen |
| 5,577,100 A | 11/1996 | McGregor et al. |
| 5,594,777 A | 1/1997 | Makkonen et al. |
| 5,617,539 A | 4/1997 | Ludwig et al. |
| 5,630,159 A | 5/1997 | Zancho |
| 5,633,484 A | 5/1997 | Zancho et al. |
| 5,633,868 A | 5/1997 | Baldwin et al. |
| 5,754,953 A | 5/1998 | Briancon et al. |
| 5,774,532 A | 6/1998 | Gottlieb et al. |
| 5,794,142 A | 8/1998 | Vanttila et al. |
| 5,814,798 A | 9/1998 | Zancho |
| 5,889,477 A | 3/1999 | Fastenrath |
| 5,892,900 A | 4/1999 | Ginter et al. |
| 5,903,845 A | 5/1999 | Buhrmann et al. |
| 5,915,008 A | 6/1999 | Dulman |
| 5,915,226 A | 6/1999 | Martineau |
| 5,933,778 A | 8/1999 | Buhrmann et al. |
| 5,940,472 A | 8/1999 | Newman et al. |
| 5,974,439 A | 10/1999 | Bollella |
| 5,983,270 A | 11/1999 | Abraham et al. |
| 6,035,281 A | 3/2000 | Crosskey et al. |
| 6,038,452 A | 3/2000 | Strawczynski et al. |
| 6,038,540 A | 3/2000 | Krist et al. |
| 6,047,268 A | 4/2000 | Bartoli et al. |
| 6,058,434 A | 5/2000 | Wilt et al. |
| 6,061,571 A | 5/2000 | Tamura |
| 6,064,878 A | 5/2000 | Denker et al. |
| 6,078,953 A | 6/2000 | Vaid et al. |
| 6,081,591 A | 6/2000 | Skoog |
| 6,098,878 A | 8/2000 | Dent et al. |
| 6,104,700 A | 8/2000 | Haddock et al. |
| 6,115,823 A | 9/2000 | Velasco et al. |
| 6,119,933 A | 9/2000 | Wong et al. |
| 6,125,391 A | 9/2000 | Meltzer et al. |
| 6,141,565 A | 10/2000 | Feuerstein et al. |
| 6,141,686 A | 10/2000 | Jackowski et al. |
| 6,148,336 A | 11/2000 | Thomas et al. |
| 6,154,738 A | 11/2000 | Call |
| 6,157,636 A | 12/2000 | Voit et al. |
| 6,185,576 B1 | 2/2001 | Mcintosh |
| 6,198,915 B1 | 3/2001 | McGregor et al. |
| 6,219,786 B1 | 4/2001 | Cunningham et al. |
| 6,226,277 B1 | 5/2001 | Chuah |
| 6,246,870 B1 | 6/2001 | Dent et al. |
| 6,263,055 B1 | 7/2001 | Garland et al. |
| 6,292,828 B1 | 9/2001 | Williams |
| 6,317,584 B1 | 11/2001 | Abu-Amara et al. |
| 6,370,139 B2 | 4/2002 | Redmond |
| 6,381,316 B2 | 4/2002 | Joyce et al. |
| 6,393,014 B1 | 5/2002 | Daly et al. |
| 6,397,259 B1 | 5/2002 | Lincke et al. |
| 6,401,113 B2 | 6/2002 | Lazaridis et al. |
| 6,418,147 B1 | 7/2002 | Wiedeman |
| 6,438,575 B1 | 8/2002 | Khan et al. |
| 6,445,777 B1 | 9/2002 | Clark |
| 6,449,479 B1 | 9/2002 | Sanchez |
| 6,466,984 B1 | 10/2002 | Naveh et al. |
| 6,477,670 B1 | 11/2002 | Ahmadvand |
| 6,502,131 B1 | 12/2002 | Vaid et al. |
| 6,505,114 B2 | 1/2003 | Luciani |
| 6,510,152 B1 | 1/2003 | Gerszberg et al. |
| 6,522,629 B1 | 2/2003 | Anderson, Sr. |
| 6,532,235 B1 | 3/2003 | Benson et al. |
| 6,532,579 B2 | 3/2003 | Sato et al. |
| 6,535,855 B1 | 3/2003 | Cahill et al. |
| 6,535,949 B1 | 3/2003 | Parker |
| 6,539,082 B1 | 3/2003 | Lowe et al. |
| 6,542,500 B1 | 4/2003 | Gerszberg et al. |
| 6,542,992 B1 | 4/2003 | Peirce et al. |
| 6,546,016 B1 | 4/2003 | Gerszberg et al. |
| 6,563,806 B1 | 5/2003 | Yano et al. |
| 6,570,974 B1 | 5/2003 | Gerszberg et al. |
| 6,574,321 B1 | 6/2003 | Cox et al. |
| 6,574,465 B2 | 6/2003 | Marsh et al. |
| 6,578,076 B1 | 6/2003 | Putzolu |
| 6,581,092 B1 | 6/2003 | Motoyama |
| 6,591,098 B1 | 7/2003 | Shieh et al. |
| 6,598,034 B1 | 7/2003 | Kloth |
| 6,601,040 B1 | 7/2003 | Kolls |
| 6,603,969 B1 | 8/2003 | Vuoristo et al. |
| 6,603,975 B1 | 8/2003 | Inouchi et al. |
| 6,606,744 B1 | 8/2003 | Mikurak |
| 6,628,934 B2 | 9/2003 | Rosenberg et al. |
| 6,631,122 B1 | 10/2003 | Arunachalam et al. |
| 6,636,721 B2 | 10/2003 | Threadgill et al. |
| 6,639,975 B1 | 10/2003 | O'Neal et al. |
| 6,640,097 B2 | 10/2003 | Corrigan et al. |
| 6,640,334 B1 | 10/2003 | Rasmussen |
| 6,650,887 B2 | 11/2003 | McGregor et al. |
| 6,651,101 B1 | 11/2003 | Gai et al. |
| 6,654,786 B1 | 11/2003 | Fox et al. |
| 6,654,814 B1 | 11/2003 | Britton et al. |
| 6,658,254 B1 | 12/2003 | Purdy et al. |
| 6,662,014 B1 | 12/2003 | Walsh |
| 6,678,516 B2 | 1/2004 | Nordman et al. |
| 6,683,853 B1 | 1/2004 | Kannas et al. |
| 6,684,244 B1 | 1/2004 | Goldman et al. |
| 6,690,918 B2 | 2/2004 | Evans et al. |
| 6,697,821 B2 | 2/2004 | Ziff et al. |
| 6,725,031 B2 | 4/2004 | Watler et al. |
| 6,725,256 B1 | 4/2004 | Albal et al. |

(56) References Cited

U.S. PATENT DOCUMENTS

| | | |
|---|---|---|
| 6,732,176 B1 | 5/2004 | Stewart et al. |
| 6,735,206 B1 | 5/2004 | Oki et al. |
| 6,748,195 B1 | 6/2004 | Phillips |
| 6,748,437 B1 | 6/2004 | Mankude et al. |
| 6,751,296 B1 | 6/2004 | Albal et al. |
| 6,754,470 B2 | 6/2004 | Hendrickson et al. |
| 6,757,717 B1 | 6/2004 | Goldstein |
| 6,760,417 B1 | 7/2004 | Wallenius |
| 6,763,000 B1 | 7/2004 | Walsh |
| 6,763,226 B1 | 7/2004 | McZeal, Jr. |
| 6,765,864 B1 | 7/2004 | Natarajan et al. |
| 6,765,925 B1 | 7/2004 | Sawyer et al. |
| 6,782,412 B2 | 8/2004 | Brophy et al. |
| 6,785,889 B1 | 8/2004 | Williams |
| 6,792,461 B1 | 9/2004 | Hericourt |
| 6,829,596 B1 | 12/2004 | Frazee |
| 6,829,696 B1 | 12/2004 | Balmer et al. |
| 6,839,340 B1 | 1/2005 | Voit et al. |
| 6,842,628 B1 | 1/2005 | Arnold et al. |
| 6,873,988 B2 | 3/2005 | Herrmann et al. |
| 6,876,653 B2 | 4/2005 | Ambe et al. |
| 6,879,825 B1 | 4/2005 | Daly |
| 6,882,718 B1 | 4/2005 | Smith |
| 6,885,997 B1 | 4/2005 | Roberts |
| 6,901,440 B1 | 5/2005 | Bimm et al. |
| 6,920,455 B1 | 7/2005 | Weschler |
| 6,922,562 B2 | 7/2005 | Ward et al. |
| 6,928,280 B1 | 8/2005 | Xanthos et al. |
| 6,934,249 B1 | 8/2005 | Bertin et al. |
| 6,934,751 B2 | 8/2005 | Jayapalan et al. |
| 6,947,723 B1 | 9/2005 | Gumani et al. |
| 6,947,985 B2 | 9/2005 | Hegli et al. |
| 6,952,428 B1 | 10/2005 | Necka et al. |
| 6,957,067 B1 | 10/2005 | Iyer et al. |
| 6,959,202 B2 | 10/2005 | Heinonen et al. |
| 6,959,393 B2 | 10/2005 | Hollis et al. |
| 6,965,667 B2 | 11/2005 | Trabandt et al. |
| 6,965,872 B1 | 11/2005 | Grdina |
| 6,967,958 B2 | 11/2005 | Ono et al. |
| 6,970,692 B2 | 11/2005 | Tysor |
| 6,970,927 B1 | 11/2005 | Stewart et al. |
| 6,982,733 B1 | 1/2006 | McNally et al. |
| 6,983,370 B2 | 1/2006 | Eaton et al. |
| 6,996,062 B1 | 2/2006 | Freed et al. |
| 6,996,076 B1 | 2/2006 | Forbes et al. |
| 6,996,393 B2 | 2/2006 | Pyhalammi et al. |
| 6,998,985 B2 | 2/2006 | Reisman et al. |
| 7,002,920 B1 | 2/2006 | Ayyagari et al. |
| 7,007,295 B1 | 2/2006 | Rose et al. |
| 7,013,469 B2 | 3/2006 | Smith et al. |
| 7,017,189 B1 | 3/2006 | DeMello et al. |
| 7,024,200 B2 | 4/2006 | McKenna et al. |
| 7,024,460 B2 | 4/2006 | Koopmas et al. |
| 7,027,055 B2 | 4/2006 | Anderson et al. |
| 7,027,408 B2 | 4/2006 | Nabkel et al. |
| 7,031,733 B2 | 4/2006 | Alminana et al. |
| 7,032,072 B1 | 4/2006 | Quinn et al. |
| 7,039,027 B2 | 5/2006 | Bridgelall |
| 7,039,037 B2 | 5/2006 | Wang et al. |
| 7,039,403 B2 | 5/2006 | Wong |
| 7,039,713 B1 | 5/2006 | Van Gunter et al. |
| 7,042,988 B2 | 5/2006 | Juitt et al. |
| 7,043,225 B1 | 5/2006 | Patel et al. |
| 7,043,226 B2 | 5/2006 | Yamauchi |
| 7,043,268 B2 | 5/2006 | Yukie et al. |
| 7,047,276 B2 | 5/2006 | Liu et al. |
| 7,058,022 B1 | 6/2006 | Carolan et al. |
| 7,058,968 B2 | 6/2006 | Rowland et al. |
| 7,068,600 B2 | 6/2006 | Cain |
| 7,069,248 B2 | 6/2006 | Huber |
| 7,082,422 B1 | 7/2006 | Zirngibl et al. |
| 7,084,775 B1 | 8/2006 | Smith |
| 7,092,696 B1 | 8/2006 | Hosain et al. |
| 7,095,754 B2 | 8/2006 | Benveniste |
| 7,102,620 B2 | 9/2006 | Harries et al. |
| 7,110,753 B2 | 9/2006 | Campen |
| 7,113,780 B2 | 9/2006 | Mckenna et al. |
| 7,113,997 B2 | 9/2006 | Jayapalan et al. |
| 7,120,133 B1 | 10/2006 | Joo et al. |
| 7,133,386 B2 | 11/2006 | Holur et al. |
| 7,133,695 B2 | 11/2006 | Beyda |
| 7,136,361 B2 | 11/2006 | Benveniste |
| 7,139,569 B2 | 11/2006 | Kato |
| 7,142,876 B2 | 11/2006 | Trossen et al. |
| 7,149,229 B1 | 12/2006 | Leung |
| 7,149,521 B2 | 12/2006 | Sundar et al. |
| 7,151,764 B1 | 12/2006 | Heinonen et al. |
| 7,158,792 B1 | 1/2007 | Cook et al. |
| 7,162,237 B1 | 1/2007 | Silver et al. |
| 7,165,040 B2 | 1/2007 | Ehrman et al. |
| 7,167,078 B2 | 1/2007 | Pourchot |
| 7,174,156 B1 | 2/2007 | Mangal |
| 7,174,174 B2 | 2/2007 | Boris et al. |
| 7,177,919 B1 | 2/2007 | Truong et al. |
| 7,180,855 B1 | 2/2007 | Lin |
| 7,181,017 B1 | 2/2007 | Nagel et al. |
| 7,191,248 B2 | 3/2007 | Chattopadhyay et al. |
| 7,197,321 B2 | 3/2007 | Erskine et al. |
| 7,200,112 B2 | 4/2007 | Sundar et al. |
| 7,200,551 B1 | 4/2007 | Senez |
| 7,203,169 B1 | 4/2007 | Okholm et al. |
| 7,203,721 B1 | 4/2007 | Ben-Efraim et al. |
| 7,203,752 B2 | 4/2007 | Rice et al. |
| 7,212,491 B2 | 5/2007 | Koga |
| 7,219,123 B1 | 5/2007 | Fiechter et al. |
| 7,222,190 B2 | 5/2007 | Klinker et al. |
| 7,222,304 B2 | 5/2007 | Beaton et al. |
| 7,224,968 B2 | 5/2007 | Dobson et al. |
| 7,228,354 B2 | 6/2007 | Chambliss et al. |
| 7,236,780 B2 | 6/2007 | Benco |
| 7,242,668 B2 | 7/2007 | Kan et al. |
| 7,242,920 B2 | 7/2007 | Morris |
| 7,245,901 B2 | 7/2007 | McGregor et al. |
| 7,248,570 B2 | 7/2007 | Bahl et al. |
| 7,251,218 B2 | 7/2007 | Jorgensen |
| 7,260,382 B1 | 8/2007 | Lamb et al. |
| 7,266,371 B1 | 9/2007 | Amin et al. |
| 7,269,157 B2 | 9/2007 | Klinker et al. |
| 7,271,765 B2 | 9/2007 | Stilp et al. |
| 7,272,660 B1 | 9/2007 | Powers et al. |
| 7,280,816 B2 | 10/2007 | Fratti et al. |
| 7,280,818 B2 | 10/2007 | Clayton |
| 7,283,561 B1 | 10/2007 | Picher-Dempsey |
| 7,283,963 B1 | 10/2007 | Fitzpatrick et al. |
| 7,286,834 B2 | 10/2007 | Walter |
| 7,286,848 B2 | 10/2007 | Vireday et al. |
| 7,289,489 B1 | 10/2007 | Kung et al. |
| 7,290,283 B2 | 10/2007 | Copeland, III |
| 7,310,424 B2 | 12/2007 | Gehring et al. |
| 7,313,237 B2 | 12/2007 | Bahl et al. |
| 7,315,892 B2 | 1/2008 | Freimuth et al. |
| 7,317,699 B2 | 1/2008 | Godfrey et al. |
| 7,318,111 B2 | 1/2008 | Zhao |
| 7,320,029 B2 | 1/2008 | Rinne et al. |
| 7,322,044 B2 | 1/2008 | Hrastar |
| 7,324,447 B1 | 1/2008 | Morford |
| 7,325,037 B2 | 1/2008 | Lawson |
| 7,336,960 B2 | 2/2008 | Zavalkovsky et al. |
| 7,340,772 B2 | 3/2008 | Panasyuk et al. |
| 7,346,410 B2 | 3/2008 | Uchiyama |
| 7,349,695 B2 | 3/2008 | Oommen et al. |
| 7,353,533 B2 | 4/2008 | Wright et al. |
| 7,356,011 B1 | 4/2008 | Waters et al. |
| 7,356,337 B2 | 4/2008 | Florence |
| 7,366,497 B2 | 4/2008 | Nagata |
| 7,366,654 B2 | 4/2008 | Moore |
| 7,369,848 B2 | 5/2008 | Jiang |
| 7,369,856 B2 | 5/2008 | Ovadia |
| 7,373,136 B2 | 5/2008 | Watler et al. |
| 7,373,179 B2 | 5/2008 | Stine et al. |
| 7,379,731 B2 | 5/2008 | Natsuno et al. |
| 7,388,950 B2 | 6/2008 | Elsey et al. |
| 7,389,412 B2 | 6/2008 | Sharma et al. |
| 7,391,724 B2 | 6/2008 | Alakoski et al. |

(56) References Cited

U.S. PATENT DOCUMENTS

| | | |
|---|---|---|
| 7,395,244 B1 | 7/2008 | Kingsford |
| 7,401,338 B1 | 7/2008 | Bowen et al. |
| 7,403,763 B2 | 7/2008 | Maes |
| 7,409,447 B1 | 8/2008 | Assadzadeh |
| 7,409,569 B2 | 8/2008 | Illowsky et al. |
| 7,411,930 B2 | 8/2008 | Montojo et al. |
| 7,418,253 B2 | 8/2008 | Kavanah |
| 7,418,257 B2 | 8/2008 | Kim |
| 7,421,004 B2 | 9/2008 | Feher |
| 7,423,971 B1 | 9/2008 | Mohaban et al. |
| 7,428,750 B1 | 9/2008 | Dunn et al. |
| 7,433,362 B2 | 10/2008 | Mallya et al. |
| 7,436,816 B2 | 10/2008 | Mehta et al. |
| 7,440,433 B2 | 10/2008 | Rink et al. |
| 7,444,669 B1 | 10/2008 | Bahl et al. |
| 7,450,591 B2 | 11/2008 | Korling et al. |
| 7,450,927 B1 | 11/2008 | Creswell et al. |
| 7,454,191 B2 | 11/2008 | Dawson et al. |
| 7,457,265 B2 | 11/2008 | Julka et al. |
| 7,457,870 B1 | 11/2008 | Lownsbrough et al. |
| 7,460,837 B2 | 12/2008 | Diener |
| 7,466,652 B2 | 12/2008 | Lau et al. |
| 7,467,160 B2 | 12/2008 | McIntyre |
| 7,472,189 B2 | 12/2008 | Mallya et al. |
| 7,478,420 B2 | 1/2009 | Wright et al. |
| 7,486,185 B2 | 2/2009 | Culpepper et al. |
| 7,486,658 B2 | 2/2009 | Kumar |
| 7,493,659 B1 | 2/2009 | Wu et al. |
| 7,496,652 B2 | 2/2009 | Pezzutti |
| 7,499,438 B2 | 3/2009 | Hinman et al. |
| 7,499,537 B2 | 3/2009 | Elsey et al. |
| 7,502,672 B1 | 3/2009 | Kolls |
| 7,505,756 B2 | 3/2009 | Bahl |
| 7,505,795 B1 | 3/2009 | Lim et al. |
| 7,508,799 B2 | 3/2009 | Sumner et al. |
| 7,512,128 B2 | 3/2009 | DiMambro et al. |
| 7,512,131 B2 | 3/2009 | Svensson et al. |
| 7,515,608 B2 | 4/2009 | Yuan et al. |
| 7,515,926 B2 | 4/2009 | Bu et al. |
| 7,516,219 B2 | 4/2009 | Moghaddam et al. |
| 7,522,549 B2 | 4/2009 | Karaoguz et al. |
| 7,522,576 B2 | 4/2009 | Du et al. |
| 7,526,541 B2 | 4/2009 | Roese et al. |
| 7,529,204 B2 | 5/2009 | Bourlas et al. |
| 7,535,880 B1 | 5/2009 | Hinman et al. |
| 7,536,695 B2 | 5/2009 | Alam et al. |
| 7,539,132 B2 | 5/2009 | Werner et al. |
| 7,539,862 B2 | 5/2009 | Edgett et al. |
| 7,540,408 B2 | 6/2009 | Levine et al. |
| 7,545,782 B2 | 6/2009 | Rayment et al. |
| 7,546,460 B2 | 6/2009 | Maes |
| 7,546,629 B2 | 6/2009 | Albert et al. |
| 7,548,875 B2 | 6/2009 | Mikkelsen et al. |
| 7,548,976 B2 | 6/2009 | Bahl et al. |
| 7,551,921 B2 | 6/2009 | Petermann |
| 7,551,922 B2 | 6/2009 | Roskowski et al. |
| 7,554,983 B1 | 6/2009 | Muppala |
| 7,555,757 B2 | 6/2009 | Smith et al. |
| 7,561,899 B2 | 7/2009 | Lee |
| 7,562,213 B1 | 7/2009 | Timms |
| 7,564,799 B2 | 7/2009 | Holland et al. |
| 7,565,141 B2 | 7/2009 | Macaluso |
| 7,574,509 B2 | 8/2009 | Nixon et al. |
| 7,574,731 B2 | 8/2009 | Fascenda |
| 7,577,431 B2 | 8/2009 | Jiang |
| 7,580,356 B1 | 8/2009 | Mishra et al. |
| 7,580,857 B2 | 8/2009 | VanFleet et al. |
| 7,583,964 B2 | 9/2009 | Wong |
| 7,584,298 B2 | 9/2009 | Klinker et al. |
| 7,586,871 B2 | 9/2009 | Hamilton et al. |
| 7,593,417 B2 | 9/2009 | Wang et al. |
| 7,593,730 B2 | 9/2009 | Khandelwal et al. |
| 7,596,373 B2 | 9/2009 | Mcgregor et al. |
| 7,599,288 B2 | 10/2009 | Cole et al. |
| 7,599,714 B2 | 10/2009 | Kuzminskiy |
| 7,602,746 B2 | 10/2009 | Calhoun et al. |
| 7,606,918 B2 | 10/2009 | Holzman et al. |
| 7,607,041 B2 | 10/2009 | Kraemer et al. |
| 7,609,650 B2 | 10/2009 | Roskowski et al. |
| 7,609,700 B1 | 10/2009 | Ying et al. |
| 7,610,047 B2 | 10/2009 | Hicks, III et al. |
| 7,610,057 B2 | 10/2009 | Bahl et al. |
| 7,610,328 B2 | 10/2009 | Haase et al. |
| 7,610,396 B2 | 10/2009 | Taglienti et al. |
| 7,614,051 B2 | 11/2009 | Glaum et al. |
| 7,616,962 B2 | 11/2009 | Oswal et al. |
| 7,617,516 B2 | 11/2009 | Huslak et al. |
| 7,620,041 B2 | 11/2009 | Dunn et al. |
| 7,620,065 B2 | 11/2009 | Falardeau |
| 7,620,162 B2 | 11/2009 | Aaron et al. |
| 7,620,383 B2 | 11/2009 | Taglienti et al. |
| 7,627,314 B2 | 12/2009 | Carlson et al. |
| 7,627,600 B2 | 12/2009 | Citron et al. |
| 7,627,767 B2 | 12/2009 | Sherman et al. |
| 7,627,872 B2 | 12/2009 | Hebeler et al. |
| 7,633,438 B2 | 12/2009 | Tysowski |
| 7,634,388 B2 | 12/2009 | Archer et al. |
| 7,636,574 B2 | 12/2009 | Poosala |
| 7,636,626 B2 | 12/2009 | Oesterling et al. |
| 7,643,411 B2 | 1/2010 | Andreasen et al. |
| 7,644,151 B2 | 1/2010 | Jerrim et al. |
| 7,644,267 B2 | 1/2010 | Ylikoski et al. |
| 7,644,414 B2 | 1/2010 | Smith et al. |
| 7,647,047 B2 | 1/2010 | Moghaddam et al. |
| 7,650,137 B2 | 1/2010 | Jobs et al. |
| 7,653,394 B2 | 1/2010 | McMillin |
| 7,656,271 B2 | 2/2010 | Ehrman et al. |
| 7,657,920 B2 | 2/2010 | Arseneau et al. |
| 7,660,419 B1 | 2/2010 | Ho |
| 7,661,124 B2 | 2/2010 | Ramanathan et al. |
| 7,664,494 B2 | 2/2010 | Jiang |
| 7,668,176 B2 | 2/2010 | Chuah |
| 7,668,612 B1 | 2/2010 | Okkonen |
| 7,668,903 B2 | 2/2010 | Edwards et al. |
| 7,668,966 B2 | 2/2010 | Klinker et al. |
| 7,676,673 B2 | 3/2010 | Weller et al. |
| 7,680,086 B2 | 3/2010 | Eglin |
| 7,681,226 B2 | 3/2010 | Kraemer et al. |
| 7,684,370 B2 | 3/2010 | Kezys |
| 7,685,131 B2 | 3/2010 | Batra et al. |
| 7,685,254 B2 | 3/2010 | Pandya |
| 7,685,530 B2 | 3/2010 | Sherrard et al. |
| 7,688,792 B2 | 3/2010 | Babbar et al. |
| 7,693,107 B2 | 4/2010 | De Froment |
| 7,693,720 B2 | 4/2010 | Kennewick et al. |
| 7,697,540 B2 | 4/2010 | Haddad et al. |
| 7,710,932 B2 | 5/2010 | Muthuswamy et al. |
| 7,711,848 B2 | 5/2010 | Maes |
| 7,719,966 B2 | 5/2010 | Luft et al. |
| 7,720,206 B2 | 5/2010 | Devolites et al. |
| 7,720,464 B2 | 5/2010 | Batta |
| 7,720,505 B2 | 5/2010 | Gopi et al. |
| 7,720,960 B2 | 5/2010 | Pruss et al. |
| 7,721,296 B2 | 5/2010 | Ricagni |
| 7,724,716 B2 | 5/2010 | Fadell |
| 7,725,570 B1 | 5/2010 | Lewis |
| 7,729,326 B2 | 6/2010 | Sekhar |
| 7,730,123 B1 | 6/2010 | Erickson et al. |
| 7,734,784 B1 | 6/2010 | Araujo et al. |
| 7,742,406 B1 | 6/2010 | Muppala |
| 7,746,854 B2 | 6/2010 | Ambe et al. |
| 7,747,240 B1 | 6/2010 | Briscoe et al. |
| 7,747,699 B2 | 6/2010 | Prueitt et al. |
| 7,747,730 B1 | 6/2010 | Harlow |
| 7,752,330 B2 | 7/2010 | Olsen et al. |
| 7,756,056 B2 | 7/2010 | Kim et al. |
| 7,756,534 B2 | 7/2010 | Anupam et al. |
| 7,756,757 B1 | 7/2010 | Oakes, III |
| 7,760,137 B2 | 7/2010 | Martucci et al. |
| 7,760,711 B1 | 7/2010 | Kung et al. |
| 7,760,861 B1 | 7/2010 | Croak et al. |
| 7,765,294 B2 | 7/2010 | Edwards et al. |
| 7,769,397 B2 | 8/2010 | Funato et al. |
| 7,770,785 B2 | 8/2010 | Jha et al. |

(56) References Cited

U.S. PATENT DOCUMENTS

| | | |
|---|---|---|
| 7,774,323 B2 | 8/2010 | Helfman |
| 7,774,412 B1 | 8/2010 | Schnepel |
| 7,774,456 B1 | 8/2010 | Lownsbrough et al. |
| 7,778,176 B2 | 8/2010 | Morford |
| 7,778,643 B2 | 8/2010 | Laroia et al. |
| 7,792,257 B1 | 9/2010 | Vanier et al. |
| 7,792,538 B2 | 9/2010 | Kozisek |
| 7,792,708 B2 | 9/2010 | Alva |
| 7,797,019 B2 | 9/2010 | Friedmann |
| 7,797,060 B2 | 9/2010 | Grgic et al. |
| 7,797,204 B2 | 9/2010 | Balent |
| 7,797,401 B2 | 9/2010 | Stewart et al. |
| 7,801,523 B1 | 9/2010 | Kenderov |
| 7,801,783 B2 | 9/2010 | Kende et al. |
| 7,801,985 B1 | 9/2010 | Pitkow et al. |
| 7,802,724 B1 | 9/2010 | Nohr |
| 7,805,140 B2 | 9/2010 | Friday et al. |
| 7,805,522 B2 | 9/2010 | Schlüter et al. |
| 7,805,606 B2 | 9/2010 | Birger et al. |
| 7,809,351 B1 | 10/2010 | Panda et al. |
| 7,809,372 B2 | 10/2010 | Rajaniemi |
| 7,813,746 B2 | 10/2010 | Rajkotia |
| 7,817,615 B1 | 10/2010 | Breau et al. |
| 7,817,983 B2 | 10/2010 | Cassett et al. |
| 7,822,837 B1 | 10/2010 | Urban et al. |
| 7,822,849 B2 | 10/2010 | Titus |
| 7,826,427 B2 | 11/2010 | Sood et al. |
| 7,826,607 B1 | 11/2010 | De Carvalho Resende et al. |
| 7,835,275 B1 | 11/2010 | Swan et al. |
| 7,843,831 B2 | 11/2010 | Morrill et al. |
| 7,843,843 B1 | 11/2010 | Papp, III et al. |
| 7,844,034 B1 | 11/2010 | Oh et al. |
| 7,844,728 B2 | 11/2010 | Anderson et al. |
| 7,848,768 B2 | 12/2010 | Omori et al. |
| 7,849,161 B2 | 12/2010 | Koch et al. |
| 7,849,170 B1 | 12/2010 | Hargens et al. |
| 7,849,477 B2 | 12/2010 | Cristofalo et al. |
| 7,853,255 B2 | 12/2010 | Karaoguz et al. |
| 7,853,656 B2 | 12/2010 | Yach et al. |
| 7,856,226 B2 | 12/2010 | Wong et al. |
| 7,860,088 B2 | 12/2010 | Lioy |
| 7,865,182 B2 | 1/2011 | Macaluso |
| 7,865,187 B2 | 1/2011 | Ramer et al. |
| 7,868,778 B2 | 1/2011 | Kenwright |
| 7,873,001 B2 | 1/2011 | Silver |
| 7,873,344 B2 | 1/2011 | Bowser et al. |
| 7,873,346 B2 | 1/2011 | Petersson et al. |
| 7,873,540 B2 | 1/2011 | Arumugam |
| 7,873,705 B2 | 1/2011 | Kalish |
| 7,877,090 B2 | 1/2011 | Maes |
| 7,881,199 B2 | 2/2011 | Krstulich |
| 7,881,697 B2 | 2/2011 | Baker et al. |
| 7,882,029 B2 | 2/2011 | White |
| 7,882,247 B2 | 2/2011 | Sturniolo et al. |
| 7,882,560 B2 | 2/2011 | Kraemer et al. |
| 7,886,047 B1 | 2/2011 | Potluri |
| 7,889,384 B2 | 2/2011 | Armentrout et al. |
| 7,890,084 B1 | 2/2011 | Dudziak et al. |
| 7,890,111 B2 | 2/2011 | Bugenhagen |
| 7,894,431 B2 | 2/2011 | Goring et al. |
| 7,899,039 B2 | 3/2011 | Andreasen et al. |
| 7,899,438 B2 | 3/2011 | Baker et al. |
| 7,903,553 B2 | 3/2011 | Liu |
| 7,907,970 B2 | 3/2011 | Park et al. |
| 7,911,975 B2 | 3/2011 | Droz et al. |
| 7,912,025 B2 | 3/2011 | Pattenden et al. |
| 7,912,056 B1 | 3/2011 | Brassem |
| 7,920,529 B1 | 4/2011 | Mahler et al. |
| 7,921,463 B2 | 4/2011 | Sood et al. |
| 7,925,740 B2 | 4/2011 | Nath et al. |
| 7,925,778 B1 | 4/2011 | Wijnands et al. |
| 7,929,959 B2 | 4/2011 | DeAtley et al. |
| 7,929,960 B2 | 4/2011 | Martin et al. |
| 7,929,973 B2 | 4/2011 | Zavalkovsky et al. |
| 7,930,327 B2 | 4/2011 | Craft et al. |
| 7,930,446 B2 | 4/2011 | Kesselman et al. |
| 7,930,553 B2 | 4/2011 | Satarasinghe et al. |
| 7,933,274 B2 | 4/2011 | Verma et al. |
| 7,936,736 B2 | 5/2011 | Proctor, Jr. et al. |
| 7,937,069 B2 | 5/2011 | Rassam |
| 7,937,450 B2 | 5/2011 | Janik |
| 7,940,685 B1 | 5/2011 | Breslau et al. |
| 7,940,751 B2 | 5/2011 | Hansen |
| 7,941,184 B2 | 5/2011 | Prendergast et al. |
| 7,944,948 B2 | 5/2011 | Chow et al. |
| 7,945,238 B2 | 5/2011 | Baker et al. |
| 7,945,240 B1 | 5/2011 | Klock et al. |
| 7,945,945 B2 | 5/2011 | Graham et al. |
| 7,948,952 B2 | 5/2011 | Hurtta et al. |
| 7,948,953 B2 | 5/2011 | Melkote et al. |
| 7,948,968 B2 | 5/2011 | Voit et al. |
| 7,949,529 B2 | 5/2011 | Weider et al. |
| 7,953,808 B2 | 5/2011 | Sharp et al. |
| 7,953,877 B2 | 5/2011 | Vemula et al. |
| 7,957,020 B2 | 6/2011 | Mine et al. |
| 7,957,381 B2 | 6/2011 | Clermidy et al. |
| 7,957,511 B2 | 6/2011 | Drudis et al. |
| 7,958,029 B1 | 6/2011 | Bobich et al. |
| 7,962,622 B2 | 6/2011 | Friend et al. |
| 7,965,983 B1 | 6/2011 | Swan et al. |
| 7,966,405 B2 | 6/2011 | Sundaresan et al. |
| 7,969,950 B2 | 6/2011 | Iyer et al. |
| 7,970,350 B2 | 6/2011 | Sheynman |
| 7,970,426 B2 | 6/2011 | Poe et al. |
| 7,974,624 B2 | 7/2011 | Gallagher et al. |
| 7,975,184 B2 | 7/2011 | Goff et al. |
| 7,978,627 B2 | 7/2011 | Taylor et al. |
| 7,978,686 B2 | 7/2011 | Goyal et al. |
| 7,979,069 B2 | 7/2011 | Hupp et al. |
| 7,979,889 B2 | 7/2011 | Gladstone et al. |
| 7,979,896 B2 | 7/2011 | McMurtry et al. |
| 7,984,130 B2 | 7/2011 | Bogineni et al. |
| 7,984,511 B2 | 7/2011 | Kocher et al. |
| 7,986,935 B1 | 7/2011 | D'Souza et al. |
| 7,987,496 B2 | 7/2011 | Bryce et al. |
| 7,987,510 B2 | 7/2011 | Kocher et al. |
| 3,005,009 A1 | 8/2011 | McKee et al. |
| 3,005,459 A1 | 8/2011 | Balsillie |
| 3,005,726 A1 | 8/2011 | Bao |
| 3,005,913 A1 | 8/2011 | Carlander |
| 3,005,988 A1 | 8/2011 | Maes |
| 7,990,049 B2 | 8/2011 | Shioya |
| 8,000,276 B2 | 8/2011 | Scherzer et al. |
| 8,000,318 B2 | 8/2011 | Wiley et al. |
| 8,010,080 B1 | 8/2011 | Thenthiruperai et al. |
| 8,010,081 B1 | 8/2011 | Roskowski |
| 8,010,082 B2 | 8/2011 | Sutaria et al. |
| 8,010,990 B2 | 8/2011 | Ferguson et al. |
| 8,015,133 B1 | 9/2011 | Wu et al. |
| 8,015,234 B2 | 9/2011 | Lum et al. |
| 8,015,249 B2 | 9/2011 | Nayak et al. |
| 8,019,687 B2 | 9/2011 | Wang et al. |
| 8,019,820 B2 | 9/2011 | Son et al. |
| 8,019,846 B2 | 9/2011 | Roelens et al. |
| 8,019,868 B2 | 9/2011 | Rao et al. |
| 8,019,886 B2 | 9/2011 | Harrang et al. |
| 8,023,425 B2 | 9/2011 | Raleigh |
| 8,024,397 B1 | 9/2011 | Erickson et al. |
| 8,024,424 B2 | 9/2011 | Freimuth et al. |
| 8,027,339 B2 | 9/2011 | Short et al. |
| 8,031,601 B2 | 10/2011 | Feroz et al. |
| 8,032,168 B2 | 10/2011 | Ikaheimo |
| 8,032,409 B1 | 10/2011 | Mikurak |
| 8,032,899 B2 | 10/2011 | Archer et al. |
| 8,036,387 B2 | 10/2011 | Kudelski et al. |
| 8,036,600 B2 | 10/2011 | Garrett et al. |
| 8,044,792 B2 | 10/2011 | Orr et al. |
| 8,045,973 B2 | 10/2011 | Chambers |
| 8,046,449 B2 | 10/2011 | Yoshiuchi |
| 8,050,275 B1 | 11/2011 | Iyer |
| 8,050,690 B2 | 11/2011 | Neeraj |
| 8,050,705 B2 | 11/2011 | Sicher et al. |
| 8,059,530 B1 | 11/2011 | Cole |
| 8,060,017 B2 | 11/2011 | Schlicht et al. |

(56) References Cited

U.S. PATENT DOCUMENTS

| | | |
|---|---|---|
| 8,060,463 B1 | 11/2011 | Spiegel |
| 8,064,418 B2 | 11/2011 | Maki |
| 8,064,896 B2 | 11/2011 | Bell et al. |
| 8,065,365 B2 | 11/2011 | Saxena et al. |
| 8,068,824 B2 | 11/2011 | Shan et al. |
| 8,068,829 B2 | 11/2011 | Lemond et al. |
| 8,073,427 B2 | 12/2011 | Koch et al. |
| 8,073,721 B1 | 12/2011 | Lewis |
| 8,078,140 B2 | 12/2011 | Baker et al. |
| 8,078,163 B2 | 12/2011 | Lemond et al. |
| 8,085,808 B2 | 12/2011 | Brusca et al. |
| 8,086,398 B2 | 12/2011 | Sanchez et al. |
| 8,086,497 B1 | 12/2011 | Oakes, III |
| 8,086,791 B2 | 12/2011 | Caulkins |
| 8,090,359 B2 | 1/2012 | Proctor, Jr. et al. |
| 8,090,361 B2 | 1/2012 | Hagan |
| 8,090,616 B2 | 1/2012 | Proctor, Jr. et al. |
| 8,091,087 B2 | 1/2012 | Ali et al. |
| 8,094,551 B2 | 1/2012 | Huber et al. |
| 8,095,112 B2 | 1/2012 | Chow et al. |
| 8,095,124 B2 | 1/2012 | Balia |
| 8,095,640 B2 | 1/2012 | Guingo et al. |
| 8,095,666 B2 | 1/2012 | Schmidt et al. |
| 8,098,579 B2 | 1/2012 | Ray et al. |
| 8,099,077 B2 | 1/2012 | Chowdhury et al. |
| 8,099,517 B2 | 1/2012 | Jia et al. |
| 8,102,814 B2 | 1/2012 | Rahman et al. |
| 8,103,285 B2 | 1/2012 | Kalhan |
| 8,104,080 B2 | 1/2012 | Burns et al. |
| 8,107,953 B2 | 1/2012 | Zimmerman et al. |
| 8,108,520 B2 | 1/2012 | Ruutu et al. |
| 8,108,680 B2 | 1/2012 | Murray |
| 8,112,435 B2 | 2/2012 | Epstein et al. |
| 8,116,223 B2 | 2/2012 | Tian et al. |
| 8,116,749 B2 | 2/2012 | Proctor, Jr. et al. |
| 8,116,781 B2 | 2/2012 | Chen et al. |
| 8,122,128 B2 | 2/2012 | Burke, II et al. |
| 8,122,249 B2 | 2/2012 | Falk et al. |
| 8,125,897 B2 | 2/2012 | Ray et al. |
| 8,126,123 B2 | 2/2012 | Cai et al. |
| 8,126,396 B2 | 2/2012 | Bennett |
| 8,126,476 B2 | 2/2012 | Vardi et al. |
| 8,126,722 B2 | 2/2012 | Robb et al. |
| 8,130,793 B2 | 3/2012 | Edwards et al. |
| 8,131,256 B2 | 3/2012 | Martti et al. |
| 8,131,281 B1 | 3/2012 | Hildner et al. |
| 8,131,840 B1 | 3/2012 | Denker |
| 8,131,858 B2 | 3/2012 | Agulnik et al. |
| 8,132,256 B2 | 3/2012 | Bari |
| 8,134,954 B2 | 3/2012 | Godfrey et al. |
| 8,135,388 B1 | 3/2012 | Gailloux et al. |
| 8,135,392 B2 | 3/2012 | Marcellino et al. |
| 8,135,657 B2 | 3/2012 | Kapoor et al. |
| 8,140,690 B2 | 3/2012 | Ly et al. |
| 8,144,591 B2 | 3/2012 | Ghai et al. |
| 8,145,194 B2 | 3/2012 | Yoshikawa et al. |
| 8,146,142 B2 | 3/2012 | Lortz et al. |
| 8,149,748 B2 | 4/2012 | Bata et al. |
| 8,149,823 B2 | 4/2012 | Turcan et al. |
| 8,150,394 B2 | 4/2012 | Bianconi et al. |
| 8,150,431 B2 | 4/2012 | Wolovitz et al. |
| 8,151,205 B2 | 4/2012 | Follmann et al. |
| 8,155,155 B1 | 4/2012 | Chow et al. |
| 8,155,620 B2 | 4/2012 | Wang et al. |
| 8,155,666 B2 | 4/2012 | Alizadeh-Shabdiz |
| 8,155,670 B2 | 4/2012 | Fullam et al. |
| 8,156,206 B2 | 4/2012 | Kiley et al. |
| 8,159,520 B1 | 4/2012 | Dhanoa et al. |
| 8,160,015 B2 | 4/2012 | Rashid et al. |
| 8,160,056 B2 | 4/2012 | Van der Merwe et al. |
| 8,160,598 B2 | 4/2012 | Savoor |
| 8,165,576 B2 | 4/2012 | Raju et al. |
| 8,166,040 B2 | 4/2012 | Brindisi et al. |
| 8,166,554 B2 | 4/2012 | John |
| 8,170,553 B2 | 5/2012 | Bennett |
| 8,174,378 B2 | 5/2012 | Richman et al. |
| 8,174,970 B2 | 5/2012 | Adamczyk et al. |
| 8,175,574 B1 | 5/2012 | Panda et al. |
| 8,180,333 B1 | 5/2012 | Wells et al. |
| 8,180,881 B2 | 5/2012 | Seo et al. |
| 8,180,886 B2 | 5/2012 | Overcash et al. |
| 8,184,530 B1 | 5/2012 | Swan et al. |
| 8,184,590 B2 | 5/2012 | Rosenblatt |
| 8,185,088 B2 | 5/2012 | Klein et al. |
| 8,185,093 B2 | 5/2012 | Jheng et al. |
| 8,185,127 B1 | 5/2012 | Cai et al. |
| 8,185,152 B1 | 5/2012 | Goldner |
| 8,185,158 B2 | 5/2012 | Tamura et al. |
| 8,190,087 B2 | 5/2012 | Fisher et al. |
| 8,190,122 B1 | 5/2012 | Alexander et al. |
| 8,190,675 B2 | 5/2012 | Tribbett |
| 8,191,106 B2 | 5/2012 | Choyi et al. |
| 8,191,116 B1 | 5/2012 | Gazzard |
| 8,191,124 B2 | 5/2012 | Wynn et al. |
| 8,194,549 B2 | 6/2012 | Huber et al. |
| 8,194,553 B2 | 6/2012 | Liang et al. |
| 8,194,572 B2 | 6/2012 | Horvath et al. |
| 8,194,581 B1 | 6/2012 | Schroeder et al. |
| 8,195,093 B2 | 6/2012 | Garrett et al. |
| 8,195,153 B1 | 6/2012 | Frencel et al. |
| 8,195,163 B2 | 6/2012 | Gisby et al. |
| 8,195,661 B2 | 6/2012 | Kalavade |
| 8,196,199 B2 | 6/2012 | Hrastar et al. |
| 8,200,163 B2 | 6/2012 | Hoffman |
| 8,200,200 B1 | 6/2012 | Belser et al. |
| 8,200,509 B2 | 6/2012 | Kenedy et al. |
| 8,200,775 B2 | 6/2012 | Moore |
| 8,200,818 B2 | 6/2012 | Freund et al. |
| 8,204,190 B2 | 6/2012 | Bang et al. |
| 8,204,505 B2 | 6/2012 | Jin et al. |
| 8,204,794 B1 | 6/2012 | Peng et al. |
| 8,208,788 B2 | 6/2012 | Ando et al. |
| 8,208,919 B2 | 6/2012 | Kotecha |
| 8,213,296 B2 | 7/2012 | Shannon et al. |
| 8,213,363 B2 | 7/2012 | Ying et al. |
| 8,214,536 B2 | 7/2012 | Zhao |
| 8,214,890 B2 | 7/2012 | Kirovski et al. |
| 8,219,134 B2 | 7/2012 | Maharajh et al. |
| 8,223,655 B2 | 7/2012 | Heinz et al. |
| 8,223,741 B1 | 7/2012 | Bartlett et al. |
| 8,224,382 B2 | 7/2012 | Bultman |
| 8,224,773 B2 | 7/2012 | Spiegel |
| 8,228,818 B2 | 7/2012 | Chase et al. |
| 8,229,394 B2 | 7/2012 | Karlberg |
| 8,229,914 B2 | 7/2012 | Ramer et al. |
| 8,230,061 B2 | 7/2012 | Hassan et al. |
| 8,233,433 B2 | 7/2012 | Kalhan |
| 8,233,883 B2 | 7/2012 | De Froment |
| 8,233,895 B2 | 7/2012 | Tysowski |
| 8,234,583 B2 | 7/2012 | Sloo et al. |
| 8,238,287 B1 | 8/2012 | Gopi et al. |
| 8,239,520 B2 | 8/2012 | Grah |
| 8,242,959 B2 | 8/2012 | Mia et al. |
| 8,244,241 B2 | 8/2012 | Montemurro |
| 8,249,601 B2 | 8/2012 | Emberson et al. |
| 8,254,880 B2 | 8/2012 | Aaltonen et al. |
| 8,254,915 B2 | 8/2012 | Kozisek |
| 8,255,515 B1 | 8/2012 | Melman et al. |
| 8,255,534 B2 | 8/2012 | Assadzadeh |
| 8,255,689 B2 | 8/2012 | Kim et al. |
| 8,259,692 B2 | 9/2012 | Bajko |
| 8,264,965 B2 | 9/2012 | Dolganow et al. |
| 8,265,004 B2 | 9/2012 | Toutonghi |
| 8,266,249 B2 | 9/2012 | Hu |
| 8,266,681 B2 | 9/2012 | Deshpande et al. |
| 8,270,955 B2 | 9/2012 | Ramer et al. |
| 8,270,972 B2 | 9/2012 | Otting et al. |
| 8,271,025 B2 | 9/2012 | Brisebois et al. |
| 8,271,045 B2 | 9/2012 | Parolkar et al. |
| 8,271,049 B2 | 9/2012 | Silver et al. |
| 8,271,992 B2 | 9/2012 | Chatley et al. |
| 8,275,415 B2 | 9/2012 | Huslak |
| 8,275,830 B2 | 9/2012 | Raleigh |
| 8,279,067 B2 | 10/2012 | Berger et al. |

(56) References Cited

U.S. PATENT DOCUMENTS

| | | | |
|---|---|---|---|
| 8,279,864 B2 | 10/2012 | Wood |
| 8,280,351 B1 | 10/2012 | Ahmed et al. |
| 8,280,354 B2 | 10/2012 | Smith et al. |
| 8,284,740 B2 | 10/2012 | O'Connor |
| 8,285,249 B2 | 10/2012 | Baker et al. |
| 8,285,992 B2 | 10/2012 | Mathur et al. |
| 8,291,238 B2 | 10/2012 | Ginter et al. |
| 8,291,439 B2 | 10/2012 | Jethi et al. |
| 8,296,404 B2 | 10/2012 | McDysan et al. |
| 8,300,575 B2 | 10/2012 | Willars |
| 8,301,513 B1 | 10/2012 | Peng et al. |
| 8,306,518 B1 | 11/2012 | Gailloux |
| 8,306,741 B2 | 11/2012 | Tu |
| 8,307,067 B2 | 11/2012 | Ryan |
| 8,307,095 B2 | 11/2012 | Clark et al. |
| 8,310,943 B2 | 11/2012 | Mehta et al. |
| 8,315,198 B2 | 11/2012 | Corneille et al. |
| 8,315,593 B2 | 11/2012 | Gallant et al. |
| 8,315,594 B1 | 11/2012 | Mauser et al. |
| 8,315,718 B2 | 11/2012 | Caffrey et al. |
| 8,315,999 B2 | 11/2012 | Chatley et al. |
| 8,320,244 B2 | 11/2012 | Muqattash et al. |
| 8,320,902 B2 | 11/2012 | Moring et al. |
| 8,320,949 B2 | 11/2012 | Matta |
| 8,325,638 B2 | 12/2012 | Jin et al. |
| 8,325,906 B2 | 12/2012 | Fullarton et al. |
| 8,326,319 B2 | 12/2012 | Davis |
| 8,326,359 B2 | 12/2012 | Kauffman |
| 8,326,828 B2 | 12/2012 | Zhou et al. |
| 8,331,223 B2 | 12/2012 | Hill et al. |
| 8,331,293 B2 | 12/2012 | Sood |
| 8,332,375 B2 | 12/2012 | Chatley et al. |
| 8,332,517 B2 | 12/2012 | Russell |
| 8,335,161 B2 | 12/2012 | Foottit et al. |
| 8,339,991 B2 | 12/2012 | Biswas et al. |
| 8,340,625 B1 | 12/2012 | Johnson et al. |
| 8,340,628 B2 | 12/2012 | Taylor et al. |
| 8,340,678 B1 | 12/2012 | Pandey |
| 8,340,718 B2 | 12/2012 | Colonna et al. |
| 8,346,210 B2 | 1/2013 | Balsan et al. |
| 8,346,923 B2 | 1/2013 | Rowles et al. |
| 8,347,104 B2 | 1/2013 | Pathiyal |
| 8,347,362 B2 | 1/2013 | Cai et al. |
| 8,347,378 B2 | 1/2013 | Merkin et al. |
| 8,350,700 B2 | 1/2013 | Fast et al. |
| 8,351,592 B2 | 1/2013 | Freeny, Jr. et al. |
| 8,351,898 B2 | 1/2013 | Raleigh |
| 8,352,360 B2 | 1/2013 | De Judicibus et al. |
| 8,352,630 B2 | 1/2013 | Hart |
| 8,352,980 B2 | 1/2013 | Howcroft |
| 8,353,001 B2 | 1/2013 | Herrod |
| 8,355,570 B2 | 1/2013 | Karsanbhai et al. |
| 8,355,696 B1 | 1/2013 | Olding et al. |
| 8,356,336 B2 | 1/2013 | Johnston et al. |
| 8,358,638 B2 | 1/2013 | Scherzer et al. |
| 8,358,975 B2 | 1/2013 | Bahl et al. |
| 8,363,658 B1 | 1/2013 | Delker et al. |
| 8,363,799 B2 | 1/2013 | Gruchala et al. |
| 8,364,089 B2 | 1/2013 | Phillips |
| 8,364,806 B2 | 1/2013 | Short et al. |
| 8,369,274 B2 | 2/2013 | Sawai |
| 8,370,477 B2 | 2/2013 | Short et al. |
| 8,370,483 B2 | 2/2013 | Choong et al. |
| 8,374,090 B2 | 2/2013 | Morrill et al. |
| 8,374,592 B2 | 2/2013 | Proctor, Jr. et al. |
| 8,375,128 B2 | 2/2013 | Tofighbakhsh et al. |
| 8,375,136 B2 | 2/2013 | Roman et al. |
| 8,379,847 B2 | 2/2013 | Bell et al. |
| 8,380,247 B2 | 2/2013 | Engstrom |
| 8,385,199 B1 | 2/2013 | Coward et al. |
| 8,385,896 B2 | 2/2013 | Proctor, Jr. et al. |
| 8,385,964 B2 | 2/2013 | Haney |
| 8,385,975 B2 | 2/2013 | Forutanpour et al. |
| 8,386,386 B1 | 2/2013 | Zhu |
| 8,391,262 B2 | 3/2013 | Maki et al. |
| 8,391,834 B2 | 3/2013 | Raleigh |
| 8,392,982 B2 | 3/2013 | Harris et al. |
| 8,396,458 B2 | 3/2013 | Raleigh |
| 8,396,929 B2 | 3/2013 | Helfman et al. |
| 8,401,968 B1 | 3/2013 | Schattauer et al. |
| 8,402,165 B2 | 3/2013 | Deu-Ngoc et al. |
| 8,402,540 B2 | 3/2013 | Kapoor et al. |
| 8,406,427 B2 | 3/2013 | Chand et al. |
| 8,406,736 B2 | 3/2013 | Das et al. |
| 8,407,472 B2 | 3/2013 | Hao et al. |
| 8,407,763 B2 | 3/2013 | Weller et al. |
| 8,411,587 B2 | 4/2013 | Curtis et al. |
| 8,411,691 B2 | 4/2013 | Aggarwal |
| 8,412,798 B1 | 4/2013 | Wang |
| 8,413,245 B2 | 4/2013 | Kraemer et al. |
| 8,417,234 B2 * | 4/2013 | Sanding .............. H04W 12/068 |
| | | 455/418 |
| 8,418,168 B2 | 4/2013 | Tyhurst et al. |
| 8,422,988 B1 | 4/2013 | Keshav |
| 8,423,016 B2 | 4/2013 | Buckley et al. |
| 8,429,403 B2 | 4/2013 | Moret et al. |
| 8,437,734 B2 | 5/2013 | Ray et al. |
| 8,441,955 B2 | 5/2013 | Wilkinson et al. |
| 8,442,015 B2 | 5/2013 | Behzad et al. |
| 8,446,831 B2 | 5/2013 | Kwan et al. |
| 8,447,324 B2 | 5/2013 | Shuman et al. |
| 8,447,607 B2 | 5/2013 | Weider et al. |
| 8,447,980 B2 | 5/2013 | Godfrey et al. |
| 8,448,015 B2 | 5/2013 | Gerhart |
| 8,452,858 B2 | 5/2013 | Wu et al. |
| 8,461,958 B2 | 6/2013 | Saenz et al. |
| 8,463,194 B2 | 6/2013 | Erlenback et al. |
| 8,463,232 B2 | 6/2013 | Tuli et al. |
| 8,468,337 B2 | 6/2013 | Gaur et al. |
| 8,472,371 B1 | 6/2013 | Bari et al. |
| 8,477,778 B2 | 7/2013 | Lehmann, Jr. et al. |
| 8,483,135 B2 | 7/2013 | Cai et al. |
| 8,483,694 B2 | 7/2013 | Lewis et al. |
| 8,484,327 B2 | 7/2013 | Werner et al. |
| 8,484,568 B2 | 7/2013 | Rados et al. |
| 8,488,597 B2 | 7/2013 | Nie et al. |
| 8,489,110 B2 | 7/2013 | Frank et al. |
| 8,489,720 B1 | 7/2013 | Morford et al. |
| 8,494,559 B1 | 7/2013 | Malmi |
| 8,495,181 B2 | 7/2013 | Venkatraman et al. |
| 8,495,227 B2 | 7/2013 | Kaminsky et al. |
| 8,495,360 B2 | 7/2013 | Falk et al. |
| 8,495,700 B2 | 7/2013 | Shahbazi |
| 8,495,743 B2 | 7/2013 | Kraemer et al. |
| 8,499,087 B2 | 7/2013 | Hu |
| RE44,412 E | 8/2013 | Naqvi et al. |
| 8,500,533 B2 | 8/2013 | Lutnick et al. |
| 8,503,358 B2 | 8/2013 | Hanson et al. |
| 8,503,455 B2 | 8/2013 | Heikens |
| 8,504,032 B2 | 8/2013 | Lott et al. |
| 8,504,574 B2 | 8/2013 | Dvorak et al. |
| 8,504,687 B2 | 8/2013 | Maffione et al. |
| 8,504,690 B2 | 8/2013 | Shah et al. |
| 8,504,729 B2 | 8/2013 | Pezzutti |
| 8,505,073 B2 | 8/2013 | Taglienti et al. |
| 8,509,082 B2 | 8/2013 | Heinz et al. |
| 8,514,927 B2 | 8/2013 | Sundararajan et al. |
| 8,516,552 B2 | 8/2013 | Raleigh |
| 8,520,589 B2 | 8/2013 | Bhatt et al. |
| 8,520,595 B2 | 8/2013 | Yadav et al. |
| 8,521,110 B2 | 8/2013 | Rofougaran |
| 8,521,775 B1 | 8/2013 | Poh et al. |
| 8,522,039 B2 | 8/2013 | Hyndman et al. |
| 8,522,249 B2 | 8/2013 | Beaule |
| 8,522,337 B2 | 8/2013 | Adusumilli et al. |
| 8,523,547 B2 | 9/2013 | Pekrul |
| 8,526,329 B2 | 9/2013 | Mahany et al. |
| 8,526,350 B2 | 9/2013 | Xue et al. |
| 8,527,410 B2 | 9/2013 | Markki et al. |
| 8,527,662 B2 | 9/2013 | Biswas et al. |
| 8,528,068 B1 | 9/2013 | Weglein et al. |
| 8,531,954 B2 | 9/2013 | McNaughton et al. |
| 8,531,995 B2 | 9/2013 | Khan et al. |
| 8,532,610 B2 | 9/2013 | Manning Cassett et al. |

(56) References Cited

U.S. PATENT DOCUMENTS

| | | |
|---|---|---|
| 8,533,775 B2 | 9/2013 | Alcorn et al. |
| 8,535,160 B2 | 9/2013 | Lutnick et al. |
| 8,538,394 B2 | 9/2013 | Zimmerman et al. |
| 8,538,402 B2 | 9/2013 | Vidal et al. |
| 8,538,421 B2 | 9/2013 | Brisebois et al. |
| 8,538,458 B2 | 9/2013 | Haney |
| 8,539,544 B2 | 9/2013 | Garimella et al. |
| 8,539,561 B2 | 9/2013 | Gupta et al. |
| 8,543,265 B2 | 9/2013 | Ekhaguere et al. |
| 8,543,814 B2 | 9/2013 | Laitinen et al. |
| 8,544,105 B2 | 9/2013 | Mclean et al. |
| 8,548,427 B2 | 10/2013 | Chow et al. |
| 8,548,428 B2 | 10/2013 | Raleigh |
| 8,549,173 B1 | 10/2013 | Wu et al. |
| 8,554,876 B2 | 10/2013 | Winsor |
| 8,559,369 B2 | 10/2013 | Barkan |
| 8,561,138 B2 | 10/2013 | Rothman et al. |
| 8,565,746 B2 | 10/2013 | Hoffman |
| 8,566,236 B2 | 10/2013 | Busch |
| 8,571,474 B2 | 10/2013 | Chavez et al. |
| 8,571,501 B2 | 10/2013 | Miller et al. |
| 8,571,598 B2 | 10/2013 | Valavi |
| 8,571,993 B2 | 10/2013 | Kocher et al. |
| 8,572,117 B2 | 10/2013 | Rappaport |
| 8,572,256 B2 | 10/2013 | Babbar |
| 8,583,499 B2 | 11/2013 | De Judicibus et al. |
| 8,588,240 B2 | 11/2013 | Ramankutty et al. |
| 8,589,541 B2 | 11/2013 | Raleigh et al. |
| 8,589,955 B2 | 11/2013 | Roundtree et al. |
| 8,594,665 B2 | 11/2013 | Anschutz |
| 8,595,186 B1 | 11/2013 | Mandyam et al. |
| 8,600,895 B2 | 12/2013 | Felsher |
| 8,601,125 B2 | 12/2013 | Huang et al. |
| 8,605,691 B2 | 12/2013 | Soomro et al. |
| 8,615,507 B2 | 12/2013 | Varadarajulu et al. |
| 8,619,735 B2 | 12/2013 | Montemurro et al. |
| 8,620,257 B2 | 12/2013 | Qiu et al. |
| 8,621,056 B2 | 12/2013 | Coussemaeker et al. |
| 8,626,115 B2 | 1/2014 | Raleigh et al. |
| 8,630,314 B2 | 1/2014 | York |
| 8,631,428 B2 | 1/2014 | Scott et al. |
| 8,634,425 B2 | 1/2014 | Gorti et al. |
| 8,635,164 B2 | 1/2014 | Rosenhaft et al. |
| 8,639,215 B2 | 1/2014 | McGregor et al. |
| 8,644,702 B1 | 2/2014 | Kalajan |
| 8,644,813 B1 | 2/2014 | Gailloux et al. |
| 8,645,518 B2 | 2/2014 | David |
| 8,655,357 B1 | 2/2014 | Gazzard et al. |
| 8,656,472 B2 | 2/2014 | McMurtry et al. |
| 8,660,853 B2 | 2/2014 | Robb et al. |
| 8,666,395 B2 | 3/2014 | Silver |
| 8,667,542 B1 | 3/2014 | Bertz et al. |
| 8,670,334 B2 | 3/2014 | Keohane et al. |
| 8,670,752 B2 | 3/2014 | Fan et al. |
| 8,675,852 B2 | 3/2014 | Maes |
| 8,676,682 B2 | 3/2014 | Kalliola |
| 8,676,925 B1 | 3/2014 | Liu et al. |
| 8,693,323 B1 | 4/2014 | McDysan |
| 8,694,772 B2 | 4/2014 | Kao et al. |
| 8,700,729 B2 | 4/2014 | Dua |
| 8,701,015 B2 | 4/2014 | Bonnat |
| 8,701,080 B2 | 4/2014 | Tripathi |
| 8,705,361 B2 | 4/2014 | Venkataraman et al. |
| 8,706,863 B2 | 4/2014 | Fadell |
| 8,712,631 B2 | 4/2014 | Tietjen et al. |
| 8,713,535 B2 | 4/2014 | Malhotra et al. |
| 8,713,641 B1 | 4/2014 | Pagan et al. |
| 8,719,397 B2 | 5/2014 | Levi et al. |
| 8,719,423 B2 | 5/2014 | Wyld |
| 8,725,899 B2 | 5/2014 | Short et al. |
| 8,730,842 B2 | 5/2014 | Collins et al. |
| 8,731,519 B2 | 5/2014 | Flynn et al. |
| 8,732,808 B2 | 5/2014 | Sewall et al. |
| 8,739,035 B2 | 5/2014 | Trethewey |
| 8,744,339 B2 | 6/2014 | Halfmann et al. |
| 8,761,711 B2 | 6/2014 | Grignani et al. |
| 8,780,857 B2 | 7/2014 | Balasubramanian et al. |
| 8,787,249 B2 | 7/2014 | Giaretta et al. |
| 8,793,304 B2 | 7/2014 | Lu et al. |
| 8,798,610 B2 | 8/2014 | Prakash et al. |
| 8,799,227 B2 | 8/2014 | Ferguson et al. |
| 8,804,517 B2 | 8/2014 | Oerton |
| 8,804,695 B2 | 8/2014 | Branam |
| 8,811,338 B2 | 8/2014 | Jin et al. |
| 8,811,991 B2 | 8/2014 | Jain et al. |
| 8,812,525 B1 | 8/2014 | Taylor, III |
| 8,818,394 B2 | 8/2014 | Bienas et al. |
| 8,819,253 B2 | 8/2014 | Simeloff et al. |
| 8,825,109 B2 | 9/2014 | Montemurro et al. |
| 8,826,411 B2 | 9/2014 | Moen et al. |
| 8,831,561 B2 | 9/2014 | Sutaria et al. |
| 8,837,322 B2 | 9/2014 | Venkataramanan et al. |
| 8,838,686 B2 | 9/2014 | Getchius |
| 8,838,752 B2 | 9/2014 | Lor et al. |
| 8,843,849 B2 | 9/2014 | Neil et al. |
| 8,845,415 B2 | 9/2014 | Lutnick et al. |
| 8,849,297 B2 | 9/2014 | Balasubramanian |
| 8,855,620 B2 | 10/2014 | Sievers et al. |
| 8,862,751 B2 | 10/2014 | Faccin et al. |
| 8,863,111 B2 | 10/2014 | Selitser et al. |
| 8,868,725 B2 | 10/2014 | Samba |
| 8,868,727 B2 | 10/2014 | Yumerefendi et al. |
| 8,875,042 B2 | 10/2014 | LeJeune et al. |
| 8,880,047 B2 | 11/2014 | Konicek et al. |
| 8,891,483 B2 | 11/2014 | Connelly et al. |
| 8,898,748 B2 | 11/2014 | Burks et al. |
| 8,908,516 B2 | 12/2014 | Tzamaloukas et al. |
| 8,929,374 B2 | 1/2015 | Tönsing et al. |
| 8,930,238 B2 | 1/2015 | Coffman et al. |
| 8,943,551 B2 | 1/2015 | Ganapathy et al. |
| 8,948,726 B2 | 2/2015 | Smith et al. |
| 8,949,382 B2 | 2/2015 | Cornett et al. |
| 8,949,597 B1 | 2/2015 | Reeves et al. |
| 8,955,038 B2 | 2/2015 | Nicodemus et al. |
| 8,966,018 B2 | 2/2015 | Bugwadia et al. |
| 8,971,841 B2 | 3/2015 | Menezes et al. |
| 8,971,912 B2 | 3/2015 | Chou et al. |
| 8,972,537 B2 | 3/2015 | Bastian et al. |
| 8,977,284 B2 | 3/2015 | Reed |
| 8,983,860 B1 | 3/2015 | Beda, III et al. |
| 8,995,952 B1 | 3/2015 | Baker et al. |
| 9,002,322 B2 | 4/2015 | Cotterill |
| 9,002,342 B2 | 4/2015 | Tenhunen et al. |
| 9,014,973 B2 | 4/2015 | Ruckart |
| 9,015,331 B2 | 4/2015 | Lai et al. |
| 9,030,934 B2 | 5/2015 | Shah et al. |
| 9,032,427 B2 | 5/2015 | Gallant et al. |
| 9,042,923 B1 | 5/2015 | Mirho |
| 9,049,010 B2 | 6/2015 | Jueneman et al. |
| 9,064,275 B1 | 6/2015 | Lu et al. |
| 9,105,031 B2 | 8/2015 | Shen et al. |
| 9,111,088 B2 | 8/2015 | Ghai et al. |
| 9,135,037 B1 | 9/2015 | Petrescu-Prahova et al. |
| 9,137,286 B1 | 9/2015 | Yuan |
| 9,137,389 B2 | 9/2015 | Neal et al. |
| 9,143,933 B2 | 9/2015 | Ikeda et al. |
| 9,154,826 B2 * | 10/2015 | Raleigh ............ H04N 21/25808 |
| 9,172,553 B2 | 10/2015 | Dawes et al. |
| 9,173,090 B2 | 10/2015 | Tuchman et al. |
| 9,176,913 B2 | 11/2015 | Millet et al. |
| 9,177,455 B2 | 11/2015 | Remer |
| 9,191,394 B2 | 11/2015 | Novak et al. |
| 9,282,460 B2 | 3/2016 | Souissi |
| 9,286,469 B2 | 3/2016 | Kraemer et al. |
| 9,286,604 B2 | 3/2016 | Aabye et al. |
| 9,313,708 B2 | 4/2016 | Nam et al. |
| 9,325,737 B2 | 4/2016 | Gutowski et al. |
| 9,326,173 B2 | 4/2016 | Luft |
| 9,344,557 B2 | 5/2016 | Gruchala et al. |
| 9,361,451 B2 | 6/2016 | Oberheide et al. |
| 9,363,285 B2 | 6/2016 | Kitamura |
| 9,367,680 B2 | 6/2016 | Mahaffey et al. |
| 9,369,959 B2 | 6/2016 | Ruutu et al. |
| 9,402,254 B2 | 7/2016 | Kneckt et al. |

(56) References Cited

U.S. PATENT DOCUMENTS

| | | |
|---|---|---|
| 9,413,546 B2 | 8/2016 | Meier et al. |
| 9,418,381 B2 | 8/2016 | Ahuja et al. |
| 9,459,767 B2 | 10/2016 | Cockcroft et al. |
| 9,497,563 B2* | 11/2016 | Hornung .............. H04W 4/50 |
| 9,501,803 B2 | 11/2016 | Bilac et al. |
| 9,589,117 B2 | 3/2017 | Ali et al. |
| 9,609,459 B2 | 3/2017 | Raleigh |
| 9,634,850 B2 | 4/2017 | Taft et al. |
| 9,755,842 B2 | 9/2017 | Raleigh et al. |
| 10,027,819 B2* | 7/2018 | Lu ....................... G06Q 10/10 |
| 10,064,033 B2* | 8/2018 | Raleigh .............. H04M 15/53 |
| 2001/0048738 A1 | 12/2001 | Baniak et al. |
| 2001/0053694 A1 | 12/2001 | Igarashi et al. |
| 2002/0013844 A1 | 1/2002 | Garrett et al. |
| 2002/0022472 A1 | 2/2002 | Watler et al. |
| 2002/0022483 A1 | 2/2002 | Thompson et al. |
| 2002/0049074 A1 | 4/2002 | Eisinger et al. |
| 2002/0099848 A1 | 7/2002 | Lee |
| 2002/0116338 A1 | 8/2002 | Gonthier et al. |
| 2002/0120370 A1 | 8/2002 | Parupudi et al. |
| 2002/0120540 A1 | 8/2002 | Kende et al. |
| 2002/0131404 A1 | 9/2002 | Mehta et al. |
| 2002/0138599 A1 | 9/2002 | Dilman et al. |
| 2002/0138601 A1 | 9/2002 | Piponius et al. |
| 2002/0154751 A1 | 10/2002 | Thompson et al. |
| 2002/0161601 A1 | 10/2002 | Nauer et al. |
| 2002/0164983 A1 | 11/2002 | Raviv et al. |
| 2002/0176377 A1 | 11/2002 | Hamilton |
| 2002/0188732 A1 | 12/2002 | Buckman et al. |
| 2002/0191573 A1 | 12/2002 | Whitehill et al. |
| 2002/0199001 A1 | 12/2002 | Wenocur et al. |
| 2003/0004937 A1 | 1/2003 | Salmenkaita et al. |
| 2003/0005112 A1 | 1/2003 | Krautkremer |
| 2003/0013434 A1 | 1/2003 | Rosenberg et al. |
| 2003/0018524 A1 | 1/2003 | Fishman et al. |
| 2003/0028623 A1 | 2/2003 | Hennessey et al. |
| 2003/0046396 A1 | 3/2003 | Richter et al. |
| 2003/0050070 A1 | 3/2003 | Mashinsky et al. |
| 2003/0050837 A1 | 3/2003 | Kim |
| 2003/0084321 A1 | 5/2003 | Tarquini et al. |
| 2003/0088671 A1 | 5/2003 | Klinker et al. |
| 2003/0133408 A1 | 7/2003 | Cheng et al. |
| 2003/0134650 A1 | 7/2003 | Sundar et al. |
| 2003/0159030 A1 | 8/2003 | Evans |
| 2003/0161265 A1 | 8/2003 | Cao et al. |
| 2003/0171112 A1 | 9/2003 | Lupper et al. |
| 2003/0182420 A1 | 9/2003 | Jones et al. |
| 2003/0182435 A1 | 9/2003 | Redlich et al. |
| 2003/0184793 A1 | 10/2003 | Pineau |
| 2003/0188006 A1 | 10/2003 | Bard |
| 2003/0188117 A1 | 10/2003 | Yoshino et al. |
| 2003/0191646 A1 | 10/2003 | D'Avello et al. |
| 2003/0220984 A1 | 11/2003 | Jones et al. |
| 2003/0224781 A1 | 12/2003 | Milford et al. |
| 2003/0229900 A1 | 12/2003 | Reisman |
| 2003/0233332 A1 | 12/2003 | Keeler et al. |
| 2003/0236745 A1 | 12/2003 | Hartsell et al. |
| 2004/0019539 A1 | 1/2004 | Raman et al. |
| 2004/0019564 A1 | 1/2004 | Goldthwaite et al. |
| 2004/0021697 A1 | 2/2004 | Beaton et al. |
| 2004/0024756 A1 | 2/2004 | Rickard |
| 2004/0030705 A1 | 2/2004 | Bowman-Amuah |
| 2004/0039792 A1 | 2/2004 | Nakanishi |
| 2004/0044623 A1 | 3/2004 | Wake et al. |
| 2004/0047358 A1 | 3/2004 | Chen et al. |
| 2004/0054779 A1 | 3/2004 | Takeshima et al. |
| 2004/0073672 A1 | 4/2004 | Fascenda |
| 2004/0082346 A1 | 4/2004 | Skytt et al. |
| 2004/0098715 A1 | 5/2004 | Aghera et al. |
| 2004/0102182 A1 | 5/2004 | Reith et al. |
| 2004/0103193 A1 | 5/2004 | Pandya et al. |
| 2004/0107360 A1 | 6/2004 | Herrmann et al. |
| 2004/0116140 A1 | 6/2004 | Babbar et al. |
| 2004/0127200 A1 | 7/2004 | Shaw et al. |
| 2004/0127208 A1 | 7/2004 | Nair et al. |
| 2004/0127256 A1 | 7/2004 | Goldthwaite et al. |
| 2004/0132427 A1 | 7/2004 | Lee et al. |
| 2004/0133668 A1 | 7/2004 | Nicholas, III |
| 2004/0137890 A1 | 7/2004 | Kalke |
| 2004/0165596 A1 | 8/2004 | Garcia et al. |
| 2004/0167958 A1 | 8/2004 | Stewart et al. |
| 2004/0168052 A1 | 8/2004 | Clisham et al. |
| 2004/0170191 A1 | 9/2004 | Guo et al. |
| 2004/0176104 A1 | 9/2004 | Arcens |
| 2004/0198331 A1 | 10/2004 | Coward et al. |
| 2004/0203755 A1 | 10/2004 | Brunet et al. |
| 2004/0203833 A1 | 10/2004 | Rathunde et al. |
| 2004/0225561 A1 | 11/2004 | Hertzberg et al. |
| 2004/0225898 A1 | 11/2004 | Frost et al. |
| 2004/0236547 A1 | 11/2004 | Rappaport et al. |
| 2004/0243680 A1 | 12/2004 | Mayer |
| 2004/0243992 A1 | 12/2004 | Gustafson et al. |
| 2004/0249918 A1 | 12/2004 | Sunshine |
| 2004/0255145 A1 | 12/2004 | Chow |
| 2004/0259534 A1 | 12/2004 | Chaudhari et al. |
| 2004/0260766 A1 | 12/2004 | Barros et al. |
| 2004/0267872 A1 | 12/2004 | Serdy et al. |
| 2005/0007993 A1 | 1/2005 | Chambers et al. |
| 2005/0009499 A1 | 1/2005 | Koster |
| 2005/0021995 A1 | 1/2005 | Lal et al. |
| 2005/0041617 A1 | 2/2005 | Huotar et al. |
| 2005/0048950 A1 | 3/2005 | Morper |
| 2005/0055291 A1 | 3/2005 | Bevente et al. |
| 2005/0055309 A1 | 3/2005 | Williams et al. |
| 2005/0055595 A1 | 3/2005 | Frazer et al. |
| 2005/0060266 A1 | 3/2005 | Demello et al. |
| 2005/0060525 A1 | 3/2005 | Schwartz et al. |
| 2005/0075115 A1 | 4/2005 | Corneille et al. |
| 2005/0079863 A1 | 4/2005 | Macaluso |
| 2005/0091505 A1 | 4/2005 | Riley et al. |
| 2005/0096024 A1 | 5/2005 | Bicker et al. |
| 2005/0097516 A1 | 5/2005 | Donnelly et al. |
| 2005/0107091 A1 | 5/2005 | Vannithamby et al. |
| 2005/0108075 A1 | 5/2005 | Douglis et al. |
| 2005/0111463 A1 | 5/2005 | Leung et al. |
| 2005/0128967 A1 | 6/2005 | Scobbie |
| 2005/0135264 A1 | 6/2005 | Popoff et al. |
| 2005/0163320 A1 | 7/2005 | Brown et al. |
| 2005/0166043 A1 | 7/2005 | Zhang et al. |
| 2005/0183143 A1 | 8/2005 | Anderholm et al. |
| 2005/0186948 A1 | 8/2005 | Gallagher et al. |
| 2005/0198377 A1 | 9/2005 | Ferguson et al. |
| 2005/0216421 A1 | 9/2005 | Barry et al. |
| 2005/0228985 A1 | 10/2005 | Ylikoski et al. |
| 2005/0238046 A1 | 10/2005 | Hassan et al. |
| 2005/0239447 A1 | 10/2005 | Holzman et al. |
| 2005/0245241 A1 | 11/2005 | Durand et al. |
| 2005/0246282 A1 | 11/2005 | Naslund et al. |
| 2005/0250508 A1 | 11/2005 | Guo et al. |
| 2005/0250536 A1 | 11/2005 | Deng et al. |
| 2005/0254435 A1 | 11/2005 | Moakley et al. |
| 2005/0266825 A1 | 12/2005 | Clayton |
| 2005/0266880 A1 | 12/2005 | Gupta |
| 2006/0014519 A1 | 1/2006 | Marsh et al. |
| 2006/0019632 A1 | 1/2006 | Cunningham et al. |
| 2006/0020787 A1 | 1/2006 | Choyi et al. |
| 2006/0026679 A1 | 2/2006 | Zakas |
| 2006/0030306 A1 | 2/2006 | Kuhn |
| 2006/0034256 A1 | 2/2006 | Addagatla et al. |
| 2006/0035631 A1 | 2/2006 | White et al. |
| 2006/0040642 A1 | 2/2006 | Boris et al. |
| 2006/0045245 A1 | 3/2006 | Aaron et al. |
| 2006/0048223 A1 | 3/2006 | Lee et al. |
| 2006/0068796 A1 | 3/2006 | Millen et al. |
| 2006/0072451 A1 | 4/2006 | Ross |
| 2006/0072550 A1 | 4/2006 | Davis et al. |
| 2006/0072646 A1 | 4/2006 | Feher |
| 2006/0075506 A1 | 4/2006 | Sanda et al. |
| 2006/0085543 A1 | 4/2006 | Hrastar et al. |
| 2006/0095517 A1 | 5/2006 | O'Connor et al. |
| 2006/0098627 A1 | 5/2006 | Karaoguz et al. |
| 2006/0099970 A1 | 5/2006 | Morgan et al. |
| 2006/0101507 A1 | 5/2006 | Camenisch |
| 2006/0112016 A1 | 5/2006 | Ishibashi |

(56) References Cited

U.S. PATENT DOCUMENTS

| | | |
|---|---|---|
| 2006/0114821 A1 | 6/2006 | Willey et al. |
| 2006/0114832 A1 | 6/2006 | Hamilton et al. |
| 2006/0126562 A1 | 6/2006 | Liu |
| 2006/0135144 A1 | 6/2006 | Jothipragasam |
| 2006/0136882 A1 | 6/2006 | Noonan et al. |
| 2006/0143066 A1 | 6/2006 | Calabria |
| 2006/0143098 A1 | 6/2006 | Lazaridis |
| 2006/0156398 A1 | 7/2006 | Ross et al. |
| 2006/0160536 A1 | 7/2006 | Chou |
| 2006/0165060 A1 | 7/2006 | Dua |
| 2006/0168128 A1 | 7/2006 | Sistla et al. |
| 2006/0173959 A1 | 8/2006 | Mckelvie et al. |
| 2006/0174035 A1 | 8/2006 | Tufail |
| 2006/0178917 A1 | 8/2006 | Merriam et al. |
| 2006/0178918 A1 | 8/2006 | Mikurak |
| 2006/0182137 A1 | 8/2006 | Zhou et al. |
| 2006/0183462 A1 | 8/2006 | Kolehmainen |
| 2006/0190314 A1 | 8/2006 | Hernandez |
| 2006/0190987 A1 | 8/2006 | Ohta et al. |
| 2006/0193280 A1 | 8/2006 | Lee et al. |
| 2006/0199608 A1 | 9/2006 | Dunn et al. |
| 2006/0200663 A1 | 9/2006 | Thornton |
| 2006/0206709 A1 | 9/2006 | Labrou et al. |
| 2006/0206904 A1 | 9/2006 | Watkins et al. |
| 2006/0218395 A1 | 9/2006 | Maes |
| 2006/0233108 A1 | 10/2006 | Krishnan |
| 2006/0233166 A1 | 10/2006 | Bou-Diab et al. |
| 2006/0236095 A1 | 10/2006 | Smith et al. |
| 2006/0242685 A1 | 10/2006 | Heard et al. |
| 2006/0258341 A1 | 11/2006 | Miller et al. |
| 2006/0277590 A1 | 12/2006 | Limont et al. |
| 2006/0291419 A1 | 12/2006 | McConnell et al. |
| 2006/0291477 A1 | 12/2006 | Croak et al. |
| 2007/0005795 A1 | 1/2007 | Gonzalez |
| 2007/0019670 A1 | 1/2007 | Falardeau |
| 2007/0022289 A1 | 1/2007 | Alt et al. |
| 2007/0025301 A1 | 2/2007 | Petersson et al. |
| 2007/0033194 A1 | 2/2007 | Srinivas et al. |
| 2007/0033197 A1 | 2/2007 | Scherzer et al. |
| 2007/0036312 A1 | 2/2007 | Cai et al. |
| 2007/0055694 A1 | 3/2007 | Ruge et al. |
| 2007/0060200 A1 | 3/2007 | Boris et al. |
| 2007/0061243 A1 | 3/2007 | Ramer et al. |
| 2007/0061800 A1 | 3/2007 | Cheng et al. |
| 2007/0061878 A1 | 3/2007 | Hagiu et al. |
| 2007/0073899 A1 | 3/2007 | Judge et al. |
| 2007/0076616 A1 | 4/2007 | Ngo et al. |
| 2007/0093243 A1 | 4/2007 | Kapadekar et al. |
| 2007/0100981 A1 | 5/2007 | Adamczyk et al. |
| 2007/0101426 A1 | 5/2007 | Lee et al. |
| 2007/0104126 A1 | 5/2007 | Calhoun et al. |
| 2007/0109983 A1 | 5/2007 | Shankar et al. |
| 2007/0111740 A1 | 5/2007 | Wandel |
| 2007/0130283 A1 | 6/2007 | Klein et al. |
| 2007/0130315 A1 | 6/2007 | Friend et al. |
| 2007/0140113 A1 | 6/2007 | Gemelos |
| 2007/0140145 A1 | 6/2007 | Kumar et al. |
| 2007/0140275 A1 | 6/2007 | Bowman et al. |
| 2007/0143824 A1 | 6/2007 | Shahbazi |
| 2007/0147317 A1 | 6/2007 | Smith et al. |
| 2007/0147324 A1 | 6/2007 | McGary |
| 2007/0155365 A1 | 7/2007 | Kim et al. |
| 2007/0165630 A1 | 7/2007 | Rasanen et al. |
| 2007/0168499 A1 | 7/2007 | Chu |
| 2007/0171856 A1 | 7/2007 | Bruce et al. |
| 2007/0174490 A1 | 7/2007 | Choi et al. |
| 2007/0191006 A1 | 8/2007 | Carpenter |
| 2007/0192460 A1 | 8/2007 | Choi et al. |
| 2007/0198656 A1 | 8/2007 | Mazzaferri et al. |
| 2007/0201502 A1 | 8/2007 | Abramson |
| 2007/0213054 A1 | 9/2007 | Han |
| 2007/0220251 A1 | 9/2007 | Rosenberg et al. |
| 2007/0226225 A1 | 9/2007 | Yiu et al. |
| 2007/0226775 A1 | 9/2007 | Andreasen et al. |
| 2007/0234402 A1 | 10/2007 | Khosravi et al. |
| 2007/0243862 A1 | 10/2007 | Coskun et al. |
| 2007/0248100 A1 | 10/2007 | Zuberi et al. |
| 2007/0254646 A1 | 11/2007 | Sokondar |
| 2007/0254675 A1 | 11/2007 | Zorlu Ozer et al. |
| 2007/0255769 A1 | 11/2007 | Agrawal et al. |
| 2007/0255797 A1 | 11/2007 | Dunn et al. |
| 2007/0255848 A1 | 11/2007 | Sewall et al. |
| 2007/0257767 A1 | 11/2007 | Beeson |
| 2007/0259656 A1 | 11/2007 | Jeong |
| 2007/0259673 A1 | 11/2007 | Willars et al. |
| 2007/0263558 A1 | 11/2007 | Salomone |
| 2007/0266422 A1 | 11/2007 | Germano et al. |
| 2007/0274327 A1 | 11/2007 | Kaarela et al. |
| 2007/0280453 A1 | 12/2007 | Kelley |
| 2007/0282896 A1 | 12/2007 | Wydroug et al. |
| 2007/0293191 A1 | 12/2007 | Mir et al. |
| 2007/0294395 A1 | 12/2007 | Strub et al. |
| 2007/0294410 A1 | 12/2007 | Pandya et al. |
| 2007/0297378 A1 | 12/2007 | Poyhonen et al. |
| 2007/0298764 A1 | 12/2007 | Clayton |
| 2007/0299965 A1 | 12/2007 | Nieh et al. |
| 2007/0300252 A1 | 12/2007 | Acharya et al. |
| 2008/0005285 A1 | 1/2008 | Robinson et al. |
| 2008/0005561 A1 | 1/2008 | Brown et al. |
| 2008/0010379 A1 | 1/2008 | Zhao |
| 2008/0010452 A1 | 1/2008 | Holtzman et al. |
| 2008/0018494 A1 | 1/2008 | Waite et al. |
| 2008/0022354 A1 | 1/2008 | Grewal et al. |
| 2008/0025230 A1 | 1/2008 | Patel et al. |
| 2008/0032715 A1 | 2/2008 | Jia et al. |
| 2008/0034063 A1 | 2/2008 | Yee |
| 2008/0034419 A1 | 2/2008 | Mullick et al. |
| 2008/0039102 A1 | 2/2008 | Sewall et al. |
| 2008/0049630 A1 | 2/2008 | Kozisek et al. |
| 2008/0050715 A1 | 2/2008 | Golczewski et al. |
| 2008/0051076 A1 | 2/2008 | O'Shaughnessy et al. |
| 2008/0052387 A1 | 2/2008 | Heinz et al. |
| 2008/0056273 A1 | 3/2008 | Pelletier et al. |
| 2008/0059474 A1 | 3/2008 | Lim |
| 2008/0059743 A1 | 3/2008 | Bychkov et al. |
| 2008/0060066 A1 | 3/2008 | Wynn et al. |
| 2008/0062900 A1 | 3/2008 | Rao |
| 2008/0064367 A1 | 3/2008 | Nath et al. |
| 2008/0066149 A1 | 3/2008 | Lim |
| 2008/0066150 A1 | 3/2008 | Lim |
| 2008/0066181 A1 | 3/2008 | Haveson et al. |
| 2008/0070550 A1 | 3/2008 | Hose |
| 2008/0077705 A1 | 3/2008 | Li et al. |
| 2008/0080457 A1 | 4/2008 | Cole |
| 2008/0081606 A1 | 4/2008 | Cole |
| 2008/0082643 A1 | 4/2008 | Storrie et al. |
| 2008/0083013 A1 | 4/2008 | Soliman et al. |
| 2008/0085707 A1 | 4/2008 | Fadell |
| 2008/0089295 A1 | 4/2008 | Keeler et al. |
| 2008/0089303 A1 | 4/2008 | Wirtanen et al. |
| 2008/0095339 A1 | 4/2008 | Elliott et al. |
| 2008/0096559 A1 | 4/2008 | Phillips et al. |
| 2008/0098062 A1 | 4/2008 | Balia |
| 2008/0109679 A1 | 5/2008 | Wright et al. |
| 2008/0120129 A1 | 5/2008 | Seubert et al. |
| 2008/0120668 A1 | 5/2008 | Yau |
| 2008/0120688 A1 | 5/2008 | Qiu et al. |
| 2008/0125079 A1 | 5/2008 | O'Neil et al. |
| 2008/0126287 A1 | 5/2008 | Cox et al. |
| 2008/0127304 A1 | 5/2008 | Ginter et al. |
| 2008/0130534 A1 | 6/2008 | Tomioka |
| 2008/0130656 A1 | 6/2008 | Kim et al. |
| 2008/0132201 A1 | 6/2008 | Karlberg |
| 2008/0132268 A1 | 6/2008 | Choi-Grogan et al. |
| 2008/0134330 A1 | 6/2008 | Kapoor et al. |
| 2008/0139210 A1 | 6/2008 | Gisby et al. |
| 2008/0147454 A1 | 6/2008 | Walker et al. |
| 2008/0160958 A1 | 7/2008 | Abichandani et al. |
| 2008/0162637 A1 | 7/2008 | Adamczyk et al. |
| 2008/0162704 A1 | 7/2008 | Poplett et al. |
| 2008/0164304 A1 | 7/2008 | Narasimhan et al. |
| 2008/0166993 A1 | 7/2008 | Gautier et al. |
| 2008/0167027 A1 | 7/2008 | Gautier et al. |
| 2008/0167033 A1 | 7/2008 | Beckers |

(56) References Cited

U.S. PATENT DOCUMENTS

| | | |
|---|---|---|
| 2008/0168275 A1 | 7/2008 | DeAtley et al. |
| 2008/0168523 A1 | 7/2008 | Ansari et al. |
| 2008/0177998 A1 | 7/2008 | Apsangi et al. |
| 2008/0178300 A1 | 7/2008 | Brown et al. |
| 2008/0183812 A1 | 7/2008 | Paul et al. |
| 2008/0184127 A1 | 7/2008 | Rafey et al. |
| 2008/0189760 A1 | 8/2008 | Rosenberg et al. |
| 2008/0201266 A1 | 8/2008 | Chua et al. |
| 2008/0207167 A1 | 8/2008 | Bugenhagen |
| 2008/0212470 A1 | 9/2008 | Castaneda et al. |
| 2008/0212751 A1 | 9/2008 | Chung |
| 2008/0219268 A1 | 9/2008 | Dennison |
| 2008/0221951 A1 | 9/2008 | Stanforth et al. |
| 2008/0222692 A1 | 9/2008 | Andersson et al. |
| 2008/0225748 A1 | 9/2008 | Khemani et al. |
| 2008/0229385 A1 | 9/2008 | Feder et al. |
| 2008/0229388 A1 | 9/2008 | Maes |
| 2008/0235511 A1 | 9/2008 | O'Brien et al. |
| 2008/0240373 A1 | 10/2008 | Wilhelm |
| 2008/0250053 A1 | 10/2008 | Aaltonen et al. |
| 2008/0256593 A1 | 10/2008 | Vinberg et al. |
| 2008/0259924 A1 | 10/2008 | Gooch et al. |
| 2008/0262798 A1 | 10/2008 | Kim et al. |
| 2008/0263348 A1 | 10/2008 | Zaltsman et al. |
| 2008/0268813 A1 | 10/2008 | Maes |
| 2008/0270212 A1 | 10/2008 | Blight et al. |
| 2008/0279216 A1 | 11/2008 | Sharif-Ahmadi et al. |
| 2008/0282319 A1 | 11/2008 | Fontijn et al. |
| 2008/0293395 A1 | 11/2008 | Mathews et al. |
| 2008/0298230 A1 | 12/2008 | Luft et al. |
| 2008/0305793 A1 | 12/2008 | Gallagher et al. |
| 2008/0311885 A1 | 12/2008 | Dawson et al. |
| 2008/0313315 A1 | 12/2008 | Karaoguz et al. |
| 2008/0313730 A1 | 12/2008 | Iftimie et al. |
| 2008/0316923 A1 | 12/2008 | Fedders et al. |
| 2008/0318547 A1 | 12/2008 | Ballou et al. |
| 2008/0318550 A1 | 12/2008 | DeAtley |
| 2008/0319879 A1 | 12/2008 | Carroll et al. |
| 2008/0320497 A1 | 12/2008 | Tarkoma et al. |
| 2009/0005000 A1 | 1/2009 | Baker et al. |
| 2009/0005005 A1 | 1/2009 | Forstall et al. |
| 2009/0006116 A1 | 1/2009 | Baker et al. |
| 2009/0006200 A1 | 1/2009 | Baker et al. |
| 2009/0006229 A1 | 1/2009 | Sweeney et al. |
| 2009/0013157 A1 | 1/2009 | Beaule |
| 2009/0016310 A1 | 1/2009 | Rasal |
| 2009/0036111 A1 | 2/2009 | Danford et al. |
| 2009/0042536 A1 | 2/2009 | Bernard et al. |
| 2009/0044185 A1 | 2/2009 | Krivopaltsev |
| 2009/0046707 A1 | 2/2009 | Smires et al. |
| 2009/0046723 A1 | 2/2009 | Rahman et al. |
| 2009/0047989 A1 | 2/2009 | Harmon et al. |
| 2009/0048913 A1 | 2/2009 | Shenfield et al. |
| 2009/0049156 A1 | 2/2009 | Aronsson et al. |
| 2009/0049518 A1 | 2/2009 | Roman et al. |
| 2009/0054030 A1 | 2/2009 | Golds |
| 2009/0065571 A1 | 3/2009 | Jain |
| 2009/0067372 A1 | 3/2009 | Shah et al. |
| 2009/0068984 A1 | 3/2009 | Burnett |
| 2009/0070379 A1 | 3/2009 | Rappaport |
| 2009/0077622 A1 | 3/2009 | Baum et al. |
| 2009/0079699 A1 | 3/2009 | Sun |
| 2009/0113514 A1 | 4/2009 | Hu |
| 2009/0125619 A1 | 5/2009 | Antani |
| 2009/0132860 A1 | 5/2009 | Liu et al. |
| 2009/0149154 A1 | 6/2009 | Bhasin et al. |
| 2009/0157792 A1 | 6/2009 | Fiatal |
| 2009/0163173 A1 | 6/2009 | Williams |
| 2009/0172077 A1 | 7/2009 | Roxburgh et al. |
| 2009/0180391 A1 | 7/2009 | Petersen et al. |
| 2009/0181662 A1 | 7/2009 | Fleischman et al. |
| 2009/0197585 A1 | 8/2009 | Aaron |
| 2009/0197612 A1 | 8/2009 | Kiiskinen |
| 2009/0203352 A1 | 8/2009 | Fordon et al. |
| 2009/0217364 A1 | 8/2009 | Salmela et al. |
| 2009/0219170 A1 | 9/2009 | Clark et al. |
| 2009/0248883 A1 | 10/2009 | Suryanarayana et al. |
| 2009/0254857 A1 | 10/2009 | Romine et al. |
| 2009/0257379 A1 | 10/2009 | Robinson et al. |
| 2009/0271514 A1 | 10/2009 | Thomas et al. |
| 2009/0282127 A1 | 11/2009 | Leblanc et al. |
| 2009/0286507 A1 | 11/2009 | O'Neil et al. |
| 2009/0287921 A1 | 11/2009 | Zhu et al. |
| 2009/0288140 A1 | 11/2009 | Huber et al. |
| 2009/0291665 A1 | 11/2009 | Gaskarth et al. |
| 2009/0299857 A1 | 12/2009 | Brubaker |
| 2009/0307696 A1 | 12/2009 | Vals et al. |
| 2009/0307746 A1 | 12/2009 | Di et al. |
| 2009/0315735 A1 | 12/2009 | Bhavani et al. |
| 2009/0320110 A1 | 12/2009 | Nicolson et al. |
| 2010/0017506 A1 | 1/2010 | Fadell |
| 2010/0020822 A1 | 1/2010 | Zerillo et al. |
| 2010/0027469 A1 | 2/2010 | Gurajala et al. |
| 2010/0027559 A1 | 2/2010 | Lin et al. |
| 2010/0030890 A1 | 2/2010 | Dutta et al. |
| 2010/0041364 A1 | 2/2010 | Lott et al. |
| 2010/0041365 A1 | 2/2010 | Lott et al. |
| 2010/0042675 A1 | 2/2010 | Fujii |
| 2010/0043068 A1 | 2/2010 | Varadhan et al. |
| 2010/0069074 A1 | 3/2010 | Kodialam et al. |
| 2010/0071053 A1 | 3/2010 | Ansari et al. |
| 2010/0075666 A1 | 3/2010 | Garner |
| 2010/0077035 A1 | 3/2010 | Li et al. |
| 2010/0080202 A1 | 4/2010 | Hanson |
| 2010/0082431 A1 | 4/2010 | Ramer et al. |
| 2010/0088387 A1 | 4/2010 | Calamera |
| 2010/0103820 A1 | 4/2010 | Fuller et al. |
| 2010/0113020 A1 | 5/2010 | Subramanian et al. |
| 2010/0121744 A1 | 5/2010 | Belz et al. |
| 2010/0131584 A1 | 5/2010 | Johnson |
| 2010/0142478 A1 | 6/2010 | Forssell et al. |
| 2010/0144310 A1 | 6/2010 | Bedingfield |
| 2010/0151866 A1 | 6/2010 | Karpov et al. |
| 2010/0153781 A1 | 6/2010 | Hanna |
| 2010/0167696 A1 | 7/2010 | Smith et al. |
| 2010/0188975 A1 | 7/2010 | Raleigh |
| 2010/0188990 A1 | 7/2010 | Raleigh |
| 2010/0188992 A1 | 7/2010 | Raleigh |
| 2010/0188994 A1 | 7/2010 | Raleigh |
| 2010/0190469 A1 | 7/2010 | Vanderveen et al. |
| 2010/0191576 A1 | 7/2010 | Raleigh |
| 2010/0191612 A1 | 7/2010 | Raleigh |
| 2010/0191846 A1 | 7/2010 | Raleigh |
| 2010/0192170 A1 | 7/2010 | Raleigh |
| 2010/0192212 A1 | 7/2010 | Raleigh |
| 2010/0195503 A1 | 8/2010 | Raleigh |
| 2010/0197268 A1 | 8/2010 | Raleigh |
| 2010/0198698 A1 | 8/2010 | Raleigh et al. |
| 2010/0198939 A1 | 8/2010 | Raleigh |
| 2010/0227632 A1 | 9/2010 | Bell et al. |
| 2010/0235329 A1 | 9/2010 | Koren et al. |
| 2010/0241544 A1 | 9/2010 | Benson et al. |
| 2010/0248719 A1 | 9/2010 | Scholaert |
| 2010/0284327 A1 | 11/2010 | Miklos |
| 2010/0284388 A1 | 11/2010 | Fantini et al. |
| 2010/0287599 A1 | 11/2010 | He et al. |
| 2010/0311402 A1 | 12/2010 | Srinivasan et al. |
| 2010/0318652 A1 | 12/2010 | Samba |
| 2010/0325420 A1 | 12/2010 | Kanekar |
| 2011/0004917 A1 | 1/2011 | Saisa et al. |
| 2011/0013569 A1 | 1/2011 | Scherzer et al. |
| 2011/0019574 A1 | 1/2011 | Malomsoky et al. |
| 2011/0081881 A1 | 4/2011 | Baker et al. |
| 2011/0082790 A1 | 4/2011 | Baker et al. |
| 2011/0110309 A1 | 5/2011 | Bennett |
| 2011/0126141 A1 | 5/2011 | King et al. |
| 2011/0145920 A1 | 6/2011 | Mahaffey et al. |
| 2011/0159818 A1 | 6/2011 | Scherzer et al. |
| 2011/0173678 A1 | 7/2011 | Kaippallimalil et al. |
| 2011/0177811 A1 | 7/2011 | Heckman et al. |
| 2011/0185202 A1 | 7/2011 | Black et al. |
| 2011/0195700 A1 | 8/2011 | Kukuchka et al. |
| 2011/0238545 A1 | 9/2011 | Fanaian et al. |
| 2011/0241624 A1 | 10/2011 | Park et al. |

(56) References Cited

U.S. PATENT DOCUMENTS

| | | | |
|---|---|---|---|
| 2011/0244837 A1 | 10/2011 | Murata et al. | |
| 2011/0249668 A1 | 10/2011 | Milligan et al. | |
| 2011/0252430 A1 | 10/2011 | Chapman et al. | |
| 2011/0264923 A1 | 10/2011 | Kocher et al. | |
| 2011/0277019 A1 | 11/2011 | Pritchard, Jr. | |
| 2012/0020296 A1 | 1/2012 | Scherzer et al. | |
| 2012/0029718 A1 | 2/2012 | Davis | |
| 2012/0101952 A1 | 4/2012 | Raleigh et al. | |
| 2012/0108225 A1 | 5/2012 | Luna et al. | |
| 2012/0144025 A1 | 6/2012 | Melander et al. | |
| 2012/0155296 A1 | 6/2012 | Kashanian | |
| 2012/0166364 A1 | 6/2012 | Ahmad et al. | |
| 2012/0166604 A1 | 6/2012 | Fortier et al. | |
| 2012/0196644 A1 | 8/2012 | Scherzer et al. | |
| 2012/0238287 A1 | 9/2012 | Scherzer | |
| 2012/0330792 A1 | 12/2012 | Kashanian | |
| 2013/0024914 A1 | 1/2013 | Ahmed et al. | |
| 2013/0029653 A1 | 1/2013 | Baker et al. | |
| 2013/0030960 A1 | 1/2013 | Kashanian | |
| 2013/0058274 A1 | 3/2013 | Scherzer et al. | |
| 2013/0065555 A1 | 3/2013 | Baker et al. | |
| 2013/0072177 A1 | 3/2013 | Ross et al. | |
| 2013/0084835 A1 | 4/2013 | Scherzer et al. | |
| 2013/0095787 A1 | 4/2013 | Kashanian | |
| 2013/0103376 A1 | 4/2013 | Gaddam et al. | |
| 2013/0111572 A1 | 5/2013 | Gaddam et al. | |
| 2013/0117140 A1 | 5/2013 | Kashanian | |
| 2013/0117382 A1 | 5/2013 | Gaddam et al. | |
| 2013/0144789 A1 | 6/2013 | Aaltonen et al. | |
| 2013/0149994 A1 | 6/2013 | Gaddam et al. | |
| 2013/0183937 A1 | 7/2013 | Neal et al. | |
| 2013/0225151 A1 | 8/2013 | King et al. | |
| 2013/0326356 A9 | 12/2013 | Zheng et al. | |
| 2014/0073291 A1 | 3/2014 | Hildner et al. | |
| 2014/0241342 A1 | 8/2014 | Constantinof | |
| 2015/0181628 A1 | 6/2015 | Haverinen et al. | |
| 2016/0026964 A1* | 1/2016 | Rogers | H04W 4/021 705/7.15 |
| 2016/0057628 A1* | 2/2016 | Sewall | H04L 65/1066 455/406 |

FOREIGN PATENT DOCUMENTS

| | | |
|---|---|---|
| CN | 1345154 A | 4/2002 |
| CN | 1508734 A | 6/2004 |
| CN | 1538730 A | 10/2004 |
| CN | 1567818 A | 1/2005 |
| CN | 101035308 A | 3/2006 |
| CN | 1801829 A | 7/2006 |
| CN | 1802839 A | 7/2006 |
| CN | 1889777 A | 7/2006 |
| CN | 101155343 B | 9/2006 |
| CN | 1867024 A | 11/2006 |
| CN | 1878160 A | 12/2006 |
| CN | 1937511 A | 3/2007 |
| CN | 101123553 A | 9/2007 |
| CN | 101080055 A | 11/2007 |
| CN | 101115248 A | 1/2008 |
| CN | 101127988 A | 2/2008 |
| CN | 101183958 A | 5/2008 |
| CN | 101335666 A | 12/2008 |
| CN | 101341764 A | 1/2009 |
| CN | 101815275 A | 8/2010 |
| EP | 1098490 A2 | 5/2001 |
| EP | 1289326 A1 | 3/2003 |
| EP | 1463238 | 9/2004 |
| EP | 1503548 A1 | 2/2005 |
| EP | 1545114 A1 | 6/2005 |
| EP | 1739518 | 1/2007 |
| EP | 1772988 | 4/2007 |
| EP | 1850575 A1 | 10/2007 |
| EP | 1887732 A1 | 2/2008 |
| EP | 1942698 A1 | 7/2008 |
| EP | 1978772 | 10/2008 |
| EP | 2007065 A1 | 12/2008 |
| EP | 2026514 A1 | 2/2009 |
| EP | 2466831 A1 | 6/2012 |
| JP | 3148713 B2 | 3/2001 |
| JP | 2005339247 A | 12/2005 |
| JP | 2006041989 | 2/2006 |
| JP | 2006155263 A | 6/2006 |
| JP | 2006197137 | 7/2006 |
| JP | 2006344007 A | 12/2006 |
| JP | 2007318354 A | 12/2007 |
| JP | 2008301121 A | 12/2008 |
| JP | 2009111919 | 5/2009 |
| JP | 2009212707 A | 9/2009 |
| JP | 2009218773 | 9/2009 |
| JP | 2009232107 A | 10/2009 |
| KR | 20040053858 A | 6/2004 |
| WO | 1998058505 | 12/1998 |
| WO | 1999027723 | 6/1999 |
| WO | 1999065185 | 12/1999 |
| WO | 0208863 | 1/2002 |
| WO | 2002045315 A2 | 6/2002 |
| WO | 2002067616 A1 | 8/2002 |
| WO | 2002093877 A1 | 11/2002 |
| WO | 2003014891 | 2/2003 |
| WO | 2003017063 A2 | 2/2003 |
| WO | 2003017065 A2 | 2/2003 |
| WO | 2003058880 | 7/2003 |
| WO | 2004028070 | 4/2004 |
| WO | 2004064306 A2 | 7/2004 |
| WO | 2004077797 | 9/2004 |
| WO | 2004095753 | 11/2004 |
| WO | 2005008995 | 1/2005 |
| WO | 2005053335 A1 | 6/2005 |
| WO | 2005083934 A1 | 9/2005 |
| WO | 2006004467 | 1/2006 |
| WO | 2006004784 A1 | 1/2006 |
| WO | 2006012610 A2 | 2/2006 |
| WO | 2006050758 | 5/2006 |
| WO | 2006073837 | 7/2006 |
| WO | 2006077481 | 7/2006 |
| WO | 2006093961 A1 | 9/2006 |
| WO | 2006120558 | 11/2006 |
| WO | 2006130960 | 12/2006 |
| WO | 2007001833 | 1/2007 |
| WO | 2007014630 | 2/2007 |
| WO | 2007018363 | 2/2007 |
| WO | 2007053848 | 5/2007 |
| WO | 2007068288 | 6/2007 |
| WO | 2007069245 | 6/2007 |
| WO | 2007097786 A | 8/2007 |
| WO | 2007107701 | 9/2007 |
| WO | 2007120310 | 10/2007 |
| WO | 2007124279 | 11/2007 |
| WO | 2007126352 | 11/2007 |
| WO | 2007129180 A2 | 11/2007 |
| WO | 2007133844 A | 11/2007 |
| WO | 2008017837 | 2/2008 |
| WO | 2008051379 | 5/2008 |
| WO | 2008066419 | 6/2008 |
| WO | 2008080139 | 7/2008 |
| WO | 2008080430 A1 | 7/2008 |
| WO | 2008099802 | 8/2008 |
| WO | 2009008817 A1 | 1/2009 |
| WO | 2009091295 A1 | 7/2009 |
| WO | 2010088413 | 8/2010 |
| WO | 2010128391 A2 | 11/2010 |
| WO | 2010128391 A3 | 1/2011 |
| WO | 2011002450 A1 | 1/2011 |
| WO | 2011149532 A1 | 12/2011 |
| WO | 2012047275 A | 4/2012 |

* cited by examiner

| Filter | Policy Event Notification | | Promotional Notification | LCPE Notification | |
|---|---|---|---|---|---|
| 80% Cycle Application Plans | 80% Cycle Application Plans | x <hours or minutes> remaining — *English (UK)* | ${plan} — *English (UK)* | You have now x <hours or minutes> remaining of your (app name) access plan. — *English (UK)* | *English (UK)* • "View Catalogue" → catalog • "Dismiss" → no_action, Default |
| 80% Usage General Access | 80% Usage General Access | 80% Used — *English (UK)* | ${plan} — *English (UK)* | You have now 20% remaining of your mobile internet access plan. — *English (UK)* | *English (UK)* • "Dismiss" → no_action • "View Catalogue" → catalog, Default |
| Marketing Interceptor | Marketing Interceptor | Select a plan — *English (UK)* | Purchase access for ${app} — *English (UK)* | Select Plan to access ${app} — *English (UK)* | — *English (UK)* | *English (UK)* • "Dismiss" → no_action • "View Catalogue" → catalog, Default |
| Plan Expiration | Plan Expiration | Plan expired — *English (UK)* | ${plan} — *English (UK)* | Your plan has expired — *English (UK)* | Your mobile internet access (or app name) plan has now expired. — *English (UK)* | *English (UK)* • "Dismiss" |

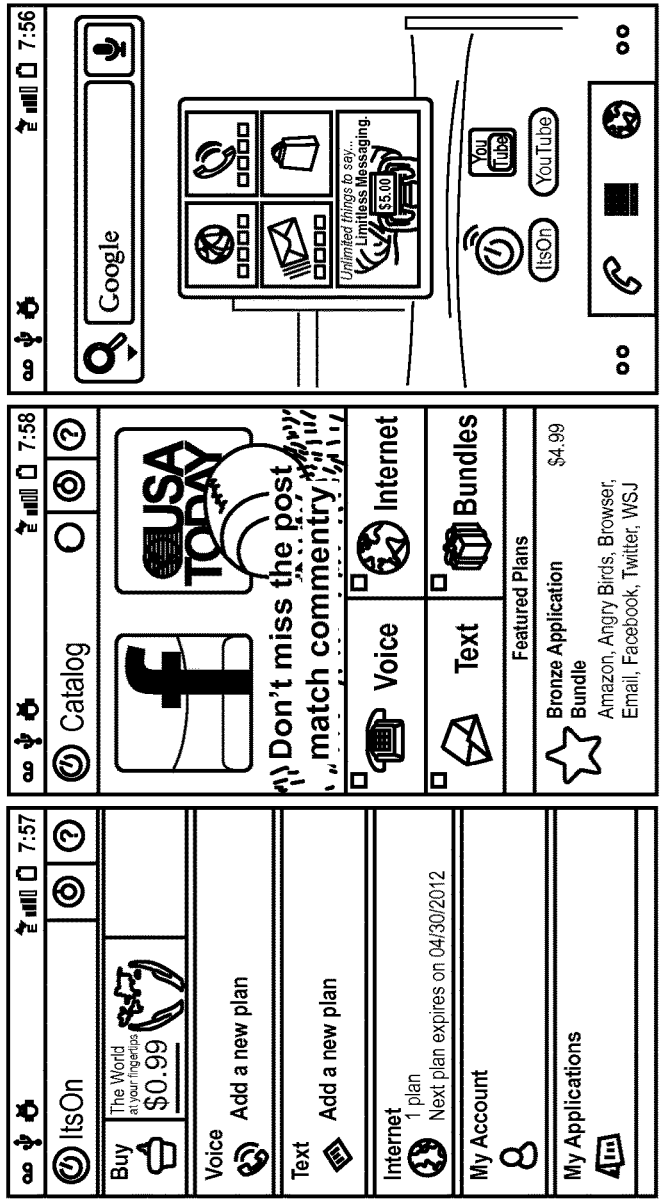
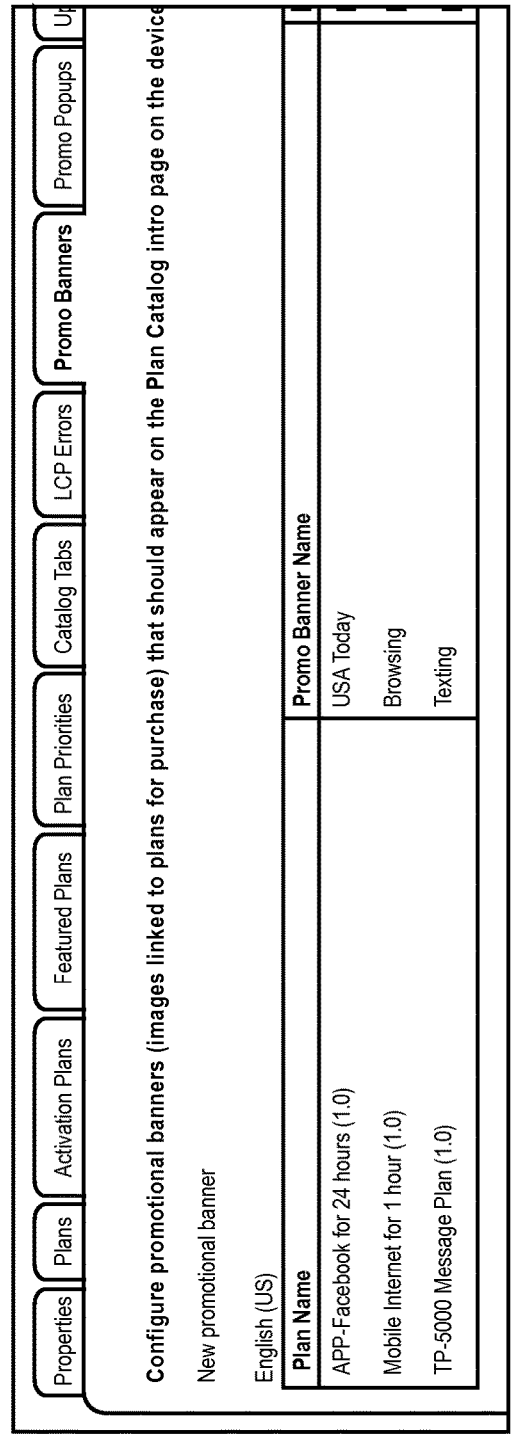
FIG. 27

Drag plans to change their display order:

| Display Order | Plan Name | Plan Version | Description |
|---|---|---|---|
| 1 ↔ | ☆ Bronze Application Bundle | 1.0 | 30 hours a month with access to the following applications: Amazon, Angry Birds, Browser, Email, Facebook, Twitter and Wall Street Journal. |
| 2 ↔ | 🌐 Bulk500MB | 1.0 | 500MB of Internet access |
| 3 ↔ | 🌐 Bulk2GB | 1.0 | Internet Access 2GB |

Cancel | Save and Close

---

6:31

Select a plan

Puchase access for Maps

Please tap on a plan to purchase

☆ Bronze Application Bundle — $4.?
Amazon, Angry Birds, Browser, Email, Facebook, Twitter, WSJ 🌐 Internet Access 500 — $10.00
500MB of Internet access 🌐 Internet Access 2000 — $30.00
Internet Access 2GB For Maps, always remind me. [Change]

[View Catalog] [Dismiss]

FIG. 28

MANAGING SERVICE USER DISCOVERY AND SERVICE LAUNCH OBJECT PLACEMENT ON A DEVICE

BACKGROUND

As the computing power of mobile devices (e.g., smart phones, tablets, etc.) has increased, mobile devices have become capable of sending and receiving increasing amounts of data. In addition to e-mail and text messages, many of today's mobile devices can support a variety of applications that send large quantities of information to and from end users. For example, in addition to sending e-mail and text messages, many of today's mobile devices can deliver news, weather, sports, maps, social networking information, music, videos, high-resolution photographs, documents, presentations, and other kinds of information. Furthermore, users can take advantage of applications that provide transactional services, e.g., shopping for content (books, music, videos, etc.) or applications.

The increased computing power of mobile devices has led to an explosion in the number of applications that are available for mobile devices. Hundreds of thousands of applications are available for Android-based devices and for Apple-based devices, and the number of available applications continues to grow at a rapid pace. Many of these applications are available for subscribers to download or purchase through an electronic "app store" or "marketplace." A subscriber may find applications of interest to him or her by typing in a search word or phrase in a field in a search field offered by the app store or marketplace, or he or she may find an application by browsing a list offered by the app store or marketplace (e.g., popular applications). Often, however, subscriber visits to the app store are "hit and miss" unless a subscriber happens to know the name of a desired application or happens to type in a search word or phrase that results in the application being presented.

For application developers, encouraging subscribers to see, download, purchase, or use their applications can be important to the application developers' success because their revenues often depend on purchases, downloads, and/ or use of their applications. Yet because of the sheer number of applications available through marketplaces and app stores, and because of how subscribers may behave when browsing through the marketplace or app store, application developers have little control over whether a subscriber even finds their applications.

SUMMARY

Disclosed herein are methods and apparatuses for managing service user discovery and service launch object placement on a mobile device. Disclosed is a method comprising obtaining information to assist in identifying a portion of a user interface of a wireless device, the wireless device communicatively coupled to the network system over a wireless access network, determining a differentiating attribute of the identified portion of the user interface, obtaining one or more service launch objects for placement in the identified portion of the user interface, and sending configuration information to the wireless device over the wireless access network, the configuration information at least configured to assist the wireless device in placing the one or more service launch objects in the identified portion of the user interface.

BRIEF DESCRIPTION OF THE DRAWINGS

FIG. 21 shows a UI location management console UI template for a network manager to define a policy event notification to notify users in accordance with some embodiments.

FIG. 26 shows a network manager UI environment for displaying notification templates (and associated device views) for defining a featured service or application in accordance with some embodiments.

FIG. 27 shows a network manager UI environment for displaying notification templates (and associated device views) for defining a featured service or application in accordance with some embodiments.

FIG. 28 shows a network manager UI environment for displaying notification templates (and associated device views) to drag service or application up or down for presentation order (for example, priority, discover level, etc.) in a device in accordance with some embodiments.

DETAILED DESCRIPTION

As the number and types of services on a mobile device increase, it becomes increasingly important to differentiate the services and types of service to users in a way that users can easily understand, access, and launch. In some embodiments, device users can avail themselves of one or more of bite-sized bulk data plans, application-specific data plans, and sponsored data plans (for example, plans that are free to the end user because they are paid for by third party sponsors who make money when users use their over-the-top service or application).

Figure 1:
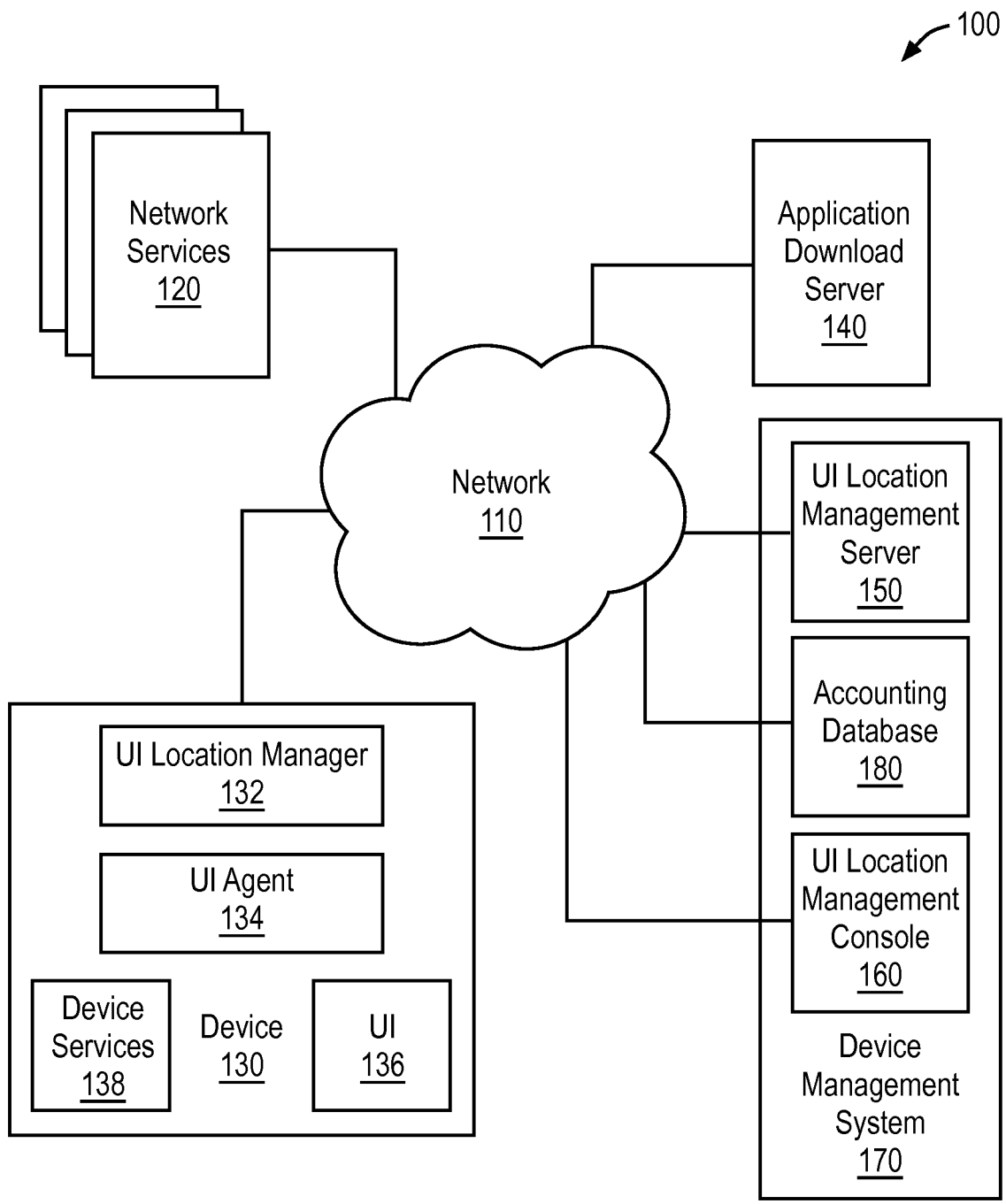
FIG. 1 shows a user interface (UI) Location Management System in accordance with some embodiments.

FIG. 1 illustrates a management system 100 that supports service user discovery and service launch object placement on a device in accordance with some embodiments. In some embodiments, the management system 100 communicates with one or more mobile devices over a network 110 coupled to one or more of network service 120, application download server 140, device management system 170, and device 130. In some embodiments, device 130 includes a user interface (UI) location manager 132, a UI agent 134, a UI 136 and device services 138. In some embodiments, the device management system 170 includes a UI location management server 150, a UI location management console 160 and an accounting database 180.

In some embodiments, the management system 100 includes additional or fewer functions than those shown in FIG. 1. For example, in some embodiments, management system 100 does not include network service 120. In some embodiments, management system 100 does not include an application download server 140. In some embodiments, a device management system 170 does not include an accounting database. In some embodiments, a device management system 170 functionality is split across two entities, for example, a service provider and a third party. In some embodiments, the application download server 140 and the device management system 170 functions are combined. In some embodiments, the application download server 140 and the network service 120 functionality is managed by the same entity (e.g., a service provider or a third party). In some embodiments, the device 130 does not include device services 138 or does not include UI agent 134. In some embodiments, two or more of the functionalities shown in FIG. 1 are combined into a single function. For example, UI agent 134 and UI location manager 132 can be combined.

In some embodiments, the device management system 170 defines the location in a device UI 136 where a service launch object is placed to aid in managing the manner in which a user discovers the network service 120 or device service 138 (for example, an application) and launches it. In some embodiments, the UI location manager 132 uses information associated with a service launch object (for example, metadata) to instruct the UI agent 134 where to locate the service launch object in the device UI 136.

In some embodiments, a UI location management service provider entity utilizes the apparatus shown in FIG. 1 to increase (for example, to optimize) the discovery level for one or more service launch objects on a device or a group of devices with UI location (for example, placement) and notification messaging functions managed by a device-based UI location manager 132. In some embodiments, a device-based UI location manager 132 is further managed by the device management system 170. In some embodiments, the UI location management service provider is a carrier (for example, a network access carrier or a service provider) of access services who has control of the UI location management system. In some embodiments, the carrier of access services may be a network access carrier (for example, a wireless network carrier such as Vodafone, Verizon, or AT&T, or a cable network carrier such as Comcast, etc.). In some embodiments, the UI location management service provider is a third party who provides the location management (for example, an application store or marketplace provider such as Apple or Android/Google, a search services entity such as Google or Bing, or a third party UI location management entity, etc.). In some embodiments, the third party who provides the location management does not control or own the network access assets (for example, an application store or marketplace provider such as Apple or Android/Google, a search services entity such as Google or Bing, or a third party UI location management entity, etc.). In some embodiments, it is advantageous for a carrier or application store/marketplace provider to be the UI location management service provider. In some embodiments, an entity that controls the UI location management system shown in FIG. 1 controls the UI location management service and therefore controls the discovery level for one or more service launch objects on one or more device 130. In some embodiments, device 130 is part of a device group.

In some embodiments, service launch object is an object on a device UI 136 that a user of device 130 or a network entity (for example, device management 170, service provider, carrier, etc.) can select (for example, "click on," "open," "launch," etc.) to initiate a network service 120 or device service 138. In some embodiments, the network service 120 or device service 138 is a service or an application. In some embodiments, initiating network service 120 or device service 138 provides (for example, by launching, initiating, streaming, playing, presenting, displaying, purchasing, downloading, or preloading) a content (for example, a video or movie or audio), or a software, or a software download, or software update. In some embodiments, selection of the service launch object initiates the network service 120 or device service 138 by launching an application that is associated with the service launch object; or directing an application (for example, as a browser or portal application) to a particular network destination that is associated with the service launch object; or opening a folder with one or more additional service launch object choices for the user to select from; or providing the user with a notification regarding service status or service plan permissions for this service; or providing the user with payment or service account configuration options to enable the service. In some embodiments, selection of the service launch object initiates the network service 120 or device service 138 by launching a purchase experience or a purchasing environment. In some embodiments, selection of the service launch object initiates providing a user of device 130 with means to download an application from the application download server 140 and launch the network service 120 or device service 138. In some embodiments, the service launch object is an Android "APK" (i.e., an application package) comprising an application and additional associated information, for example, information about an icon (for example, a graphic or location) associated with a service or an application. In some embodiments, a service launch object icon is one or more of a graphic, a text string, a UI user entry field or any other means for the user to choose to activate a service launch object.

In some embodiments, service launch object discovery level refers to the level of priority a service launch object receives relative to gaining the device user's attention in order to encourage selection or launch a service or application associated with the service launch object. In some embodiments, a high discovery level corresponds to a premium UI location for the service launch object (for example, the service launch object is placed in a prominent UI service launch partition, a home screen, or a permanent launcher bar). In some embodiments, a high discovery level also includes or is indicated by one or more of highlighted service launch object icon features (wherein icon features include one or more of size, orientation, color, texture, persistence, transparency, foreground/background presence, skin, wallpaper, etc.) or prominent or frequent service launch object notification messages. In some embodiments, a low discovery level is characterized by a less prominent service launch object UI location or less prominent service launch object notification messaging. In some embodiments, a low discovery level includes one or more of: a service launch object location in the device application stable, a service launch object on an application store/marketplace location, a service launch object without notification messaging, and a one time notification message the first time the service launch object icon is displayed to the user.

In some embodiments, the management system provides for remote management of location and modification of appearance for a service launch object icon. In some embodiments, a service launch object icon is the graphic shown on the device UI screen that represents the service or application (which may include a content or purchase experience) associated with the service launch object. In some embodiments, the service launch object icon is positioned on a touch screen in the location that launches the service or application associated with the service launch object when the user touches it.

In some embodiments, the management system provides for remote management or modification of a service launch object notification message. In some embodiments, a service launch object notification message is a targeted user notification message that a user can observe (for example, see or hear) as associated with (or integral to) a particular actionable service launch object because the service launch object notification message is placed in, on, touching or in close proximity to the service launch object icon. In some embodiments, this kind of integral service launch object notification message requires management of how or when or where the notification message is displayed in the device UI. In some embodiments, the service launch object display location is based on (for example, targeted for, or optimized for) each service launch object or must be mapped for each service launch object and service launch object message pair. In some embodiments, association of a notification message with an actionable (for example, "clickable") service launch object icon on the device allows for targeted or specific user messaging about various aspects of an available service or application in a manner that does not require the user to search for an icon to act on, nor does the user need to do further research on what an actionable icon offers the user experience. In some embodiments, an advantage of the management system 100 is the remote management of service launch object notification messages that are (easily) recognized or acted on by the user by virtue of the association of the notification message and the actionable service launch object icon. In some embodiments, an additional advantage of the management system 100 is that multiple notification messages for multiple actionable service launch objects may be sent to the device (for presentation to a user) preventing the user from becoming confused about which service launch object notification message goes with which service launch object.

In some embodiments, different types of service launch objects are placed in a common device UI service launch partition in the device UI 136 to aid the user in understanding that one or more service launch object associated with network service 120 or device service 138 represented in that UI service launch partitions are related or of similar type. In some embodiments, the placement of the service launch object within the UI service launch partitions is specified in the device management system 170. In some embodiments, the device management system 170 provides a UI location where a service launch object is desired to be placed, and the UI location manager 132 translates that location into device UI 136 configuration to position the service launch object icon in the desired UI location.

In some embodiments, multiple device UI service launch partitions are used to identify multiple groups of service launch objects. In some embodiments, the management system 170 specifies the one or more UI service launch partitions in which a service launch object is to be displayed.

In some embodiments, the management system 170 specifies that a service launch object is to be placed in a location on a device UI 136, with the location being one or more of a UI service launch partition, a device main screen, a device secondary screen, a device permanent launch area, a device application stable, a device file system location, an application download server, or other division.

In some embodiments, a network service 120 is sponsored on a user's service plan, and it is difficult or inconvenient for the user to remember the website and enter it. In some embodiments, the ability to dynamically configure a device application (such as a browser, a portal application, a dedicated application such as a social network application, a search application, a maps or location application, a voice or chat application, media streaming application, music application, content viewing or purchase application, shopping application, driving directions application, service plan selection or configuration application, service usage reporting application, a gaming application, a weather application, an email application, a widget, or another service related application, etc.) with the proper destination, associate this configured application with a service launch object icon representing the sponsored network service 120, and place the service launch object icon in a convenient location on the device UI 136, provides the user with means to more easily "discover" or "launch" the sponsored network service 120. In some embodiments, a sponsored device service 138 is difficult of inconvenient for the user to remember and the management system performs one or more of the following: dynamically configure a device application with the proper destination, associate this configured application with a service launch object icon representing the sponsored device service 138, place the service launch object icon in a convenient location on the device UI 136, provide the user with means to more easily "discover" or "launch" the sponsored device service 138.

In some embodiments, the service provider (such as a wireless carrier) may have a new service plan that the carrier desires the user to "discover" by trying. In some embodiments, the service provider could configure a "try before buy" service plan wherein a "sample service" with shorter time span is provided or wherein the cost for service is less expensive for a period of time. The service provider can then configure or place a service launch object in a location on the device UI 136 where the user is likely to discover it.

In some embodiments, the service provider (for example, a wireless service provider, application store or application marketplace service provider, etc.) may provide means to specify where a given service launch object is placed on a device UI 136, and charge the application provider or service provider for the UI placement in accordance to the value of the placement. In some embodiments, placement in the application store or marketplace may be free. In some embodiments, placement in the on-device application stable might have lower cost, placement on one of the secondary device screens might be more expensive, placement in a UI service launch partition might cost even more, placement on the device main screen might be yet more expensive, and placement in the permanent launch area might be most expensive of all. It should be understood that the actual hierarchy of pricing may be configured by the service provider. In some embodiments, the hierarchy of pricing is be configured by the service provider or the device management system 170.

In some embodiments, the device management system 170 includes an accounting database 180 to associate the placement of a service launch object on a device UI 136 with a billing rate for the application provider or service provider or sponsor associated with the service launch object.

Figure 2:
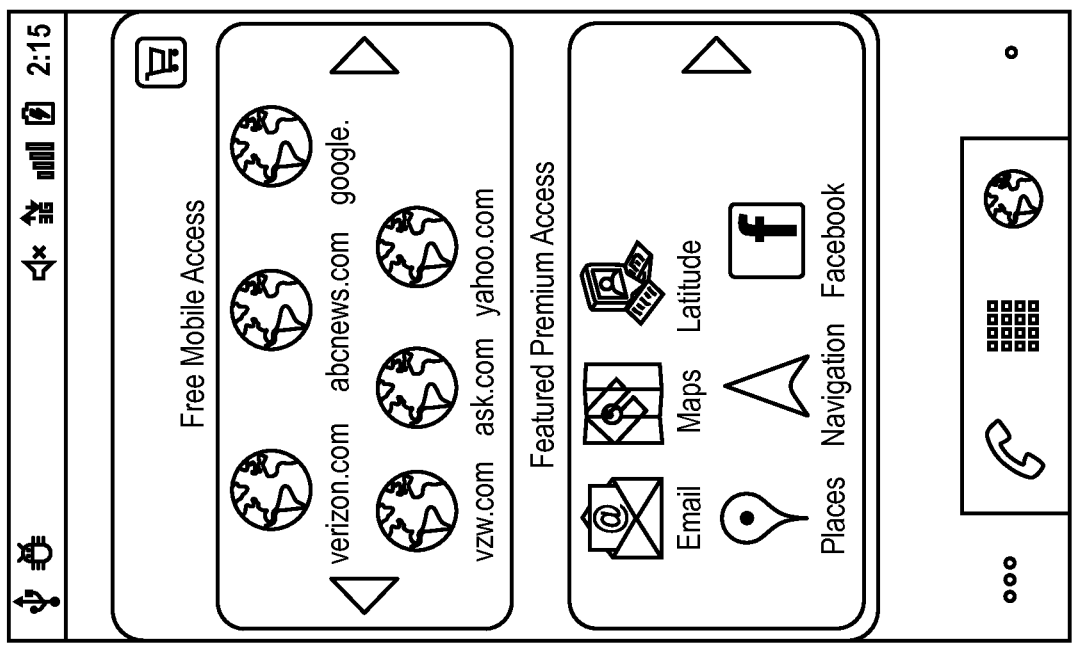
FIG. 2 shows a two-partition UI service launch partition shown on a secondary device screen in accordance with some embodiments.

In some embodiments, device UI discovery location is the portion of the device UI 136 that a service launch object reside in. In some embodiments, there is a single UI service launch partition (or folder or organization) with service launch objects within it. FIGS. 2 through 7 illustrate example embodiments with multiple partitions for service launch objects. FIG. 2 illustrates a multiple partition UI service launch partition where two or more types of services each have a UI service launch partition that makes it clear to the user which type of service a given service launch object resides in. FIG. 2 shows a two-partition UI service launch partition shown on a secondary device screen (e.g., the second device screen from the right as indicated by the single dot on right and three dots on left). In FIG. 2, the service launch object UI location specifies the partition or the location within the partition of several service launch object icons.

Figure 3:
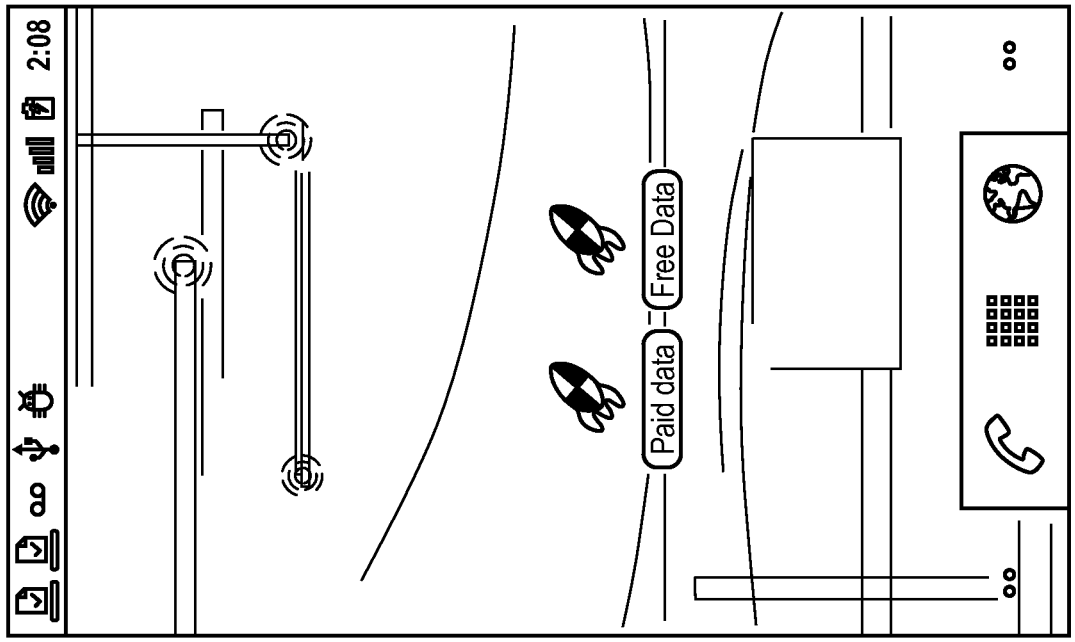
FIG. 3 shows a service launch objects shown on a device main screen in accordance with some embodiments.
Figure 5:
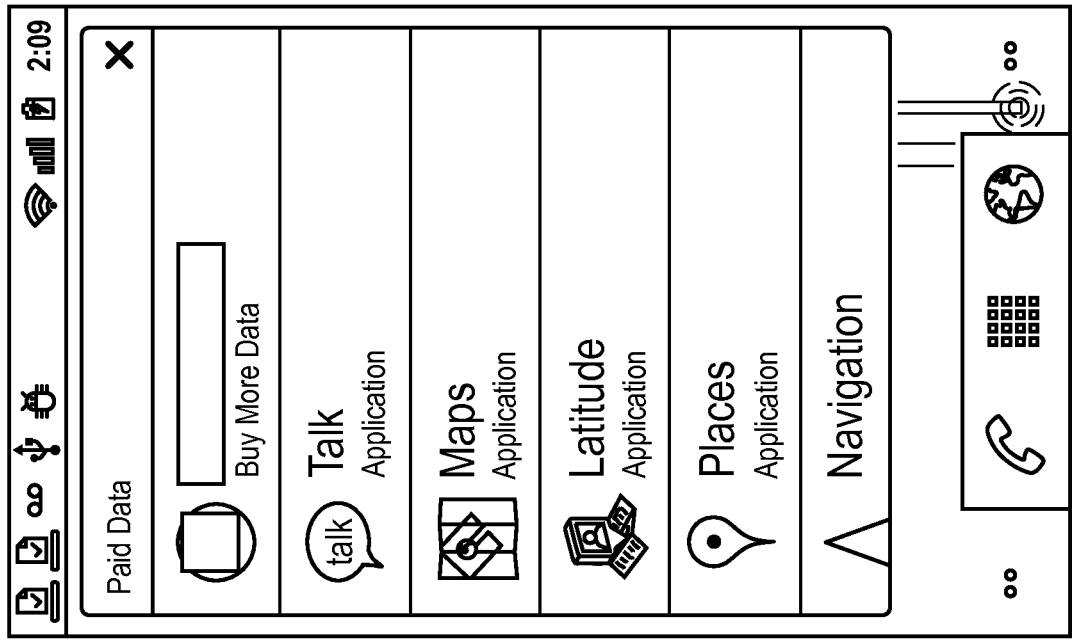
FIG. 5 shows an expanded view of paid data services single partition UI service launch partition shown in FIG. 2 in accordance with some embodiments.
Figure 4:
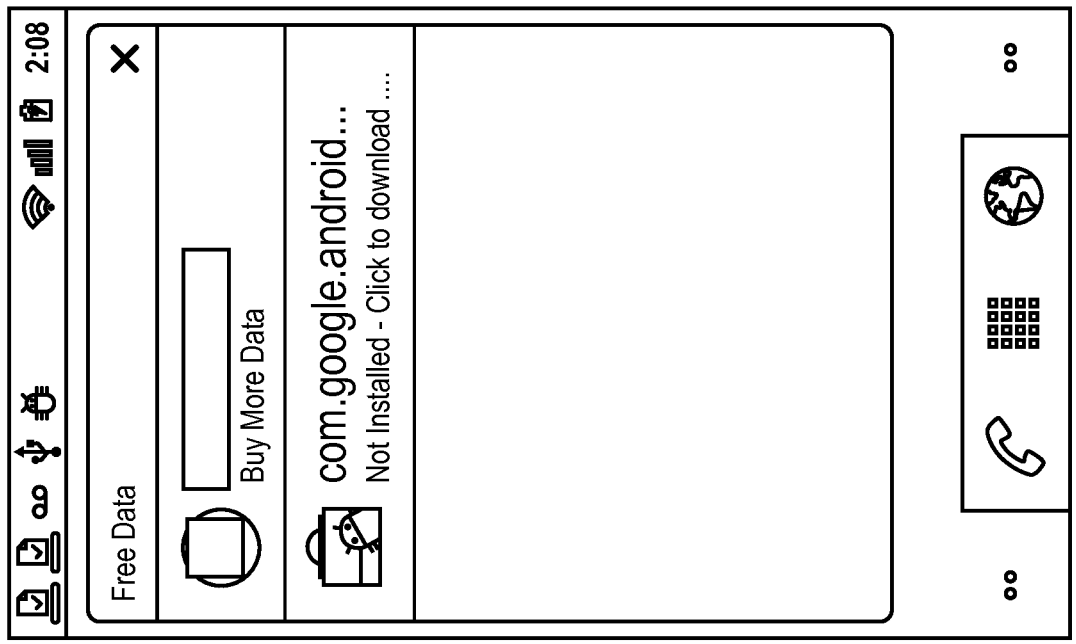
FIG. 4 shows an expanded view of a free data services single partition UI service launch partition shown in FIG. 2 in accordance with some embodiments.
Figure 6B:
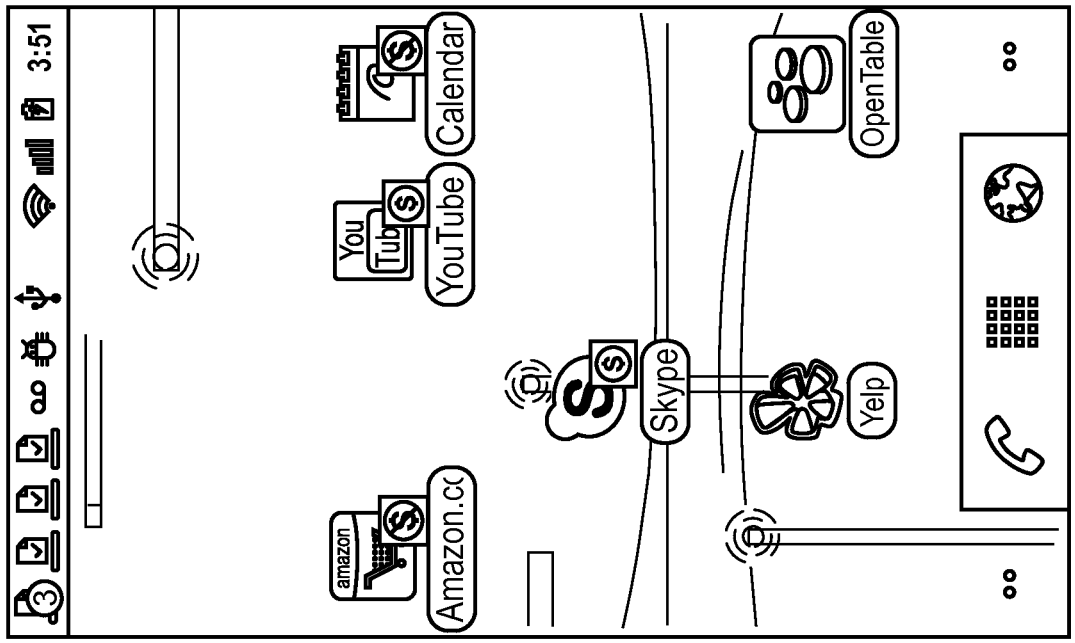
FIG. 6B shows a service launch object icon appearance modification (in this example case to indicate paid access vs. sponsored access services) in accordance with some embodiments.
Figure 6A:
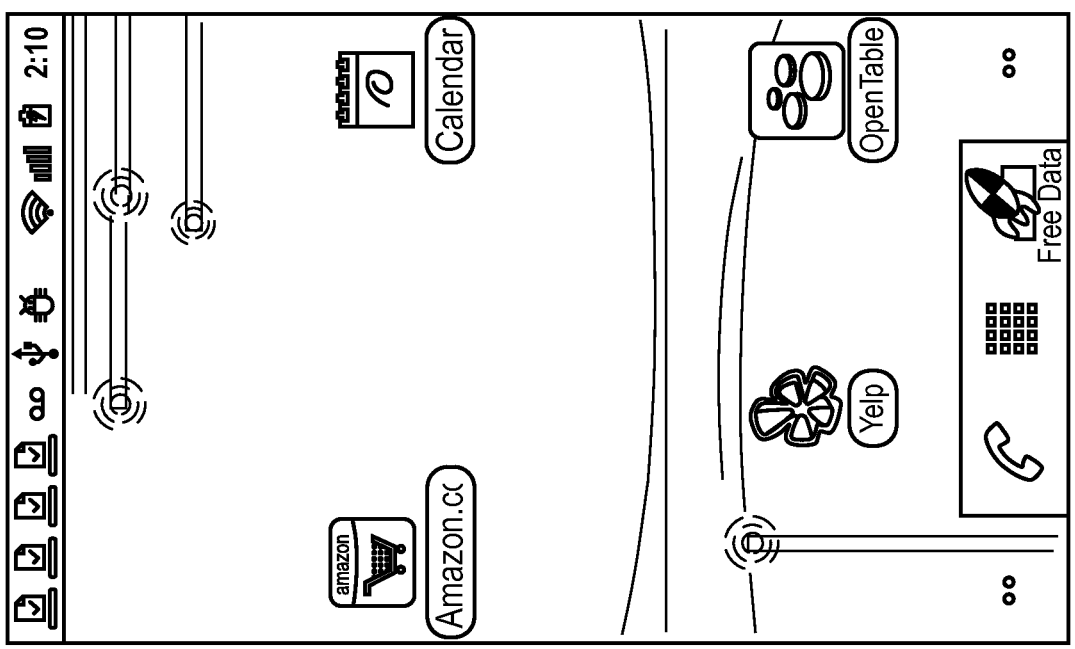
FIG. 6A shows a service launch object shown in permanent launch UI area in accordance with some embodiments.
Figure 7:
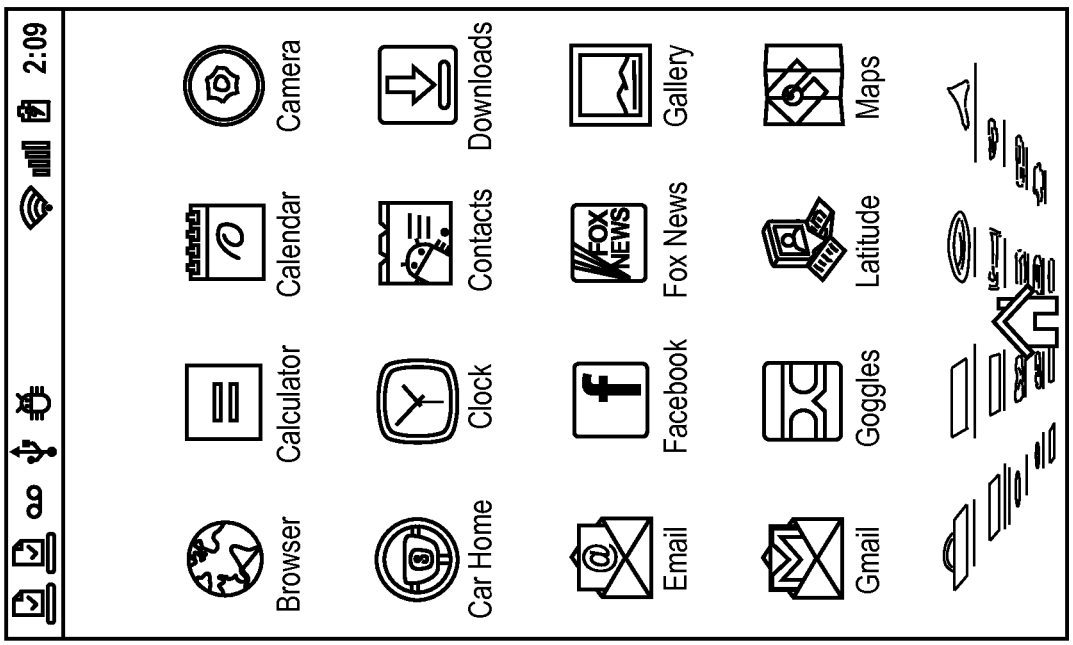
FIG. 7 shows a service launch object shown in an application stable in accordance with some embodiments.

FIG. 3 illustrates a main device screen with service launch objects (labeled "Paid Data" and "Free Data"). FIGS. 4 and 5 illustrate secondary device screens accessible, for example, by selecting the "Paid Data" and "Free Data" icons of FIG. 3. FIGS. 6A and 6B illustrate a device "quick launch" or "permanent launch" UI area. FIG. 7 illustrates a device application stable. In addition, in some embodiments, service launch objects reside in a device marketplace, application store, website or network server.

In some embodiments, the portion of the device UI reserved for one or more service launch objects is identified by a differentiating characteristic or attribute. In some embodiments, the differentiating characteristic to identify the portion of the UI is defined by or characterized by one or more of: a color, a wallpaper, a transparency, a wall, a window, a texture, and a border. In some embodiments, different portions of a UI are classified into tiers (or, alternatively, classes or levels, etc.), and each of the classified sub-portions is differentiated by variations of one or more of: color, wallpaper, transparency, walls, windows, textures, borders, and a plurality of screens.

In some embodiments, the partitioned UI service launch partition portion provides for two or more UI service launch partitions that indicate to the user that the service launch objects in a given service launch partition are members of a type of service. In some embodiments, a service launch partition includes displaying user options for service launch objects for "default" sponsored network services, websites, applications or content. In some embodiments, default sponsored network services, websites, applications or content are subsidized by a service provider or third party. The term "default" refers to services that are pre-configured by a service provider, device original equipment manufacturer (OEM), operating system (OS) provider or third party. In some embodiments, a service launch partition displays user options for service launch objects for "user selected sponsored services," wherein the user selects from available sponsored service options and once the service option is selected by the user then the service launch object appears in the service launch partition. In some embodiments, the user is enabled to select a certain number of sponsored service options out of a larger list of sponsored service user options. In some embodiments, a service launch partition includes displaying user options for service launch objects for paid services that the user has elected to sign up for. In some embodiments, a service launch partition includes displaying user options for service launch objects for services, sponsored or paid, that the user has not yet elected to sign up for but are available to the user. In some embodiments, each of the two or more service launch partitions in the multi-partition UI service launch partition application (or widget) has text or graphics indicating to the user the type of service for one of more of the multiple partitions. In some embodiments, the device UI discovery location is a UI location within the partitioned service object launcher, and the service launch object UI location also specifies the partition or the location within the partition.

In some embodiments, a service plan or a service component is specified in a service design environment (wherein the "service design environment" may include a service design center, a service design platform, a service design management system, etc.). In some embodiments, the service design environment comprises associating the network service 120 or device service 138 with one or more service launch objects. In some embodiments, the service launch object includes one or more of an icon (graphic), a software application, a folder or similar collection of additional service launch objects, a network destination or a network communication end point, one or more notification message sequences or information, and service selection options. In some embodiments, the service design environment allows an entity to choose the device discovery UI location for the network service 120 or device service 138. In some embodiments, the device discovery UI location is one or more of service launcher application UI, partitioned service object launcher application UI, main device screen or a secondary device screen, quick launch area, permanent launch area, device application stable, device marketplace, application store, website or network server. In some embodiments, the service design environment allows the specification of where to preload an application if the application is not already loaded on the device 130 so that the application may be available the first time the user selects the network service 120 or device service 138. In some embodiments, the specification is formatted into a set of instructions for a network server that communicates with the UI location manager 132 on the device 130. In some embodiments, the set of instructions provides a service launch object with configuration or placement or message information that instructs the UI location manager 132 on the device 130 where to locate the service launch object in the device UI 136 or how to provision the service launch object so that it properly launches or instructs the user when the user selects the launch object. In some embodiments, the service launch object configuration or placement or message information can specify a network server destination where UI location manager 132 on the device 134 is to fetch one or more of the required service launch object parameters.

In some embodiments, device 130 receives a service launch object configuration or placement or message information from a network server. In some embodiments, device 130 identifies the portion of the service launch object configuration or placement or message information that specifies the device UI 136 location for the service launch object. In some embodiments, device 130 installs the service launch object icon in the device UI 136 location. In some embodiments, device 130 associates the service launch object icon with the service launch object that will initiate the network service 120 or device service 138 when the user selects the service launch object icon.

In some embodiments, the service launch object requires an application to launch the network service 120 or device service 138. In some embodiments, the device 130 is configured to search the available applications on the device 130, detect that a required application is not present on the device 130 and preload it prior to the user selecting to launch the network service 120 or device service 138 associated with the service launch object. In some embodiments, the device 130 is configured to detect that the required application is not present and then automatically download the application when the user first selects the service associated with the service launch object. In some embodiments, the device 130 is configured to detect that the required application is not present on the device 130 and offer the user the option to download the application when the user first selects the network service 120 or device service 138 associated with the service launch object. In some embodiments, wherein device 130 downloads or preloads application, the device 130 can either download the application from a pre-defined application download server 140 or can download it from a location specified in the service launch object placement instruction message.

In some embodiments, the service launch object is further configured to include notification messages that are displayed to the user when the user selects or first selects the service launch object icon. In some embodiments, the notification message includes information on how much the service costs or what the service allowances are. In some embodiments, the notification message involves service plan selection options that allow the user to elect to pay for a service, or allow the user to select a sponsored service. In some embodiments, notification messages may be handled by a UI agent 134.

In some embodiments, the UI location manager 132 automatically populates one or more of the service launch object, service launch object associated application, network destination specification or service launch object icon in the proper location in the device UI when user selects the network service 120 or device service 138.

In some embodiments, device network state information is used to define the state of one or more networks 110 that the device 130 is connected to. Network state information includes one or more of the type of access connection to the network (for example, 4G wireless, 3G wireless, 2G wireless, WiFi, cable, DSL, hot spot service provider, home LAN, corporate LAN, etc.), the list of available networks (for example, WiFi and 3G, or 4G and corporate LAN, etc.), time of day, home vs. roaming carrier service provider status, network access cost (for example, service plan details and status), network congestion state, network quality-of-service (QoS) state, device data rate, device signal quality, and any other characteristic of the network.

Device usage state information (wherein information could comprise one or more of: parameters, logs, history, etc.) provides information on the manner in which the device is used (for example, in the past, present or predicted future) by the device user. In some embodiments, device usage state information includes one or more of: the current or past state of service usage for one or more services, current or recent states of application usage for one or more selected applications, current or recent geographic locations, current or recent location searches, current or recent network destination history (websites, services, content, search terms, etc.), one or more applications currently being interacted with by the user, the current or recent network state, how long it has been since the user pressed one or more UI feedback elements on the device, whether an application is running in the foreground or background, etc. In some embodiments, the device can collect device usage state information (for example, collected by the UI location manager 132, or some other device agent). In some embodiments, the device usage state includes device cognitive state, wherein the device cognitive state includes information the device gathers from the environment based on the device sensors. In some embodiments, the device uses one or more of a camera, a microphone, a GPS, a motion sensor, a gyroscope, a accelerometer, a temp sensor, a touch sensor, a humidity sensor, to determine the device state relative to the environment or the user of the device. In some embodiments, the service launch object management (for placement, discovery level, notification message, bidding, etc.) is dynamic based on one or more of: device orientation (landscape vs. portrait vs. flat on a horizontal surface) or device distance or relative position to a user (near the head, in one or two hands, on a table, on the seat of a moving car, in the pocket of the user, indoors/outdoors, etc.) or ambient light/noise levels or components. In some embodiments, the device cognitive state is used to decide between a visual or audio or vibration notification or a specialized target bid population or to bill for a service launch object placement or associated service or application usage. In some embodiments, the service launch object management is based in part on the power state of the device, for example, powered up, active, screen saver, hibernate, sleep or powered down mode. In some embodiments, the service launch object management changes the power state (for example, from screen saver to active) to increase awareness of an associated service or application to a user. In some embodiments, the user may disable the power state change mode. In some embodiments, the service launch object management is based on the power mode (e.g., whether plugged in or battery-powered) or the state (percentage or time remaining) of the battery charge.

In some embodiments, device-based usage information is communicated with a network element for further processing or analysis to determine how to enhance (e.g., improve, increase, optimize, etc.) discovery level for one or more service launch objects. In some embodiments, device usage state information is collected by network elements and aggregated in the device management system 170 databases for further processing or analysis to determine how to enhance discovery level for one or more service launch objects. In some embodiments, device usage state information consists of a combination of information collected by the device and information collected by the network for further processing or analysis to determine how to enhance discovery level for one or more service launch objects.

In some embodiments, the availability of a network service 120 or device service 138 is dependent on the network state of the device 130. In some embodiments, if the network service 120 or device service 138 is available for a current network state the service launch object icon is displayed in the specified UI location. In some embodiments, if the network service 120 or device service 138 is not available for the current network state the icon is not displayed. In some embodiments, the service launch object configuration or placement or message information contains information that is a function of network state. In some embodiments, and the UI location manager 132 uses the service launch object configuration or placement or message information and network state information to instruct the UI agent 134 to display the service launch object icon in a given location in the device UI 136 in a first network state and instructs the UI agent 134 to not display the service launch object icon in a second network state.

In some embodiments, a UI location management console 160 provides a network manager a user interface environment for one or more of composing the network state policies describing when one or more services are available, specifying whether to present a service launch object (for example, display a service launch object icon), and specifying whether to provide network state notification information on one or more service launch object icons. FIG. 21 shows a UI location management console 160 UI template for a network manager to define a policy event notification to notify users (for example, to notify users regarding one or more details of a service plan status, such as data used (e.g., MB or GB used), percent of plan cycle used or remaining, plan expiration, etc.) in accordance with some embodiments.

In some embodiments, the availability of a network service 120 or device service 138 is dependent on the network state associated with the device 130, and if the network service 120 or device service 138 is available for a current network state then the service launch object icon is displayed with "normal" (or typical or standard) graphics features in the specified UI location, and if the network service 120 or device service 138 is not available for the current network state then the icon is displayed with graphics features that indicate the service is not available in the current network state. In some embodiments, instead of or in addition to modifying the service launch object icon graphics features to indicate the network service 120 or device service 138 is not available in the current network state, a notification message may be overlaid on the service launch object icon, with the message providing information indicating that the network service 120 or device service 138 is not available in the current network state.

In some embodiments, the service launch object configuration or placement or message information contains one or more of icon versions, icon placements, or network state messages, that are a function of network state, and the UI location manager 132 provides the appropriate one or more icon version, icon placement, network message to the UI agent 134 to modify the associated service launch object icon as the network state changes.

In some embodiments, a network service 120 or device service 138 is sponsored in a first network state and paid in a second network state. In some embodiments, a network service 120 or device service 138 is sponsored in a first network state and paid in a second network state and in the first network state the service launch object icon appears in a UI service launch partition for sponsored services, and in the second network state the service launch object icon appears in a UI service launch partition for paid services. In some embodiments, the service launch object configuration or placement or message information contains placement information that is a function of network state, and the UI location manager 132 uses this placement information to instruct the UI agent 134 to display the service launch object icon in a sponsored service location in the device UI 136 when the device 130 is in the first network state and instructs the UI agent 134 to display the service launch object icon in a paid service location in the device UI 136 when the device 130 is in the second network state.

In some embodiments, it is advantageous to show whether a service or application is free or paid by a feature differentiation directly on the service launch object icon. An example embodiment of this is shown in FIG. 6B where the dollar sign represents paid services (for this example YouTube and Skype are paid services) and the dollar sign with a circle and line through it represents free (or sponsored) (for this example Amazon and Calendar are free).

In some embodiments, there is a permanent UI service launch partition that the user is not allowed to modify or remove from the device. In some embodiments, the permanent UI service launch partition enables a UI location management service provider to enhance service launch object UI location, or service launch object icon appearance or service launch object notification messages for one or more service launch objects. In some embodiments, the UI location management service provider of the permanent UI service launch partition allows the user to manage the applications, folder and/or service launch objects that are located in other portions of the UI controlled by the user. In some embodiments, the user can control (for example, modify or alter or enhance) some parameters (for example, the ordering, or sorting, or formatting) of service launch objects within a UI service launch partition that is at least partially controlled by a UI location management service provider. In some embodiments, the user can add or delete service launch objects from a UI service launch partition that is at least partially controlled by a UI location management service provider. In some embodiments, the user is not allowed to add or delete or control (for example, modify or alter or enhance) service launch objects contained in a UI service launch partition that is controlled by a UI location management service provider.

In some embodiments, the UI location manager 132 is instructed (or follows a policy) to locate a service launch object in the UI based on the current time (wherein current time could be based time of day, or day of week, or work/holiday, etc.).

In some embodiments, a policy is implemented on the UI location manager 132 to specify that a service launch object is located in one area of the UI at a certain time of day or day of the week, and the service launch object is re-located at another time of day or day of the week. As another example embodiment, rather than storing the time based location policy on the device 130, the network (for example, the device management system 170) can instruct the UI location manager 132 to locate one or more service launch objects in the UI based on time. In related embodiments, other features of one or more service launch objects are altered as a function of time including service launch object appearance or features or service launch object notification messages.

In some embodiments, the UI location manager 132 is instructed (or follows a policy) to locate a service launch object in the UI based on the current network state. In some embodiments, a policy is implemented on the UI location manager 132 to specify that a service launch object is located in one area of the UI for certain network states and service launch object is re-located to another area of the UI for other network states. In some embodiments, the service launch object is located on the home screen or in a prominent location in a UI service launch partition when the device is connected to WiFi, 4G, uncongested, or high QoS networks. In some embodiments, the service launch object is re-located to a less prominent UI location, such as a secondary device screen, a less prominent location in the UI service launch partition, the application stable, or is not displayed at all when network state changes to 3G, 2G, congested or low QoS or roaming network.

As another example embodiment, rather than storing the network state based location policy on the device, the network (for example, the device management system 170) instructs the UI location manager 132 to locate one or more service launch objects in the UI based on network state. In related embodiments, other features of one or more service launch objects are altered as a function of network state including service launch object appearance or features or service launch object notification messages.

In some embodiments, the UI location manager 132 is instructed (or follows a policy) to locate a service launch object in the UI based on the device usage state information (for example, based on current, or past, or predicted, or history, or logs of, device usage state information). For example, a policy might be implemented on the UI location manager 132 to specify that a service launch object is located in one area of the UI for certain device usage state, and the service launch object location is moved for other device usage state. In some embodiments, locate the service launch object on the home screen or in a prominent location in a UI service launch partition when the device usage state information (for example, based on application usage history or user current activity) indicates (for example, based on estimates, or predictions, or cost, etc.) that a given service offer is likely to be or interest to the user.

In some embodiments, the service launch object is located on the home screen or in a prominent location in a UI service launch partition when the device usage state information recognizes a geographic area where a service or retail opportunity is valuable or might be of interest to the user, such as a nearby purchase opportunity.

In some embodiments, the service launch object is re-located to a less prominent location in the UI service launch partition, to the application stable, or is not displayed at all when device usage state indicates that the current device usage information (for example, based on associated application history) is not related to the service launch object or indicates (for example, based on estimates, or predictions, or cost, etc.) that a given service launch object is not likely to be or interest to the user.

In some embodiments, the service launch object is re-located to a less prominent location in the UI service launch partition, the application stable, or is not displayed at all when device usage state indicates that the current geographic location is not close to a retail purchase opportunity associated with the service launch object.

In some embodiments, rather than storing the device usage state based location policy on the device, the network (for example, the device management system 170) instructs the UI location manager 132 to locate one or more service launch objects in the UI based on device usage state. In related embodiments, other features of one or more service launch objects are altered as a function of device usage state including service launch object appearance or features or service launch object notification messages. In some embodiments, a service launch object notification message can alert the user when the service, content, purchase opportunity or application associated with the service launch object is likely to be of interest to the user. In some embodiments, (which may be of interest to wireless access service providers), by using one or more of a service launch object notification messages, a service launch object UI location change or a service launch object icon change (for example, a feature, size, orientation, persistence, etc.), the user of device 130 is made aware of additional access services available for trial or purchase. In some embodiments, (which may be of interest to wireless access service providers), by using one or more of a service launch object notification messages, a service launch object UI location change or a service launch object icon change (for example, a feature, size, orientation, persistence, etc.), the user of device 130 is made aware of additional access services available for trial or purchase based on the device usage state information (for example, history or logs) indicating that the user has been using access services.

In some embodiments, by using one or more of a service launch object notification messages, a service launch object UI location change or a service launch object icon change (for example, a feature, size, orientation, persistence, etc.), the user of device 130 is made aware of additional access services available for trial or purchased based on the device usage state information (for example, history or logs) indicating that the user has been using access services in a manner that suggests the user may desire to try or buy additional access services at the present or future time.

In some embodiments, additional service launch object notification messages are provided for services, applications or content marketing, wherein the notification message is placed in, on, touching or in close proximity to a service launch object icon (an icon proximity message), or wherein the notification message is located in a location in a UI display in which the service launch object icon is contained (an icon container message). In some embodiments, the notification messages include one or more of the following objectives: informative, draw attention to a service launch object, market special offers for a service launch object, provide service usage information for a launch object, or indicate to a user that a service activation or service purchase is required to use a service associated with a service launch object.

In some embodiments, marketing messages for an access service, an application, a content purchase, on-line shopping service, or another service is placed directly on a service launch object icon, or closely adjacent to a service launch object icon, or in a location in a UI display in which the service launch object icon is contained (for example, in service object launcher or a UI service launch partition), for the purpose of providing a convenient way for the device user to learn that the service or application associated with the service launch object icon is available or is available with special advantageous conditions or economics.

In some embodiments, the appearance of a service launch object icon is modified to enhance or downgrade the discovery level. In some embodiments, enhancing or downgrading the discovery level is accomplished by one or more of changing the service launch object icon features, changing the icon graphic, overlaying the service launch object icon graphic with a second icon or graphic, or merging the icon graphic with a second icon graphic. In some embodiments, the icon features or the color scheme are changed in accordance with service launch object icon UI management policy or instructions from the network. In some embodiments, the service launch object icon is made to alternate in appearance (for example, flash or change colors periodically or "bounce" or "wobble" etc.) according to service launch object icon UI management policy or instructions from the network.

In some embodiments, additional service launch object notification messages as described above are managed by the device management system 170. In some embodiments, additional service launch object notification messages as described above are managed by the device management system 170, wherein a service launch object and one or more of associated application, network destination or other policy information, are associated with a service launch object notification message. In some embodiments, additional service launch object notification messages as described above are managed by the device management system 170, wherein a service launch object and one or more of associated application, network destination or other policy information, are associated with a service launch object notification message and the device management system 170 then communicates the service launch object notification message along with the other service launch object information as described herein to the UI location manager 132; and the UI location manager 132 then displays the message in the appropriate UI location.

In some embodiments, the device management system 170 specifies the type of service launch object notification message or service launch object UI location; the type of message or UI location information is communicated to the UI location manager 132; and the UI location manager 132 displays the message in the proper format in the specified UI location. In some embodiments, the device management system 170 specifies the type of message or UI location of the service, application or content marketing message; the type of message or UI location information is communicated to the UI location manager 132 along with the other UI location manager 132 information described above; and the UI location manager 132 then displays the message in the proper format in the specified UI location.

Figure 8:
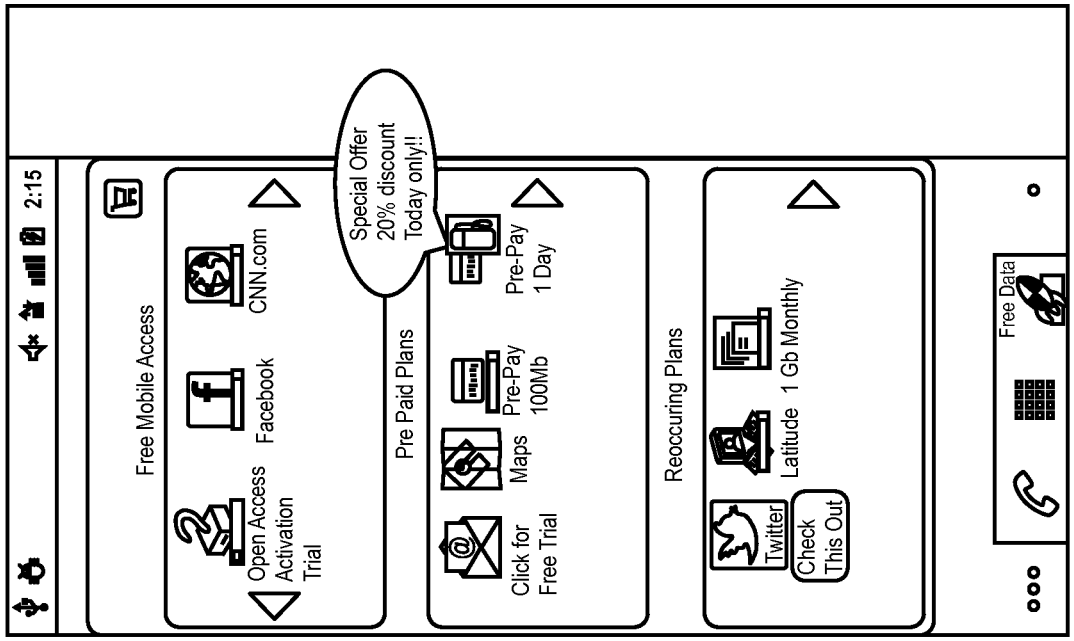
FIG. 8 shows various proximity messages in accordance with some embodiments.

FIG. 8 provides three examples of proximity messages in accordance with some embodiments. In FIG. 8 is an example of a multi-partition UI service launch partition with three service launch partitions. A first service launch partition is for sponsored (e.g., free to the user) services and applications. A second service launch partition is for pre-paid services and applications. A third service launch partition is for post-paid (for example, recurring) services and applications. A first example of a proximity message type is the bubble message on the pre-pay one-day service launch object icon that indicates: "Special Offer, 20% discount, Today only!!" A second example of a proximity message is the "Click for Free Trial" icon title message below the service launch object icon for pre-paid email. A third example of a proximity message is the "Check This Out" message under the post-paid (recurring) Twitter service launch object icon.

Figure 9:
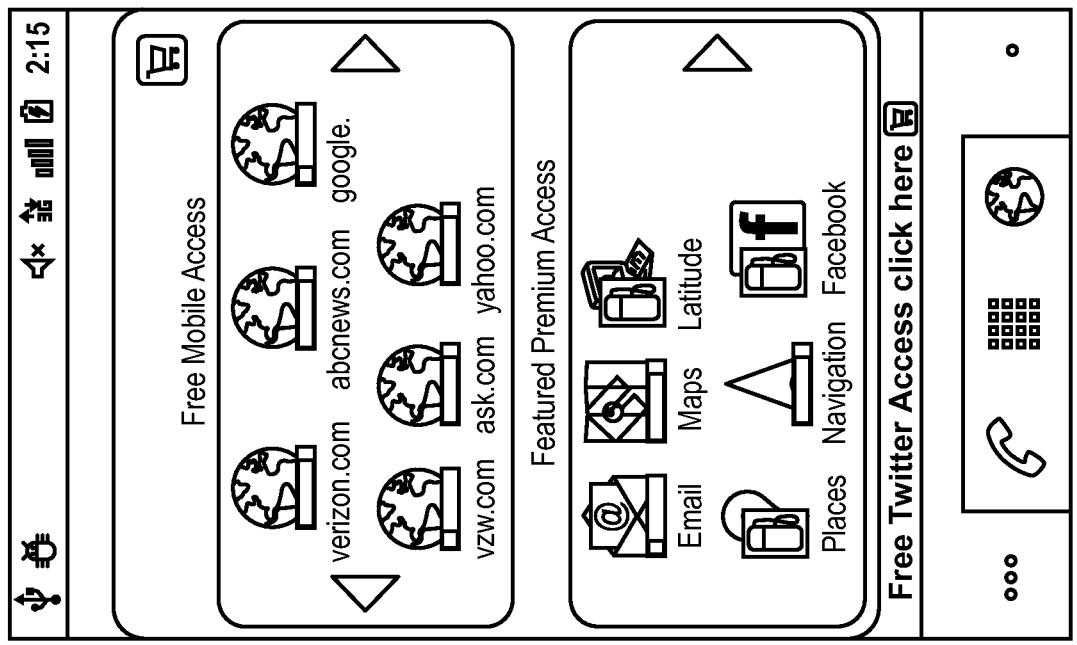
FIG. 9 shows a two-partition UI service launch partition with a service object notification message in accordance with some embodiments.

In some embodiments, a service launch object notification message is placed on or in a UI service launch partition UI area that has the capability of displaying one or more service launch object notification messages for one or more service launch objects that are or will be located in one of the UI service launch partitions. An example of this aspect of the invention is shown in the example embodiment of FIG. 9, where the free Twitter access message and actionable icon is displayed on the UI service launch partition itself. In this embodiment the service launch object will automatically populate in the free mobile access partition.

Figure 10:
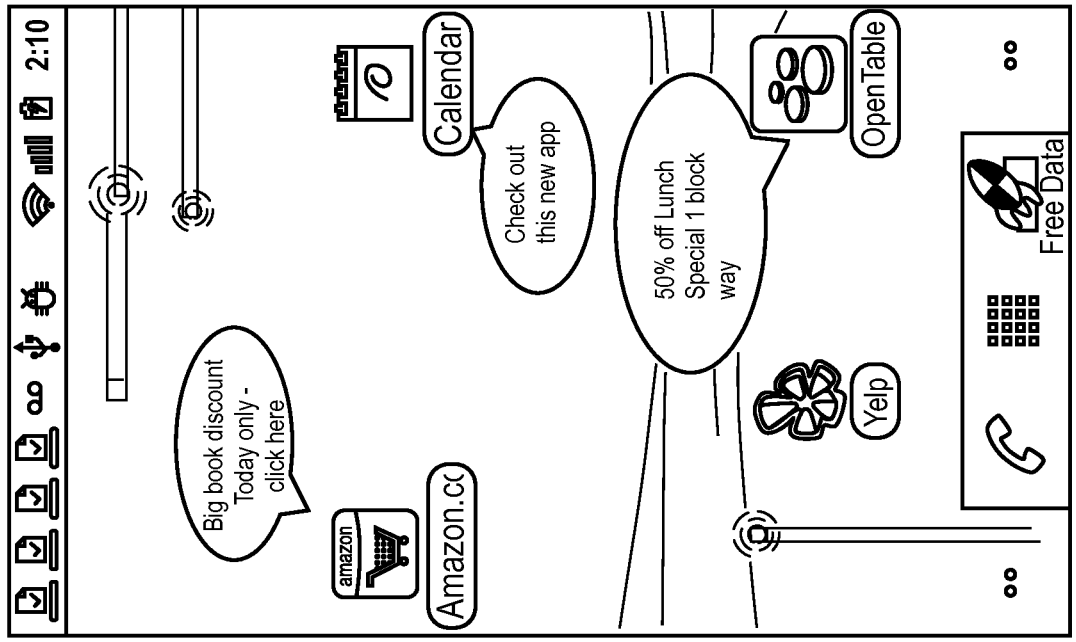
FIG. 10 shows a service and application marketing messages on service launch object icons located in a main device screen and a permanent launch bar in accordance with some embodiments.

FIG. 10 shows example embodiments for elevating service or application discovery level with service launch object notification messages that are conditioned on time (Amazon discount today only), geography (Opentable 50% lunch discount within one block) and a service launch object notification that is not conditioned on time or geography (calendar connected application service—check out this new application). In some embodiments, one or more of the service launch objects in FIG. 10 have been placed by the UI location manager 132 on the main device home screen as instructed by the device management system 170. In some embodiments, one or more of the service launch object in FIG. 10 are placed by the user, and the UI location manager locates where the user has placed the service launch object on the user device UI and then places the service launch object notification message in association with the proper UI location. In some embodiments in which the user has control of service launch object placement in the UI, the UI location manager locates where the user has placed the service launch object on the user device UI and then modifies the appearance of the service launch object icon as described herein.

Figure 11:
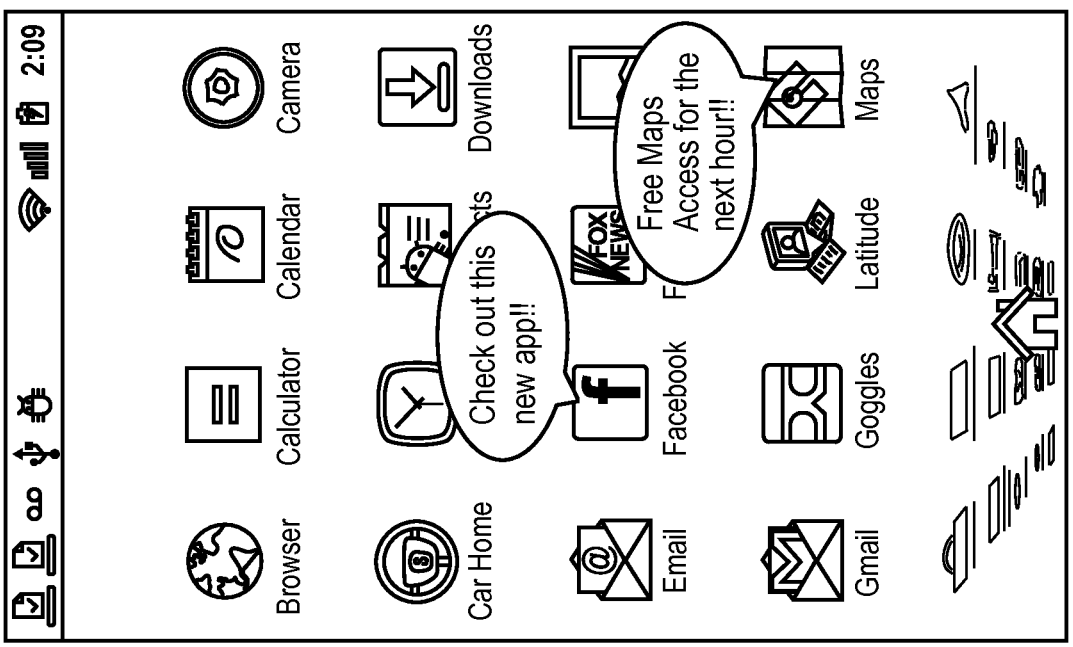
FIG. 11 shows a service and application marketing messages on service launch object icons located in an application stable in accordance with some embodiments.

FIG. 11 shows an embodiment wherein the service launch objects are located in the device application stable, and the UI location manager 132 locates a service launch object and places the associated service launch object notification message on that service launch object as directed by the device management system 170. In the example of FIG. 11, the notification messages are "Check out this new app!!" for Facebook and "Free Maps Access for the next hour!!" for Google maps.

In some embodiments, a UI location management console 160 provides a network manager a user interface environment for performing the one or more functions for composing service, application or content marketing or informative messages, associating the composed message with a service launch object, or initiating the communication of the message content to the device UI location manager 132.

In some embodiments, the UI location manager console 160 further provides a user interface for specifying when the composed message is to be displayed on the device. In some embodiments, the UI location manager console 160 further provides a user interface for specifying under what network state conditions the composed message is to be displayed on the device. In some embodiments, the UI location manager console 160 further provides a user interface for specifying under what device usage state conditions the composed message is to be displayed on the device.

Figure 22:
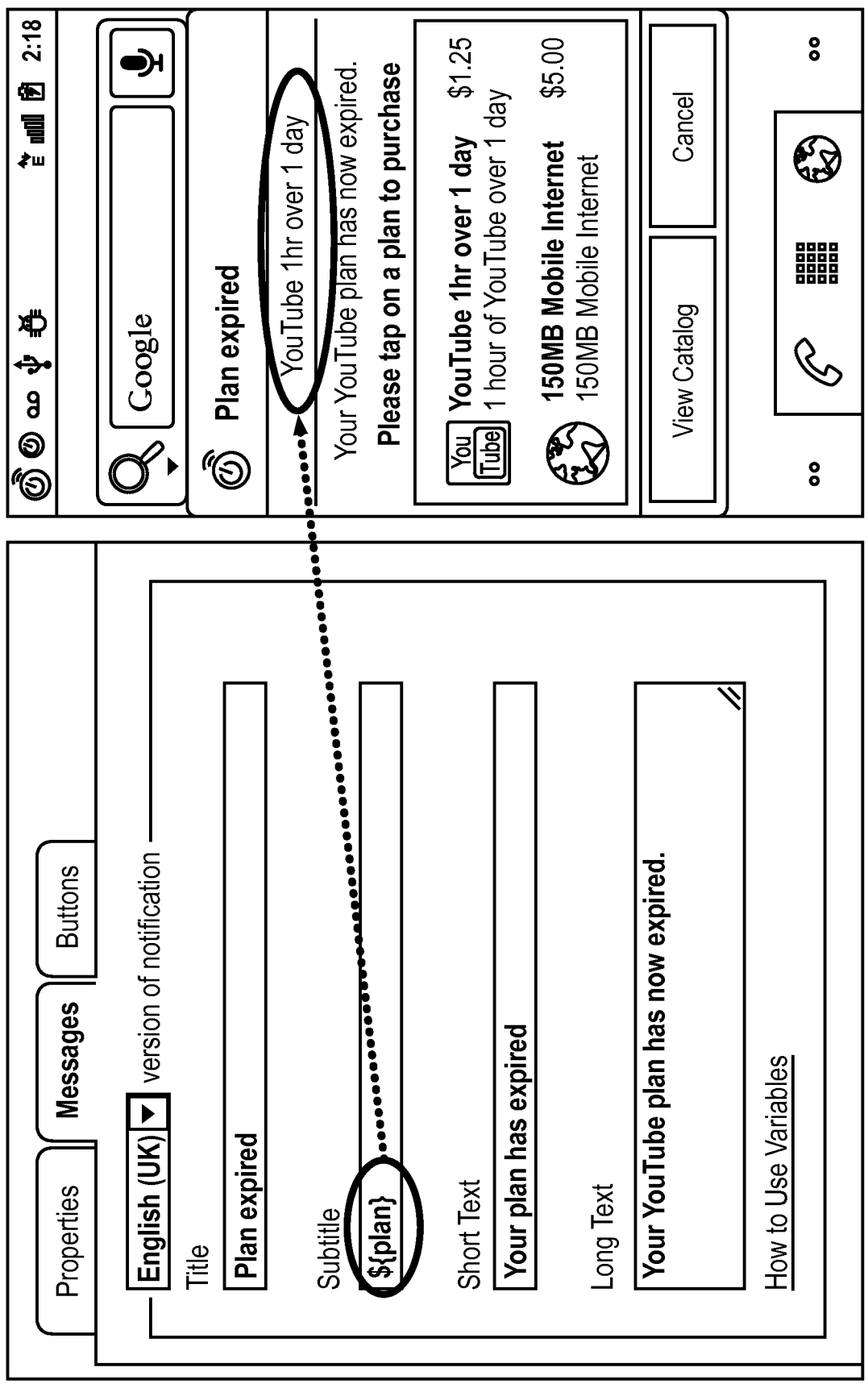
FIG. 22 shows the use of a variable to automatically customize the notification for the associated event in accordance with some embodiments.

In some embodiments, a variable is used to define notification messages in a notification template to automatically customize the notification for the associated event. FIG. 22 shows the use of a variable (for example, ${plan} to indicate a Name of service plan) to define notification messages in a notification template (and associated device view) to automatically customize the notification for the associated event in accordance with some embodiments.

Figure 23:
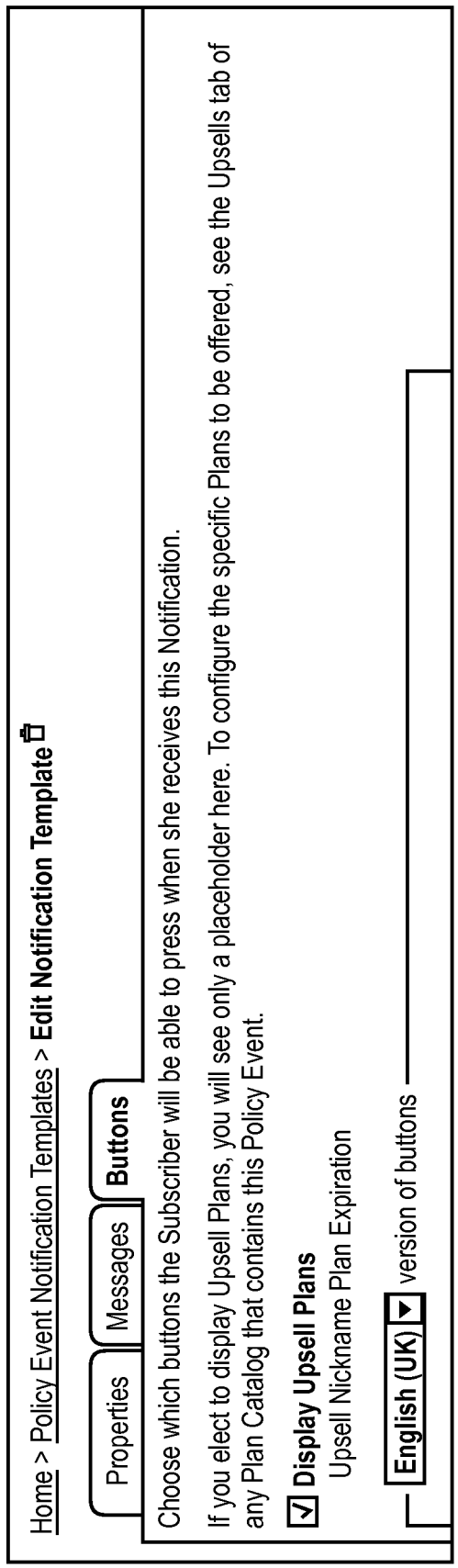
FIG. 23 shows a network manger UI environment for displaying upsell plans in accordance with some embodiments.
Figure 24:
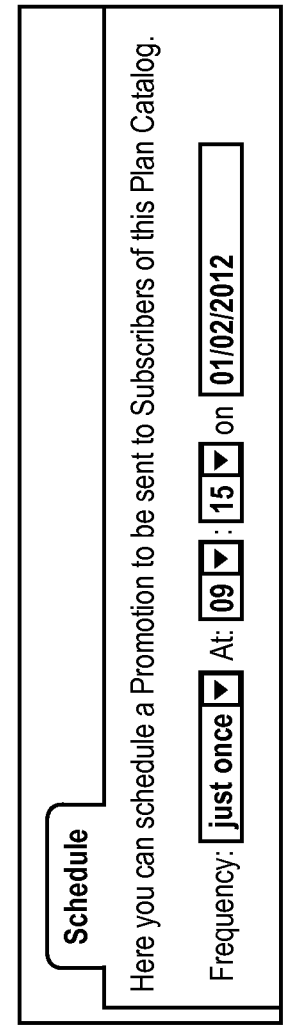
FIG. 24 shows a network manager UI environment for displaying promotional notification plan in accordance with some embodiments.

In some embodiments, a management console 160 UI provides a network manager a UI environment for displaying upsell plans. FIG. 23 shows a network manger UI environment for displaying upsell plans in accordance with some embodiments. In some embodiments, a management console 160 UI provides a network manager a UI environment for displaying promotional plans. In some embodiments, a management console 160 UI provides a network manager a UI environment for displaying promotional service or application as a function of time (for example, daily, weekly or based on a network or device or user state). FIG. 24 shows a network manager UI environment for displaying promotional notification plan in accordance with some embodiments.

Figure 25:
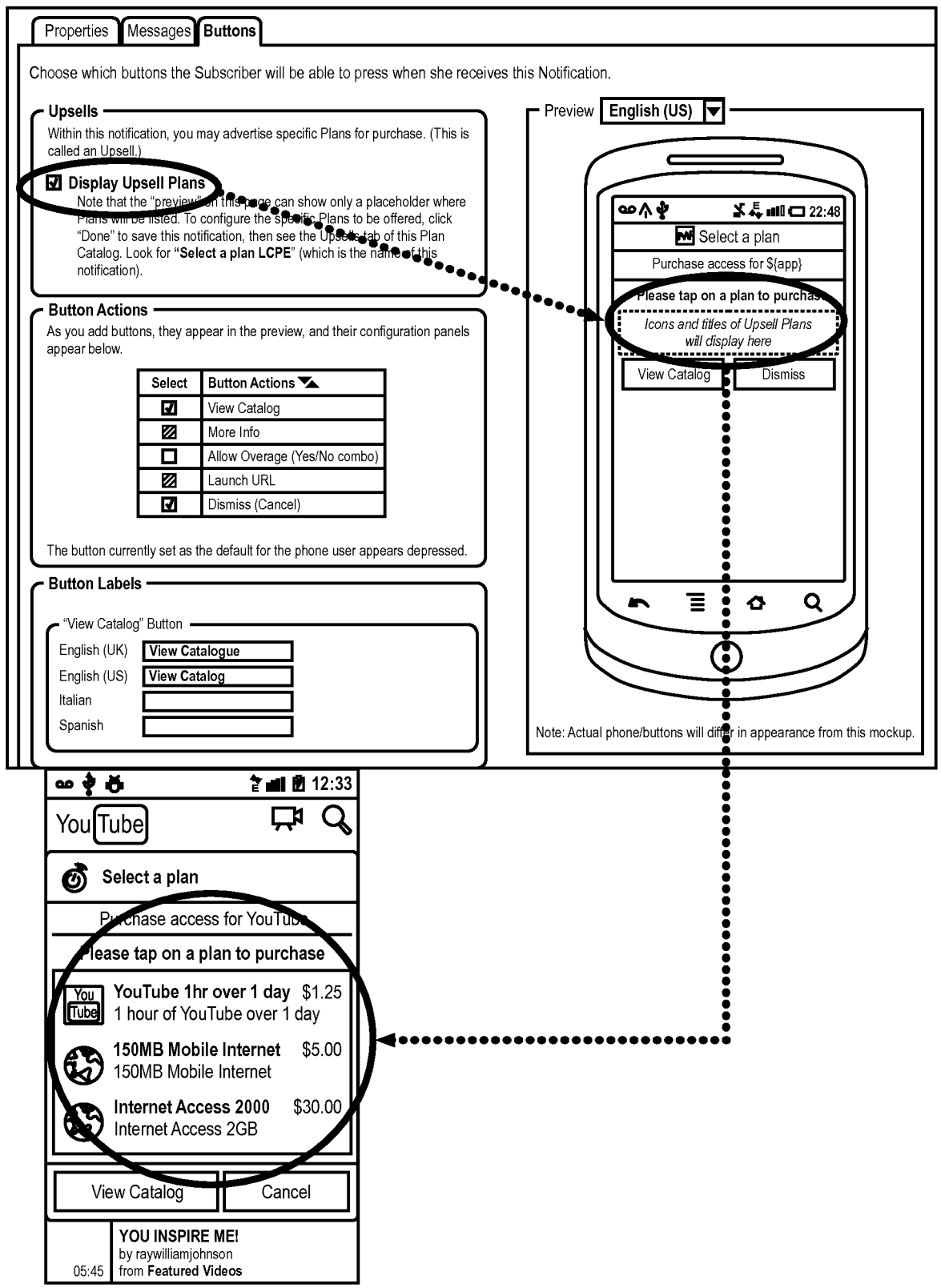
FIG. 25 shows a network manager UI environment for displaying notification templates (and associated device views) for defining a lack of capable plan (which may be combined with a offer for a upsell plan) for a desired service or application in accordance with some embodiments.

In some embodiments, a management console 160 UI provides a network manager a UI environment for displaying notification templates for defining a lack of capable plan (for example, lack of data service plan, or lack of access to an application or content—for example, requiring a service or application purchase) notification message for a desired service or application. FIG. 25 shows a network manager UI environment for displaying notification templates (and associated device views) for defining a lack of capable plan (which may be combined with a offer for a upsell plan) for a desired service or application in accordance with some embodiments.

Figure 26:
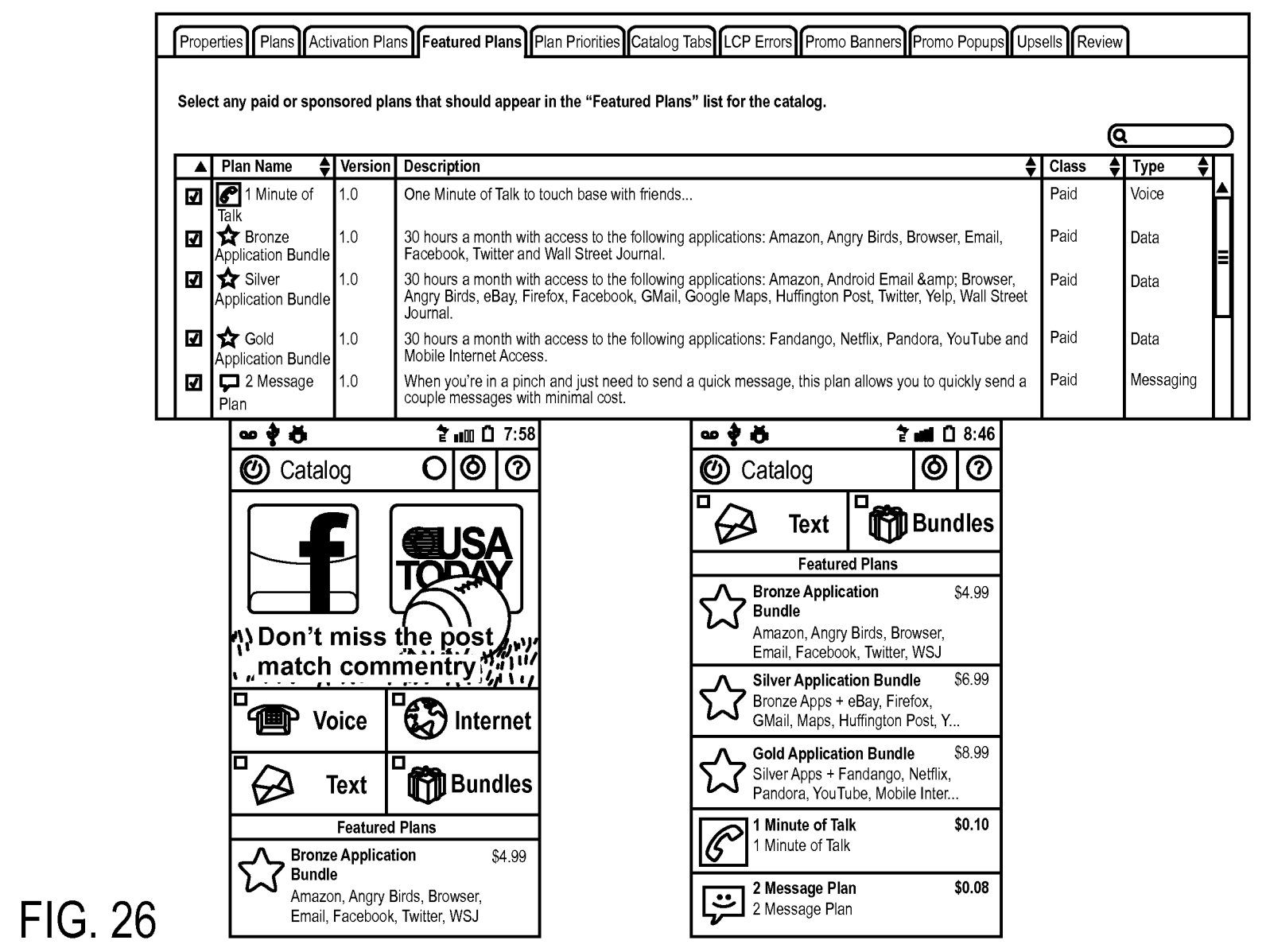

In some embodiments, a management console 160 UI provides a network manager a UI environment for displaying notification templates for defining featured service or application (for example) notification message for a desired service or application. FIG. 26 shows a network manager UI environment for displaying notification templates (and associated device views) for defining a featured service or application in accordance with some embodiments.

In some embodiments, a management console 160 UI provides a network manager a UI environment for displaying notification templates for defining a promotional banner (or banner ad) for (or to promote or market) a service or application or a promotional banner for a service launch object (or icon) associated with a service or application. In some embodiments, the promotional banners notification templates include one or more of a language, image, or associated plans. FIG. 27 shows a network manager UI environment for displaying notification templates (and associated device views) for defining a featured service or application in accordance with some embodiments.

In some embodiments, a management console 160 UI comprises a service design center showing device UI launcher view. In some embodiments, the service design center includes drag and drop icons. In some embodiments, selection of icons provides menus to components or plan view or settings.

Figure 12:
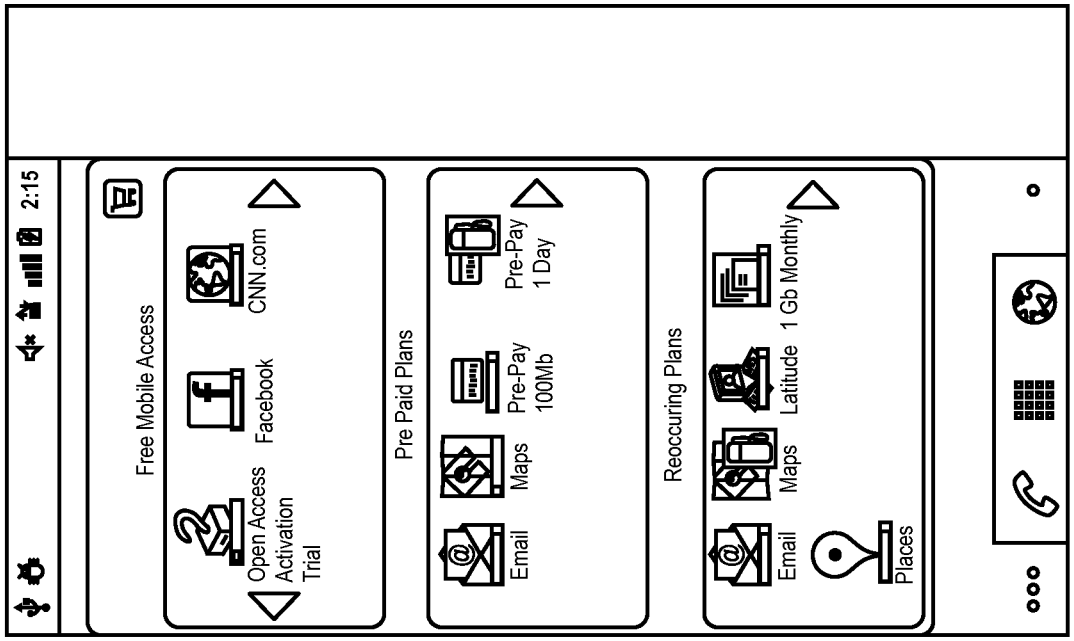
FIG. 12 shows a usage indication and purchase feature on service launch objects in accordance with some embodiments.

In some embodiments, the service launch object icon appearance is modified to indicate the status of service usage for a service plan. The status of service usage can be a graphic (such as a bar or gauge or hourglass or pie chart located on or near the service launch object icon) or a numeric value signifying amount used, amount remaining, percent used or percent remaining, etc. (for example, relative to a monthly quota or cap). FIG. 12 provides several examples of such embodiments. The service launch object icons in FIG. 12 are contained in the UI in a three-partition UI service launch partition, with one partition for service launch objects associated with sponsored services and connected applications, one partition for service launch objects associated with pre-paid services and connected applications, and one partition for service launch objects associated with post-paid (or recurring) services and connected applications. For example a service launch object can represent a specific wireless access service according to a set of service classification rules and the service launch object icon itself can display an amount (or percent or fraction) of service allowance consumed, or an amount of service allowance remaining. As a more detailed example embodiment, a pre-pay wireless service plan may allow for a certain amount of open Internet data usage (often specified in megabytes or gigabytes), and a usage indication is provided on a service launch object to indicate graphically how much usage is remaining or how much is consumed. An example is provided in FIG. 12 on the pre-pay 100 MB service plan service launch object icon, with the icon showing that roughly 85% of the service plan limit is remaining and 15% has been consumed. Another pre-pay example is shown in FIG. 12 where the Maps service launch object icon shows only approximately 10% of the service limit remaining with 90% consumed. In some embodiments, the usage bar is displayed in a different color (e.g., the color changes from green to red) to indicate that the remaining service plan is low and to encourage the user to purchase additional service soon (before the current service runs out). These example embodiments include different service plan usage classifications—one for wide open Internet and the other specifically for maps. It will be appreciated that many classifications of service are possible, including classifications based on a single application (e.g., Facebook), a single network communication end-point (e.g., a destination), a group of applications (e.g., social networking applications, such as Facebook and Twitter), a group of network communication end-points (e.g., several destinations), etc.

It will now be appreciated that if the two usage meters were provided only in a UI screen format unrelated to the service launch object icons, then the user would need to open that UI screen, observe the usage status for each of the user's active services, and then remember the usage status later on when the user intended to act on one of the service launch object icons by selecting that icon. In some embodiments, usage information is provided on the same screen that the user uses to act on the available services and applications. In some embodiments, usage information is provided on the same screen that the user uses to act on the available service launch object.

Further example embodiments for usage information displayed directly in association with a service launch object icon are provided in FIG. 12. For example, in FIG. 12 there is a limit to the amount of service usage available to the user in a given period of time for the sponsored (free in this case) services, and a user can easily see that the sponsored trial access is almost used up while there is still plenty of usage remaining for the Facebook and CNN services. In some embodiments, one or more sponsored services have limited usage. In some embodiments, one or more sponsored services (or any other service) have unlimited usage when that is the policy set by the network apparatus (for example, the device management system 170 or another network element). There are other paid recurring service examples provided in the paid recurring services partition in FIG. 12, with various service plan usage classifications and usage allowances, with allowances being based on a limit to the usage amount under the service plan classification or time based limits.

FIG. 12 also displays another embodiment for changing the appearance of a service launch object icon to indicate that service has not been purchased or that additional service must be purchased before the service or application may be used. For the embodiment in FIG. 12, the service launch object icon appearance modification to indicate that the service has not been purchased (or that additional service must be purchased before the service or application may be used) is indicated by the gas pump icon shown on the pre-paid one-day service and the post-pay (recurring) maps service. In some embodiments, the service application associated with the service launch object has not been downloaded yet when the user first clicks on it (as could be the case when the fuel pump icon feature is displayed), then the application is automatically downloaded, or the user is given an option to download the application.

In some embodiments, service launch object icon modifications make it easier for a user to identify one or more subsets of their one or more services or applications with plenty of service allowance remaining, or near the end of their service allowance, or requiring an initial or additional service purchase to use the service or application.

In some embodiments, usage information displayed on the service launch object icon is obtained by the UI location manager 132 (or an some other device agent), and the UI location manager 132 updates (for example, dynamically based on network state or device usage state) the service launch object icon as described in detail herein by changing the icon, overlaying another graphic, merging with another graphic or overlaying a notification message.

In some embodiments, usage information for a given service launch object is sent by a network element to the UI location manager 132 and formatted by the UI location manager 132 for display on the service launch object icon. In some embodiments, usage information is collected on the device 130 by the UI location manager 132 and formatted by the UI location manager 132 for display on the service launch object icon. In some embodiments, usage information collected on the device 130 by the UI location manager 132 is synchronized with usage information from network element, then displayed on the service launch object icon. In some embodiments, the usage information is displayed on the service launch object icon for a one or more network states. In some embodiments, the usage information is displayed on the service launch object icon when connected to a paid network (for example, 4G/3G/2G) but not displayed for a free network (e.g., home WiFi). In some embodiments, the usage information is displayed on the service launch object icon when usage is above a threshold. In some embodiments, the usage information is updated when network state changes (for example, the device may be subject to different usage limits and/or usage levels for 4G, 3G/2G, WiFi, home/roaming, etc.).

Figure 13:
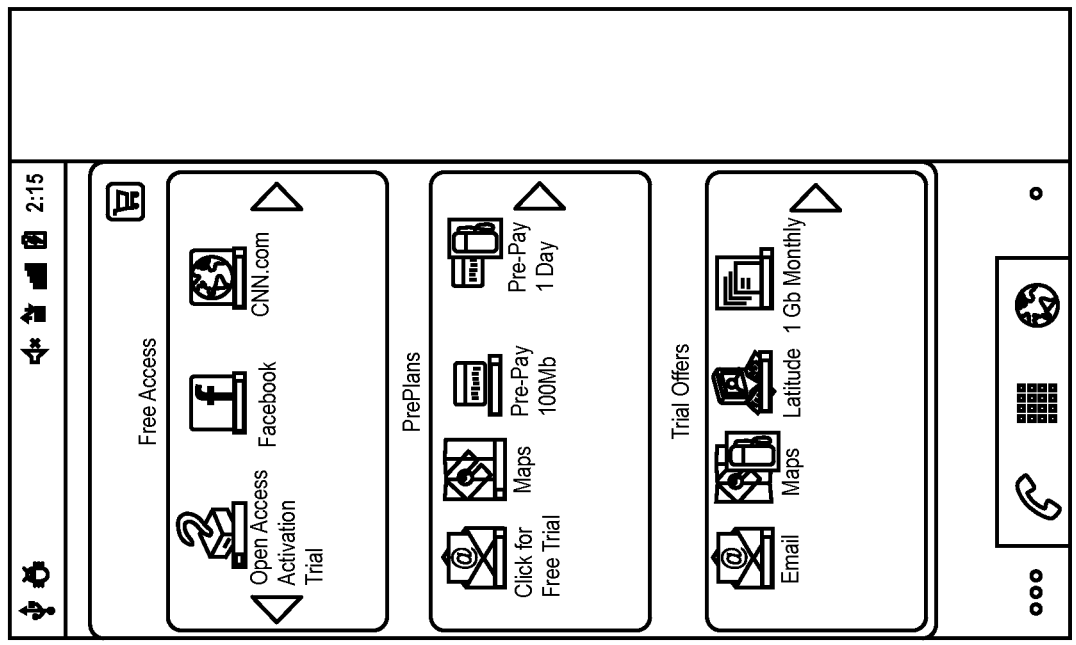
FIG. 13 shows a three-partition UI service launch partition that includes sponsored or free services, paid services, and trial offer services in accordance with some embodiments.
Figure 16:
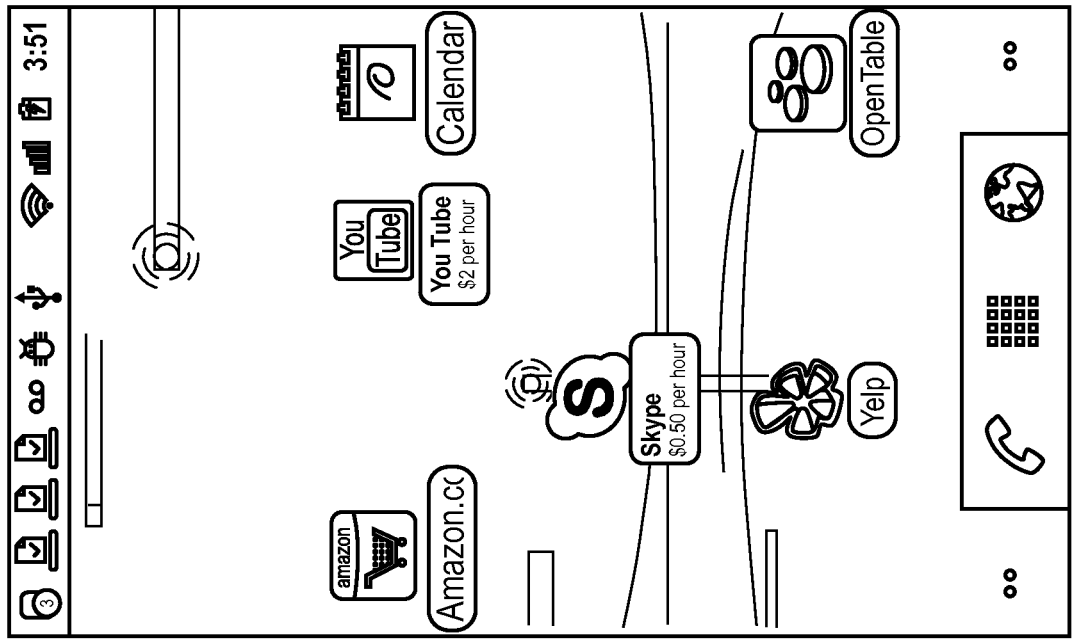
FIG. 16 shows a service launch object notification message with access service pricing according to embodiments.

FIG. 13 displays a three-partition UI service launch partition in accordance with some embodiments. The embodiment in FIG. 13 includes a service launch partition for trial offers (for example, plans). In some embodiments, trial offers (wherein trial offers may be limited, for example, time- or data-limited offers) contain service launch objects associated with services or applications that are available on a trial basis. In some embodiments, trial offers comprise limited trial offers. In some embodiments, limited trial offers contain service launch objects associated with services or applications that are available on a trial basis including one or more of the following limitations: for a period of time (for example, limited time trial offers) or for a subset of geographies (for example, limited geography trial offers) or for a subset of networks (for example, limited network trial offers). In some embodiments, limited trial offers contain service launch objects associated with services or applications that are available on a trial basis based on a limitation and are dynamically removed or swapped for other offers by the UI location manager 132. In some embodiments, limited trial offers contain service launch objects associated with services or applications that are available on a trial basis based on a limitation and are dynamically removed or swapped for other offers by the UI location manager 132 controlled by the device management system 170 (for example, a UI location management service provider). This is another embodiment for prominent discovery of services or applications that a UI location management service provider desires to present to a device user.

Figure 14:
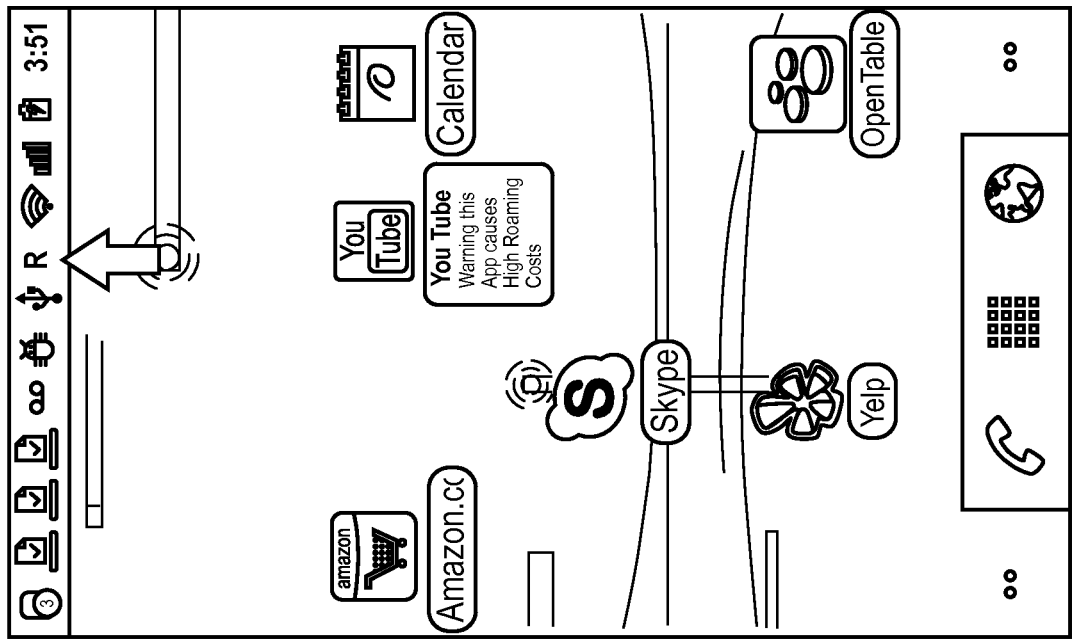
FIG. 14 shows a service launch object notification message with service launch object specific warning on service cost in present network state (in this case a roaming usage warning for a high data usage application and a highlight UI icon to emphasize roaming state) according to embodiments.

In some embodiments, one or more of the service launch object icon appearance, service launch object location or service launch object notification message change as a function of network state. FIG. 14 shows an example embodiment where the device has entered the roaming state and a service launch object notification message is displayed for a video streaming service that would be very expensive during roaming conditions. In some embodiments, a service launch object graphic feature is added according to the UI location manager policy or network instruction to highlight the roaming indicator on the device display (for example, the arrow in FIG. 13). In some embodiments, applications and services have varying degrees of roaming warnings (for example, no warning at all) based on usage (for example, fewer or less obvious roaming warnings for low data usage or sponsored services or applications) during roaming conditions. In some embodiments, sponsored service or application coverage by the sponsored service provider does not include roaming, and the user is notified. In some embodiments, sponsored service or application coverage by the sponsored service provider does not include roaming, and the user is notified they will receive roaming fees. In some embodiments, sponsored service or application coverage by the sponsored service provider does not include roaming, and the user is notified of a request for a response from the user (for example, by clicking or touching to select the service launch object) acknowledging that using the service will result in roaming fees. In some embodiments, the user's response is stored by the device management system.

In some embodiments, the service launch object icon changes appearance or color or animates to indicate a change in network state or service charges.

Figure 15:
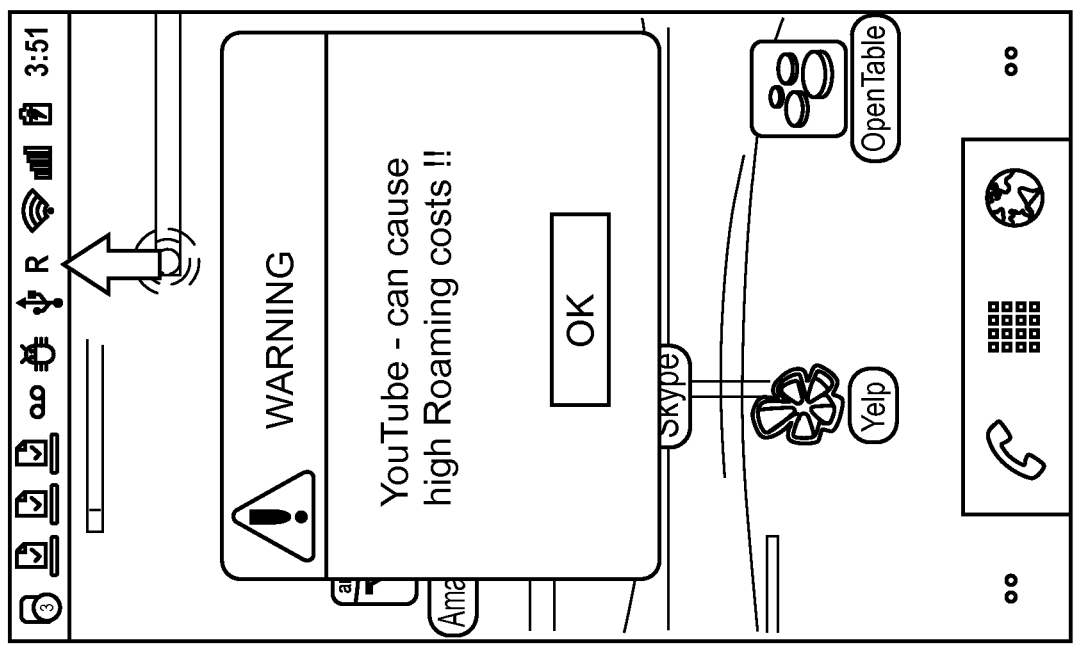
FIG. 15 shows a service launch object secondary notification message displayed after user chooses to launch the service or application (in this case a secondary roaming usage warning for a high data usage service or application) according to embodiments.

FIG. 15 shows a secondary notification message according to some embodiments. In some embodiments, a secondary notification message (for example, a warning) is configured to be presented when a user chooses to activate a service launch object under specific network state conditions (for example, while the device is connected to an expensive network, or a low performance network, or a low QoS network, etc.). In some embodiments, the secondary notification message (for example, warning) of the notification policy is managed by the remote device management system 170 and the device UI location manager 132, and after the user selects (for example, clicks) the service launch object a second notification message is provided. In some embodiments, the secondary notification message requires the user to (optionally) dismiss or accept for service launch object activation. In some embodiments, the secondary notification message persists for a set period of time or until the network state changes.

In some embodiments, the notification message is provided in a manner that does not interrupt service or application launch. In some embodiments, the service or application launch is held (for example, stalled or paused) until the user dismisses the message.

Figure 17:
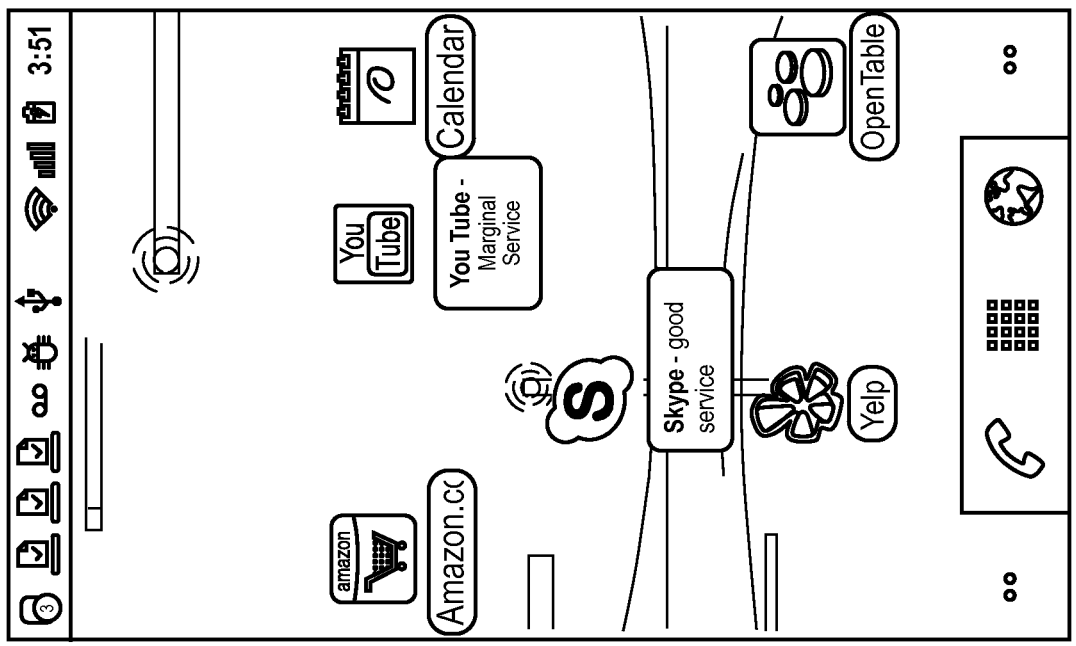
FIG. 17 shows a service launch object notification messages showing good quality-of-service (QoS) for a voice service and marginal QoS for a video service according to embodiments.

In some embodiments, the service launch object icon appearance, or service launch object location is modified, or a service launch object notification message is presented based on a network state (for example, network QoS, network congestion, network performance, network bandwidth, network data rate or network signal quality). For the example embodiment in FIG. 17 the network QoS has been assessed (by a device agent or the network) to meet a quality criteria (or alternatively to satisfy congestion criteria below a threshold or satisfy a data rate above a threshold or have high signal quality above a threshold) to support streaming voice over Internet protocol (VOIP) services. For the example embodiment in FIG. 17, the network state (for example, QoS, etc.) does not meet the criteria to provide good video service quality. In some embodiments, (for example, the embodiment in FIG. 17) the UI location manager 132 determines the network state level of quality (or receives service launch object network state messages from the network) and provides targeted service launch notification messages to one or more service launch object.

In some embodiments, (for example, the embodiment in FIG. 17) the UI location manager 132 determines the network state level of quality (or receives service launch object QoS messages from the network) and provides targeted service launch notification messages to the VOIP service launch object (Skype—good service) and the streaming video service launch object (YouTube—marginal service).

Figure 18:
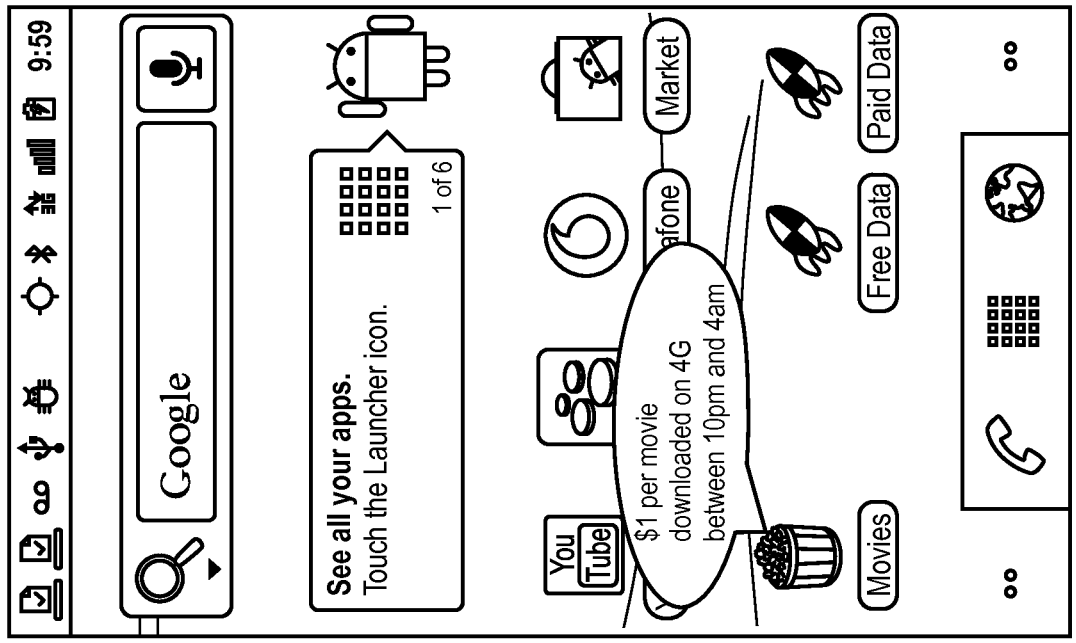
FIG. 18 shows a service launch object notification message with special pricing offer message (in this example a time of day based special pricing message) according to embodiments.

In some embodiments, service or application discovery level is elevated by providing a service launch object notification message for an offer. In some embodiments, the offer is a limited offer. In some embodiments, the limited offer is a limited offer, wherein the limited offer is offered over one or more of a limited time, limited geography, limited network, limited devices, limited users. In some embodiments, the service launch object associated with the offer may be in a UI service launch partition or some other location on the device including a main or home UI screen, or a secondary UI screen or some other UI area. FIG. 18 shows an embodiment where the connected movie application (for example, Netflix or iTunes) is displaying a service launch object notification message indicating that movie download is available at a special price during a limited time that the network is not typically busy. In some embodiments, the notification message is based on a network state that has sufficient capacity to allow less expensive downloads (for example, WiFi, 4G, etc.).

Figure 19:
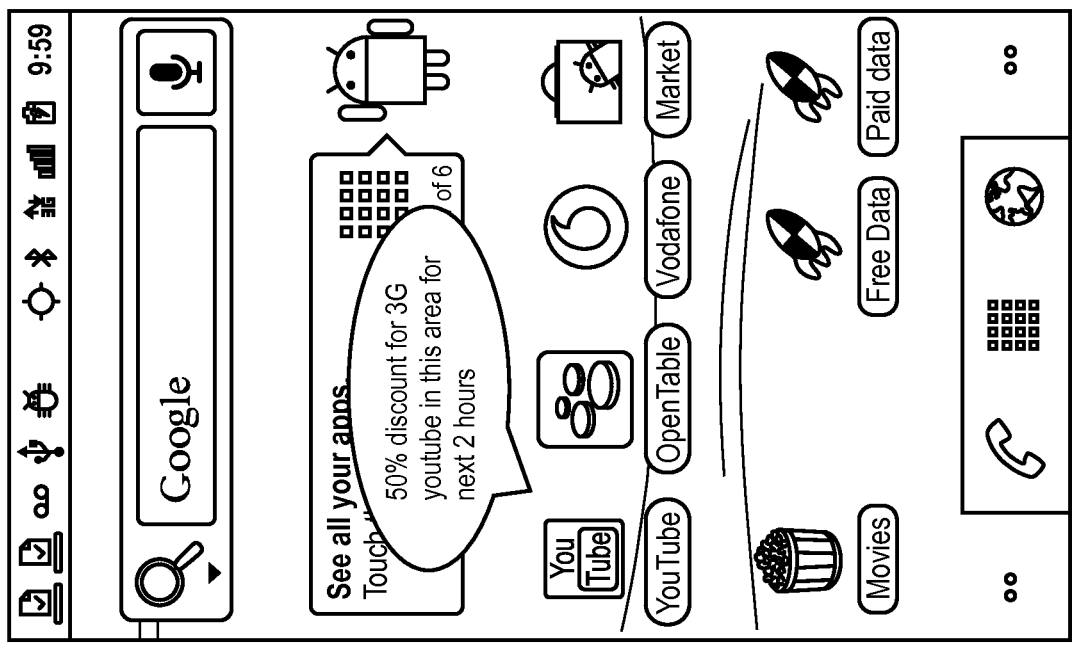
FIG. 19 shows a service launch object notification message with geography and time based limited offer message (in this case 50% off YouTube in the current geographic area for the next two hours) according to embodiments.

FIG. 19 shows another example embodiment where the streaming video application service launch object is indicating to the user a special price in the specific geographic location the device is in, with a time limit in case the network becomes busy again later. In some embodiments, a service launch object notification message to increase discovery level with a notification message is conditional on multiple limitations (for example, states or parameters). In some embodiments, a service launch object notification message to increase discovery level with a notification message is conditional on multiple limitations one or more of network state (for example, 3G in FIG. 19) and device usage state (for example, time of day and geographic location—"next 2 hours" and "this area" in FIG. 19).

It will now be clear to one of ordinary skill in the art that other combinations of network state and device usage state parameters may be used to condition the occurrence and content of one or more service launch object notification messages.

Figure 20:
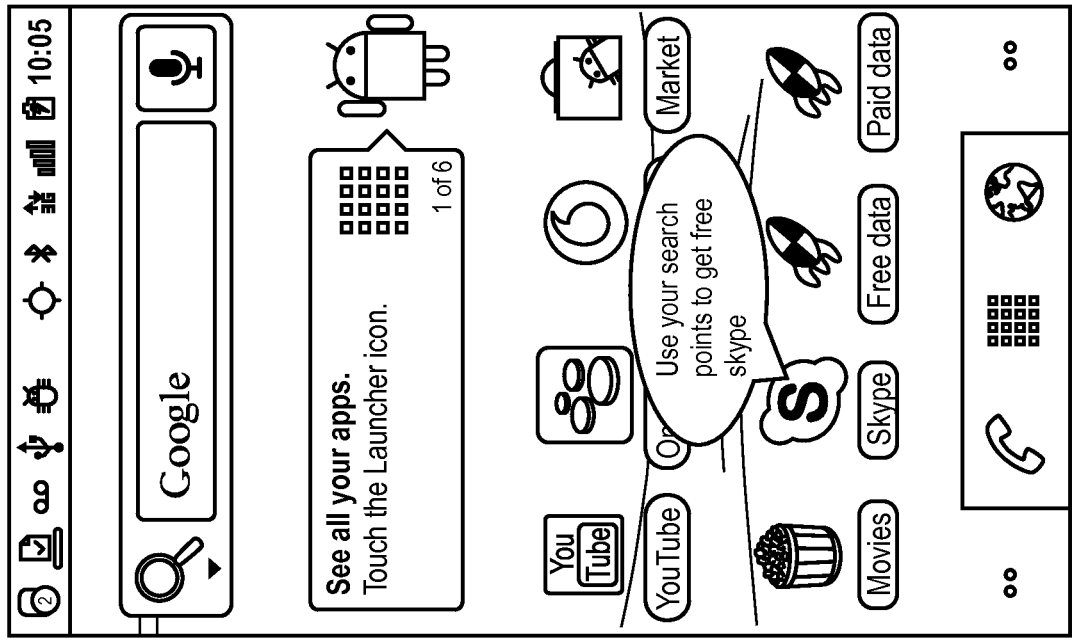
FIG. 20 shows a service launch object notification message with special offer to trade service usage points for discounted access services (in this case free Skype in exchange for usage points on browser search where search provider generates ad revenue when user uses the service) according to embodiments.

In some embodiments, a device user obtains service launch object usage (for example, network access service) allowance (for example, virtual cash, points, megabytes, etc.) by using services on the device which generate revenue for the UI location management service provider or a customer of the UI location management service provider. In some embodiments, a device user obtains service usage allowance (for example, virtual cash, points, megabytes, etc.) by using services on the device which generate revenue for the UI location management service provider or a customer of the UI location management service provider. FIG. 20 is an example embodiment wherein a device user can gain access service usage allowance by using services on the device which generate revenue for the UI location management service provider or a customer of the UI location management service provider. For example, in FIG. 20 the user is being informed by a service launch object notification message that they can now get free Skype service as a result of the usage points they have generated by using search services on the device.

In some embodiments, the UI location management service provider or UI location management service provider customer manages (for example, monitors or keeps track of) usage, visits, views, ad views, clicks, ad clicks, or user purchase revenue generated by the device user's use of service or on-device purchases, and manages (for example, monitors or keeps track of) of how many usage points (for example, point, virtual cash, megabytes, etc.) such events have generated for the user's account, and allows the user to convert the usage points into service or application usage (for example, access service) allowance for one or more services or services plans. In some embodiments, management system 100 counts service launch object interactions or banner ad views, coupon clicks, etc. and gives credit for service or application, discount account, reward points or cash.

There are a number of ways the UI location manager 132 can be designed to accept the various information elements such as service launch object information, application information, destination information, service launch object notification messages, network state policies and usage state policies as described herein, and use the network state information and/or usage state information and/or notification messages from the device management system 170 to re-locate service launch objects (or icons) in the device UI, or to change the features or graphics on the service launch objects, or to display different messages in, on, touching or in proximity to the service launch objects. Several detailed embodiments are provided herein. An exhaustive list of all possible embodiments for these functions is not practical and is of limited value to one of ordinary skill in the art once the various embodiments herein are understood. Armed with the teaching provided herein it will be clear to one of ordinary skill in the art how to create other design embodiments to accomplish the same functions.

It is also understood that the following embodiments for moving service launch objects, modifying service launch objects, and providing service launch object notification messages as a function of network state, device usage state or service launch object UI placement instructions from the device management system 170 are taught individually, it is understood that these embodiments may be combined. For example, the embodiments for moving the service launch object icon to different UI locations as a function of network state, device usage state or service launch object UI placement instructions from the device management system 170 can be combined with one or more of the embodiments for changing the appearance of the service launch object icon or providing a service launch object notification message. Similarly, embodiments for changing service launch object appearance can be combined with embodiments for changing service launch object notification messages, and so on.

In some embodiments, wherein the UI locations of the service launch object are changed as a function of various network states, the various UI locations corresponding with the various network states are stored in a table managed by the UI location manager 132 which indexes the table according to changes in the network state, when the network state change is detected and the proper UI location is looked up with the network state index, and the service launch object is moved to new UI location by the UI location manager 132.

In some embodiments, wherein the features of the service launch object icon are changed as a function of network state, the various icon features (for example, graphics files) and the current service launch object UI location are stored in a table managed by the UI location manager 132 which indexes the table according to changes in the network state, when the network state changes is detected and the proper icon features is looked up with the network state index, and the newly featured service launch object icon is placed by the UI location manager 132 on the device UI in accordance with the current service launch object UI location stored in the table.

In some embodiments, the features of the service launch object icon are changed as a function of network state, the various icon features (for example, graphics files) for a network state overlay feature (wherein the term overlay is used to include overlay, or superposition, or merge, or combine) and the current service launch object UI location are stored in a table managed by the UI location manager 132, and the table is indexed by network state, and when the network state change is detected and the proper overlay icon graphic is used to overlay with a basic icon graphic on the device UI in accordance with the current service launch object UI location stored in the table. In some embodiments, the overlay feature may be obtained from a network element (such as the device management system 170) by the device (such as the UI location manager 132) as described above. In some embodiments, the overlay feature may be obtained jointly by a network element (such as the device management system 170) and by the device (such as the UI location manager 132) as described above.

In some embodiments, the overlay is accomplished by the device (such as the UI location manger 132), wherein the device 130 processes a basic (for example, standard) application icon or service launch object icon to perform the overlay of the basic icon with the overlay feature to build a new composite icon on the device. In some embodiments, the overlay is accomplished by presenting the overlay graphics in, on or in close proximity to the location in the UI containing the application or service launch object icon, with the current service launch object location being derived from the current service launch object UI position in the aforementioned table.

In some embodiments, a service launch object icon (for example, including overlay feature) that changes as a function of network state is obtained from a network element (such as the UI location management server 150), after the UI location manager 132 detects the network state change and receives the new corresponding icon from the network element, the UI location manager 132 places the new icon in the proper service launch object UI location.

In some embodiments, wherein a service launch object notification message is changed as a function of network state, the various service launch object notification messages that vary with network state and the current service launch object UI location are stored in a table managed by the UI location manager 132 which indexes the table according to changes in the network state. In further embodiments, after the network state change is detected and the proper service launch object notification message is looked up with the network state index, the new service launch object notification message is used to replace the service launch object notification message that was used in a prior network state, and the new service launch object notification message is placed in, on, touching or in proximity to the service launch object icon in accordance with the current service launch object UI location stored in the table.

In some embodiments, a service launch object notification message that changes as a function of network state is obtained from a network element (such as the UI location management server 150), after the UI location manager 132 detects the network state change and receives the new corresponding service launch object notification message from the network element, the UI location manager 132 places the notification message in, on, touching or in proximity to the service launch object icon, with the new service launch object notification message being placed in the proper service launch object UI location by the UI location manager 132.

In some embodiments, wherein a service launch object notification message is changed as a function of device usage state, the various service launch object notification messages that vary with device usage state and the current service launch object UI location are stored in a table managed by the UI location manager 132 which indexes the table according to changes in the device usage state.

In some embodiments, the device usage state change is detected and the proper service launch object notification message is looked up with the device usage state index, and the new service launch object notification message is used to replace the service launch object notification message that was used in a prior device usage state. In some embodiments, the device usage state change is detected and the new service launch object notification message is placed in, on, touching or in proximity to the service launch object icon in accordance with the current service launch object UI location stored in the table.

In some embodiments, an updated (for example, dynamic) service launch object (for example, by changing one or more of service launch object location, or service launch object icon, or service launch object overlay feature, or service launch object notification message, or UI service launch partition message) that changes as a function of device usage state is obtained from a network entity (such as the device management system 170), when the UI location manager 132 detects the device usage state change and requests an updated service launch object from the network element, and then the UI location manager 132 places the new service launch object at the appropriate UI location. In some embodiments, the device 130 keeps a device usage state log and provides to a network element (such as the device management system 170) one or more of: the current state of service usage for one or more selected services, current or recent states of application usage for one or more selected applications, current or recent geographic locations, current or recent network destination history, current or recent applications being interacted with by the user, current or recent network state, how long it has been since the user interacted on a UI feedback element on the device; the device 130 receives from the network entity a new updated service launch object (or index) to replaced the previous service launch object and is placed by the UI location manager 132 in the UI location corresponding to the new updated service launch object. In some embodiments, at least a part of the usage state information is collected by the network entity. In some embodiments, at least a part of the usage state information collected by the device 130 is augmented by network entity usage state information. In some embodiments; the device management system 170 receives the device usage state information from the device 130, including one or more of: the current state of service usage for one or more selected services, current or recent states of application usage for one or more selected applications, current or recent geographic locations, current or recent network destination history, current or recent applications being interacted with by the user, current or recent network state, how long it has been since the user interacted on a UI feedback element on the device; and the device management system 170 performs one or more of the following tasks: process the usage state information to select services or applications most advantageous to highlight to the user, or provide special use offers to the user, or create service launch object notification messages for a services or application, or re-locating a service launch object or updating (one or more of location, features, overlay, etc.) a service launch object icon, or create a new set of service launch object UI location instructions or placement policies for the device (for example, for the UI location manager 132); and send the new set of service launch object UI location, updates, instructions or placement policies to the device (for example, the UI location manager 132).

In some embodiments, the device management system 170 receives from the device the device usage state information from multiple devices in a device group (for example, multiple devices associated with a user, an enterprise, a family plan, etc.), including one or more of: the current state of service usage for one or more selected services, current or recent states of application usage for one or more selected applications, current or recent geographic locations, current or recent network destination history, current or recent applications being interacted with by the user, current or recent network state, how long it has been since the user interacted on a UI feedback element on the device; and the device management system 170 performs one or more of the following tasks: process the usage state information to select services or applications most advantageous to highlight to one or more users of the device group, or provide special use offers to one or more users of the device group, or create service launch object notification messages for a services or application to one or more users of the device group, or re-locating a service launch object to one or more users of the device group or updating (one or more of location, features, overlay, etc.) a service launch object icon to one or more users of the device group, or create a new set of service launch object UI location instructions or placement policies for the one or more devices of the device group (for example, for the UI location manager 132); and send the new set of service launch object UI location, updates, instructions or placement policies to the one or more devices of the device group (for example, the UI location manager 132).

In some embodiments, an updated (for example, dynamic) service launch object (for example, by changing one or more of service launch object location, or service launch object icon, or service launch object overlay feature, or service launch object notification message, or UI service launch partition message) is changed with a new service launch object UI policy instruction received by the device UI location manager 132 from a network element (such as the device management system 170).

In some embodiments, the UI location manager 132 or the device management system 170 update a service launch object (for example, by changing one or more of service launch object location, or service launch object icon, or service launch object overlay feature, or service launch object notification message, or UI service launch partition message) in order to change the level of user information or user attention gathering for one or more service launch objects.

In some embodiments, updating a service launch object in order to change the level of user information or user attention is desired because a UI location management service provider desires to change the user discovery or marketing messages associated with one or more service launch objects associated with one or more services or applications. In some embodiments, updating a service launch object in order to change the level of user information or user attention is the result of payments received by the UI location management service provider from service providers or application developers whose services or applications are being highlighted in the new service launch object UI locations, messages and discovery positioning. In some embodiments, updating a service launch object in order to change the level of user information or user attention is the result of the UI location management service provider benefiting directly from enhanced service or application usage by the user. In some embodiments, updating a service launch object in order to change the level of user information or user attention is encourages the user to try new services or applications that the user has not used before.

In some embodiments, updating (for example, dynamically modifying) a service launch object (for example, by changing one or more of service launch object location, or service launch object icon, or service launch object overlay feature, or service launch object notification message, or UI service launch partition message) by the device management system 170 is applied on one device at a time from a device group.

In some embodiments, updating (for example, dynamically modifying) one or more service launch objects (for example, by changing one or more of service launch object location, or service launch object icon, or service launch object overlay feature, or service launch object notification message, or UI service launch partition message) by the device management system 170 is applied on one device at a time in order to enhance the user discovery of one or more services or applications are put in effect for one device at a time in accordance to a desired improvement in service launch object discovery for that device. In some embodiments, for updating service launch objects for device groups, payments received by a UI location management service provider are for the device group and not just individual devices. In some embodiments, for updating service launch objects for device groups, payments received by a UI location management service provider are for the device group and not just individual devices, and the payments are adjusted as a function of how closely the device group information (for example, information derived from device usage state—history, logs, demographic, geographic, etc.) matches the desired device group information for the entity that is paying for enhanced service launch object discovery (or selection, or use, or clicks, etc.).

In some embodiments, the UI location management console 160 provides a web portal (for example, an automated or secure web portal) for application developers to log in to set up sponsored services or device discovery levels for their applications or services. In some embodiments, the web portal provides a variety of options in various embodiments, including but not limited to service launch object discovery pricing that varies with one or more of: time per day or per week or per month spent on a given discovery level; UI location; notification message type; notification message length, extent or content; notification message frequency; network state; device usage state. In some embodiments, the web portal provides one or more of: icon upload for user designed icons, upload of user application or application specification for application store or marketplace download; network destination (for example, URL, domain, website, IP address, port, etc.) for a browser based service; etc.

In some embodiments, updating (for example, dynamic) one or more service launch objects (for example, by changing one or more of service launch object location, or service launch object icon, or service launch object overlay feature, or service launch object notification message, or UI service launch partition message) by the device management system 170 in order to enhance the user discovery of one or more services or applications are put in effect in accordance to a desired improvement in service launch object discovery for multiple devices that are part of a device group. In such embodiments involving modifications to service launch object UI discovery management for device groups, payments received by a UI location management service provider are for the device group and not just individual devices, and the payments may be adjusted as a function of how closely the device group demographic information (for example, information derived from device usage state history) matches the desired demographics for the entity that is paying for enhanced service launch object discovery.

In some embodiments, the device management system 170 provides a bidding function for enhanced discovery of services or applications, wherein service providers (for example, shopping service providers, location based advertising providers, on-line sellers of merchandise, content providers, access service providers, streaming service providers, social network service providers, Internet search service providers, etc.) or application developers (developers of applications who whish their applications to be highlighted to device users) are provided with a bidding mechanism to bid on service launch object UI location placement, features and/or service launch object notification messages. In some embodiments, the device management system 170 provides a bidding function for enhanced discovery of services or applications, wherein service providers or application developers are provided with a bidding mechanism to bid on service launch object UI location placement, features and/or service launch object notification messages, wherein the highest bidder receives the service discovery position being bid upon.

In some embodiments, the device management system 170 provides a bidding function for enhanced discovery of services or applications, wherein service providers or application developers are provided with a bidding mechanism to bid on one or more service launch object properties: placement, icon features, icon overlay, icon format, notification messages. In some embodiments, the device management system 170 provides a bidding function for enhanced discovery of services or applications, wherein service providers or application developers are provided with a bidding mechanism to bid on one or more service launch object properties: placement, icon features, icon overlay, icon format, notification messages as a function of one or more of: network state, device usage state, user state. In some embodiments, the device management system 170 provides a bidding function for enhanced discovery of services or applications, wherein service providers or application developers are provided with a bidding mechanism to bid on one or more service launch object properties: placement, icon features, icon overlay, icon format, notification messages as a function of one or more of: network state, device usage state, user state, wherein the highest bidder receives the service discovery position being bid upon. In some embodiments, service launch object are classified based on UI location, icon features or service launch object notification messages into "service or application discovery levels," wherein the premium levels of service discovery in general earn higher bids. Some embodiments involve classifying the service launch object UI location, icon features or service launch object notification messages into "service or application discovery levels," wherein the premium levels of service discovery in general earn higher bids. In some embodiments, a higher discovery level typically gains more attention from the user by having one or more of: more prominent service launch object UI location placement, more frequent specific information regarding the service launch object, more prominent service launch object notification messages. In some embodiments, a premium discovery level has the service launch object icon placed in one or more of the following attributes: in first position in a permanent or prominent UI service launch partition, the device main screen, or a permanent launcher bar on the device, frequent service launch object notification, frequent service launch object notification involving device usage state dependent analysis for when to provide the notification messages. In some embodiments, a lower discovery level would typically cost a bidder less, involves placement in the application stable of the device with little or no service launch object notification messaging. In some embodiments, an in between (or intermediate or typical or standard) discovery level might include one or more of the following attributes: non-permanent placement (for example, the user can modify the placement or can remove the service launch object icon from all but the application stable) in a UI service launch partition or a secondary device screen, notification messaging taking place only at certain times of day or certain geographic locations.

In some embodiments, device management system 170 (or alternatively a service design center or UI location management console 160) presents device UI view of discovery position on bidding interface. In some embodiments, device management system 170 presents device UI view of icon animation on bidding interface. In some embodiments, device management system 170 presents device UI view of coupon issue from bidding interface. In some embodiments, device management system 170 presents device UI view of notification from bidding interface. In some embodiments, device management system 170 presents device UI view of notification animation or coupon animation from bidding interface.

In some embodiments, the device management system 170 supports static purchase of device UI discovery level via an automated secure portal interface. In some embodiments, the UI location management console 160 is configured as a secure web interface for remote terminals. In some embodiments, a remote terminal user can log into a user sign up system where the users credentials and credit are established. In some embodiments, the user of the device management system 170 (for example, service provider or application developer) purchases pre-configured discovery levels at pre-configured pricing for pre-configured device groups.

In some embodiments, the device group information (for example, demographics, device parameters, device user parameters) are displayed to the user of the device management system 170 to help in determining the relative value of the various levels of discovery available. In some embodiments, the user of device management system 170 purchases one or more of: a discovery level for a pre-determined period of time, or for a pre-determined number of user service launch object views, service launch object notification message views, or service launch object clicks.

In some embodiments, the device management system 170 supports dynamic bidding and purchase of device UI discovery level via an automated secure portal interface. In some embodiments, the UI location management console 160 is configured as a secure web interface for remote terminals. In some embodiments, a remote terminal user can log into a user sign up system where the users credentials and credit are established. In some embodiments, the user of the device management system 170 bids upon various device group discovery levels, with the winning bidder purchasing that discovery level. In some embodiments, the user of the device management system 170 bids upon various device group discovery levels, with the winning bidder purchasing that discovery level for one or more of: a pre-determined period of time, a pre-determined number of user service launch object views, service launch object notification message views, or service launch object clicks.

In some embodiments, the number of views or clicks or selections or usage are tracked by the device (for example, the UI location manager 132) and reported to the device management system 170. In some embodiments, the number of views or clicks or selections or usage are tracked or estimated by the device management system 170, by either estimating the number of views as a function of time or by observing network traffic, or by a combination of both.

In some embodiments, the device management system 170 is configured to allow a portion of the device UI (for example, a partition in a UI service launch partition) to be controlled by a third party, such as an application store or application marketplace service provider, or a search provider, or a location based services provider or a mobile device advertising provider. In some embodiments, the device management system 170 is configured to allow a portion of the device UI (for example, one or more partitions in a UI service launch partition) to be controlled by a third party, such as an application store or application marketplace service provider, or a search provider, or a location based services provider or a mobile device advertising provider for placement of service launch objects, for example, prioritized, ranked, displayed, tiered to enhance discovery of associated service or applications.

There are numerous other detailed embodiment examples for selling UI discovery levels to service providers, a third party, third party service providers, content providers, merchandise retailers or application developers, either with discovery levels that are pre-negotiated and fixed for a period of time or geography or device or user population, or discovery levels that are bid upon in real time, that one of ordinary skill in the art will now understand. The teachings here show how to devise embodiments that enhance the ability to advertise services or applications by associating the marketing messages directly with the location, appearance and notification information directly associated with a service launch object or service launch object icon.

In some embodiments, the UI location manager 132 (or some other device agent), or the device management system 170 evaluates a user's use of services in order to determine a new service plan or an alternate service plan that the user might benefit from or be willing to purchase (an "alternate service"). In some embodiments, a user is currently using a pre-paid hourly Internet access plan, and the user is using several hours per day, and there is a less expensive post-paid recurring service plan, then the post-paid recurring service plan is identified as an alternate service by service analysis algorithms in the UI location manager 132 (or some another device agent), or the device management system 170. In some embodiments, a user is subscribed to a first service and the UI location manager 132 or the device management system 170 identify a service launch object notification message that is associated with a service launch object for the alternate service, and the service launch object message is communicated to the UI location manager 132 (or might be pre-cached on the device for retrieval by the UI location manager 132), and the UI location manager 132 places the service launch object notification message advertising an alternate service on, in, touching or near the service launch object corresponding to the alternate service.

In some embodiments, a user is subscribed to a first service and the UI location manager 132 or the device management system 170 identify a service launch object notification message that is associated with a service launch object for the alternate service, and the UI location manager 132 places the service launch object notification message advertising an alternate service on, in, touching or near the first service launch object.

In some embodiments, the UI location manager 132 manages the UI locations contained in a UI service launch partition with one or more launch partitions for organizing or displaying service launch objects. In some embodiments, the UI service launch partition displays a controlled version of a service launch object icon that is similar to a "standard" (e.g., generic or typical or normal) service or application icon (for example, the standard application icon that comes with an application delivered by conventional means such as application store or marketplace, Internet download or device user load) that is available in other UI locations on the device controlled by the user.

In some embodiments, the UI service launch partition displays a controlled version of a service launch object icon that is similar to a standard service or application icon (for example, that may be available in other UI locations on the device controlled by the user) wherein the controlled service launch object icon that exists within the one or more service launch partitions in the UI service launch partition has an appearance within the UI service launch partition that is modifiable, a location within the UI service launch partition that is modifiable, or has service launch object notification messages applied within the UI service launch partition as described herein.

In some embodiments, the service launch object icon appearance modifications, location modifications or service launch object notification messages that are managed or applied within the UI service launch partition are under the control of the UI location management service provider by means of the device management system 170 and the UI location manager 132 while the standard service or application icon that is located outside the UI service launch partition is not modifiable by the device management system 170.

In some embodiments, the UI service launch partition is an application, widget, OS library function or other software module that is installed in the OS or added to the OS (the "UI discovery management module") installed on the device. In some embodiments, the UI service launch partition is an application, widget, OS library function or other software module that is installed in the OS or added to the OS (the "UI discovery management module") installed on the device for the purpose of modularizing the software required to perform the device computing operations, communication operations, UI display operations and other operations required to implement the UI location manager 132. In some embodiments, the UI location manager 132 is integral to or contained within the UI discovery management module that manages which service launch objects are displayed to the user, the organization (wherein organizing includes any or all of ordering, prioritizing, ranking, sorting, classifying, etc.) of the service launch object icons within the UI service launch partition (including which partition a given service launch object is displayed in, the service launch object order within the partition, whether or not the service launch object is in the first display screen or the user has to scroll to see it, etc.).

In some embodiments, the UI discovery management module has pre-assigned UI location or UI graphic areas within the one or more service launch partitions for displaying service launch objects. In some embodiments, in order to simplify the process of communicating service launch object notification messages or placing them with the correct service launch object, each pre-assigned UI location or UI graphics area has the ability to display one or more service launch object notification message types in pre-configured locations or message formats, with the UI location manager 132 maintaining a table (for example, an array, a matrix, a look up table, etc.) or other means to identify which UI location or UI graphics area a given service launch object is located in so that when the service launch object notification message needs to be displayed it is placed in the correct UI location or UI graphics area. In some embodiments, placing service launch object in pre-assigned UI location or UI graphics area reduces the complexity of the modification, placement or notification messaging applied to one or more service launch objects is simplified or the complexity of the UI location and notification messaging management instructions that are communicated from the device management system 170 to the UI location manager 132.

In some embodiments, service provider controlled UI launcher UI partition has a background that is different from the device screen background. In some embodiments, service provider controlled UI launcher UI partition has a background that is different from the device screen background, wherein different is one ore more of color, texture, font, transparency, intensity, gray scale, etc. In some embodiments, service provider controlled UI launcher UI partition has it's own background or is "opaque" to device screen background. In some embodiments, application or widget is "opaque" to screen background.

In some embodiments, service provider controlled UI launcher UI partition is partially visible relative (for example, translucent) to the background of the device screen.

In some embodiments, service provider controlled UI launcher UI partition is not visible (for example, it is transparent or see-through) and takes on the same background as the device screen. In some embodiments, the UI launcher UI partition takes on the background of a live wallpaper or other animated screen type.

In some embodiments, application or widget is "transparent" to screen background. In some embodiments, transparent application or widget to screen background is accomplished with a UI partition graphic that is transparent. In some embodiments, transparent application or widget to screen background is accomplished with a UI partition graphic that determines the screen background and uses it as the UI partition background. In some embodiments, transparent application or widget to screen background is accomplished with a UI partition that consists of several individual launcher icons rather than an entire screen area.

In some embodiments, where the UI discovery management module is a OS library function or other software module that is installed in the OS or added to the OS for a group of devices the advantageous aspects of the invention are included directly in the device OS. In some embodiments, wherein the UI discovery management module is a software application or widget it may be downloaded (for example, "over the air" (OTA) or "over the Internet") by a user, or installed by a user, or installed by a device OEM, or installed by a service provider or installed by a device distribution agent without the need to include it in the device OS. In some embodiments, wherein the UI discovery management module is a software application or widget not included in the device OS, a download of the UI discovery management module provides the ability to control the service launch object icon appearance (for example, features, overlay etc.), location or notification messages in a controlled manner within the UI discovery management module. In some embodiments, wherein the UI discovery management module is a software application or widget independent (for example, optional or not integral or erasable without affecting OS other operations) of the device OS, a download of the UI discovery management module provides the ability to control the service launch object icon appearance (for example, features, overlay etc.), location or notification messages in a controlled manner within the UI discovery management module. In some embodiments, wherein the UI discovery management module is a software application or widget not included in the device OS, a download of the UI discovery management module provides the ability to control the service launch object icon appearance (for example, features, overlay etc.), location or notification messages in a controlled manner within the UI discovery management module without the need to control other (including for example, similar) application icons on the rest of the device that are controlled by the user. In some embodiments, a UI location management service provider manages the discovery of service launch objects with little or no need to undertake the complexities of device software integration or OS software integration.

In some embodiments, a UI location management service provider, wherein the UI discovery management module is a software application or widget that may be downloaded the complexities of OS software integration are reduced (for example, avoided).

In some embodiments, an organization screen is provided in the UI service launch partition to provide the user with a list of UI service launch partitions that the user can to choose from for displaying one or more categorized (wherein categorized may also be classified, ranked, organized) service launch objects within one or more partitions within the UI service launch partition. In some embodiments, the organization screen provides a user the option to select from a one or more display screens that each consist of one or more UI service launch partition that organizes a categorization of service launch objects. In some embodiments, the organization screen provides a user the option to select from a one or more display screens that each consist of one or more UI service launch partition that organizes a categorization of service launch objects and upon selection the user is provided with a categorization screen. In some embodiments, the categorization screen comprises display screens that organize service launch objects for one or more of: service plan types (have been purchased, available but have not been purchased, sponsored, free, paid, pre-paid, post-paid, recurring, time based, usage based, trial offers, special offers, family plan services, multi-device services, enterprise or work services, consumer services, etc.), services categorized by application type (for example, music and video, news, browsing, voice and video communications, shopping, location services, live event services, one time special event services, etc.), demographic based categorization (for example, work vs. play services, teen demographic services, pre-teen services, family services, etc.), etc.

In some embodiments, the organization screen displaying multiple categorizations of service launch objects is the first screen the user sees (the UI discovery module "default" screen). In some embodiments, the organization screen is accessed by the user via a user action (for example, a voice command, keep pad input, selecting the screen or clicking a UI button). In some embodiments, a organization screen may be provided wherein the user may select from a set of options to display one or more UI service launch partition categories on the default user partition display in the UI service launch partition. In some embodiments, a user may select to display one or more service launch partitions from: free services, pre-paid services and trial services partitions (or any other available service launch object categories) within the UI service launch partition. In some embodiments, a user may elect not to display one or more of post-paid or recurring services (or any other available service categorization). In some embodiments, a subset of the service launch partitions are user selectable. In some embodiments, a subset of the service launch partitions are not user selectable. In some embodiments, a subset of the service launch partitions are exclusively controlled by the device management system 170 via the UI location manager 132. In some embodiments, a some of the service launch partitions are user selectable while others are controlled by the device management system 170 via the UI location manager 132. In some embodiments, if too many service launch partitions are available within the UI service launch partition for simultaneous display to the user, then the UI service launch partition can provide for scrolling through the available service launch partitions.

In some embodiments, the UI discovery management module provides for an alternative display of service usage for one or more service launch objects wherein one or more service launch object identifiers (for example, service launch object icon) are displayed along with a usage indication for the one or more service launch objects. In some embodiments, the UI discovery management module provides for an alternative display of service usage, wherein the service usage is categorized. In some embodiments, service usage is categorized by service launch object. In some embodiments, service usage is categorized by (or further broken down by) one or more of application, network destination, network communication end-point (e.g., source or destination), application type, service type, network type, home vs. roaming, geography and service class.

In some embodiments, service or application discovery level (for example, discovery position) revolve through a UI partition according to a service launch object priority. In some embodiments, one of more of: a discovery level position or a discovery position range, a time in discovery position, a percent of time in discovery position, number of views or clicks, etc. are specified. In some embodiments, notification messaging is specified as a percent of service launch object icon interactions (for example, views, clicks, touches, voice commands, etc.).

In some embodiments, UI 160 manages at least a part of the device UI 136 presentation. In some embodiments, UI 160 manages at least a part of the device UI 136 presentation wherein presentation comprises one or more of view, display, format, number of screens. In some embodiments, UI 160 manages at least a part of the device UI 136 view for one or more of service launch object UI location, service launch object notification messages, service launch partition, service object launcher, UI discovery, service launch object icon. In some embodiments, UI 160 manages at least a part of the device UI 136 view for one or more of service launch object UI location, service launch object notification messages, service launch partition, service object launcher, UI discovery, service launch object icon based on user input (for example, user profile or preferences) or user behavior (for example, usage history or logs).

In some embodiments, UI 160 includes a console UI with view of device UI 136 one or more screens. In some embodiments, UI 160 includes a console UI with view of device UI 136 service launch partition. In some embodiments, UI 160 includes a console UI with view of device UI 136 for arranging configurations for service launch partitions. In some embodiments, UI 160 includes a console UI with view of device UI 136 for arranging configurations of one or more of skins, branding, color scheme, buttons and button arrangements. In some embodiments, UI 160 includes a console UI with view of device UI 136 to drag and drop (wherein for all instances drag and drop may be exchanged for drag or drop or move up or move down) of service launch object onto desired location in UI location management console 160 device UI launcher view for accomplishing correct positioning of service launch object on device. In some embodiments, UI 160 includes a console UI to associate service launch object icons with service launch object configuration elements.

In some embodiments, UI 160 enables drag and drop of service launch object onto a desired location in UI 160 device UI launcher view to provision the device with service launch object parameters. In some embodiments, UI 160 associates service launch object icons with service policy elements in UI location management console 160.

In some embodiments, UI 160 enables drag and drop of service launch object onto desired locations in UI 160 device UI launcher view to define service plan or service plan component policies for the service launch object.

FIG. 28 shows a network manager UI environment for displaying notification templates (and associated device views) to drag a service or application up or down for presentation order (for example, priority, discovery level, etc.) in a device in accordance with some embodiments.

In some embodiments, UI 160 enables managing one or more of service launch object UI location, service launch object notification messages, service launch partition, service object launcher, UI discovery, service launch object icon as a function (or based on) network state, and device usage state.

In some embodiments, UI 160 defines a dynamic service launch object icon as a function of state, wherein the dynamic icon feature include one or more of icon service launch object appearance, overlay, placement, notification messages, etc.

In some embodiments, UI 160 defines a dynamic service launch object icon as a function of state, wherein the state includes one or more of network state, device usage state, and user state.

In some embodiments, UI 160 defines icon appearance as a function of network state or device usage state by selecting an icon and a secondary network state or device usage state screen to enter secondary appearance graphics (for example, one or more of: a new icon, an icon overlay, icon superposition). In some embodiments, UI 160 defines icon notification messages as a function of network state or device usage state by selecting an icon and a secondary network state or device usage state to enter secondary notification messages (for example, one or more of: type notification message text, select format, select graphics, select background, select a message from a table, etc.). In some embodiments, UI 160 defines icon notification message type as a function of network state or device usage state by selecting an icon and a secondary network state or device usage state to enter secondary notification messages. In some embodiments, UI 160 defines icon notification message type as a function of network state or device usage state by selecting an icon and a secondary network state or device usage state to enter secondary notification messages from one or more of: select notification message graphics background from drag and drop list, or enter new graphics, or type in notification message or choose from pre-specified list.

In some embodiments, UI 160 defines UI device views as a function of OS versions or device type. In some embodiments, UI 160 defines UI device views for a device group. In some embodiments, UI 160 defines UI device views for a device group sharing notification messages or icon appearance. In some embodiments, UI 160 defines UI device views for a device group includes one or more of: a configuration of launch objects, UI partitions, skins, branding, messages, etc. In some embodiments, UI 160 defines UI device views for a device group includes selecting notification messages or icon appearance from a common list.

In some embodiments, UI 160 includes a console UI "sandbox" for developers to manage (for example, design, modify, update, select, pick) a service plan. The UI sandbox provides third parties or developers with at least a subset of the suite of service plan management tools available to the service provider. In some embodiments, UI 160 management of a service plan comprises defining discovery position or time in discovery position.

In some embodiments, UI 160 management of a service plan comprises specifying time in discovery position based on a revolving percentage of time. In some embodiments, UI 160 management of a service plan comprises defining time in discovery position based on a screen view percentage.

In some embodiments, UI 160 management of a service plan comprises a developer entering credit credentials. In some embodiments, UI 160 management of a service plan comprises a developer billing based on more of more of: discovery position, discovery time in position, discovery percentage of time, number of views, number of clicks, notification messages (for example, one or more of frequency, period, duty cycle, dwell time, view refreshes, percentage, relationship with other notification messages), purchase revenue share, analytics generated messaging.

In some embodiments, UI 160 management of a service plan comprises a developer billing based on revenue share. In some embodiments, UI 160 management of a service plan comprises a developer obtaining analytics generated messaging.

In some embodiments, management system 100 includes auto-download of associated service or application after UI launcher receives service launch object.

In some embodiments, management system 100 includes auto-download of application when UI launcher receives service launch object so that user does not have to do this through marketplace. In some embodiments, the developer pays (or is billed) for auto-download of application or service capability.

In some embodiments, if a service or application or website is blocked (e.g., the device is not authorized to use the application or access the website under a current service plan or service policy), a notification message (for example, a text string with the blocked message) is presented that no plan is available to allow the service or application or website. In some embodiments, a button is provided to dismiss the message. In some embodiments, a button is provided to manage (for example, stop or stall or put into the background or kill) the service or application or website. In some embodiments, a button is provided to launch the user into an application management screen to manage (for example, stop or stall or put into the background or kill) the service or application or website.

In some embodiments, the UI location management system is associated (for example, coupled) to an application store or marketplace. In some embodiments, when or after an application developer uploads applications, the application developer receives an offer to bid on one or more of more of: discovery position, discovery time in position, discovery percentage of time, number of views, number of clicks, notification messages (for example, one or more of frequency, period, duty cycle, dwell time, view refreshes, percentage, relationship with other notification messages), purchase revenue share, and analytics generated messaging. In some embodiments, when or after an application developer uploads one or more applications, the application developer receives an offer based on revenue share. In some embodiments, when or after the application developer uploads applications, the application developer receives analytics generated messaging.

In some embodiments, when or after an application developer uploads applications, the application developer receives an offer to bid on one or more of more of: discovery position, views, time in position with percentage, clicks, messaging frequency (time, view refreshes, percentage), icon animation, icon feature change, purchase revenue share, analytics generated messaging.

In some embodiments, the management system 100 recognizes the service or application plans a user (or device)

has, and the launcher has a buy up (or upsell) selection (for example, a button) that offers upgrades. In some embodiments, the management system 100 recognizes the service or application plans a user (or device) have and the UI 136 has a buy up button that offers upgrades.

In some embodiments, an offer to buy-down (or downsell) is buried in (e.g., available through) a lower discovery screen.

In some embodiments, an offer to buy-down is buried in a lower discovery screen that has a larger number (including all) of service launch object choices and that the user has to discover through a multi-screen navigation.

In some embodiments, management system 100 includes a web application programming interface (API) and application to implement a service object launcher widget. In some embodiments, management system 100 includes a website to implement service object launcher widget.

In some embodiments, service launch objects are organized into categories set by the UI location management server 150. In some embodiments, service launch objects are organized into categories set by the device management system 170 as controlled by a service provider.

In some embodiments, the UI 136 is partitioned in areas of carrier (or service provider) control only or user control only or shared carrier and user control.

In some embodiments, a service launch object assists or becomes a discovery mechanism comprising one or more of the following: changing appearance of the service launch object based on carrier (wherein carrier could be a service provider or third party) control, placing notification messages on, in or near service launch object under carrier control, duplicating (for example, with derivate or modified or enhanced) icons of standard application icons, where duplicate icons are under carrier control and initiate other processes on the device (in addition to or instead of launching the service or application), automatic appearance or addition or removal of launch objects in a category, changing launch object categories, offering a marketing vehicle for application developers to market their services or applications.

In some embodiments, a service or application developer makes a widget (to replace the standard service or application icon) that the service or application developer controls and uses it to market a service or application. In some embodiments, a plurality of service or application developers make a widget to market a service or application. In some embodiments, a plurality of service or application developers share a widget by a third party to market a service or application. In some embodiments, a carrier or service provider or OEM desires to control network load or user attention (for example, so-called "eyeballs"). In some embodiments, a carrier or service provider or OEM desires to control network load or user attention by a shared widget to market services or applications. In some embodiments, management system 100 provides a platform for a many (for example, a plurality of service or application providers) to one (shared device management system or application store or widget) to many (for example, a plurality of devices or users) marketing platform for one or more of: place notification messages (for example, promotions) on service launch object icons, move/add/delete service launch object icons, manage appearance of icons. In some embodiments, management system 100 provides a marketplace for service or application developers or service providers to promote their service or application with a service launch object icon. In some embodiments, management system 100 provides a marketplace for service or application developers or service providers to highlight their icons in the device discovery process.

In some embodiments, management system 100 provides service or application developer levels (where levels is equivalent to classes, categories, ranking, etc.). In some embodiments, management system 100 provides service or application developers one or more levels, with each level including one or more of the following features: place service or application in market place, monetize service or application use (for example, charge by view, click, time, update rate, bandwidth, etc. or for example, separate category for all application related traffic), positioning, amount of time/views/clicks in service discovery launcher, priority positioning, priority amount of time/views/clicks in service discovery launcher. In some embodiments, management system 100 offers service or application developers charge by view or click at a given developer or discovery level.

In some embodiments, a service launch object ad is the presence of the service launch object icon in a managed system that controls the device service launch object icon service discovery level. In some embodiments, ads are for a service or application on the device. In some embodiments, ads are associated to a plurality of applications. In some embodiments, an ad management system determines a service or application on device 132 and provides an ad based on controlling the service launch object.

In some embodiments, the ad management system determines a subset of service or applications on device 132 and manages ads to multiple applications at the same time. In some embodiments, the ad management system advertising functionality comprises downloading the service or application, and highlighting the application on the UI.

In some embodiments, the ad management system presents the service launch object icon as if the service or application had been selected, and initiates other processes in addition to launching the service or application when the service launch object icon is selected. In some embodiments, the ad management system presents the service launch object icon as if the service or application had been selected, and initiates other processes comprising recording the selection for one or more of: analytics, usage statistics, charging, providing service sign up notification or usage notification (for example, "here are your options for service to use this application" or a roaming warning), download the applications, etc.

In some embodiments, ads are associated to a launch partition in, on, or near the service launch object being advertised. In some embodiments, an ad is placed directly on or next to the service launch object icon. In some embodiments, an ad is placed in a banner (for example, a ticker tape). In some embodiments, the device UI portion reserved for ads includes several classified (or tiered or ranked) partitions for ads (for example, a plurality of tiered banners). In some embodiments, the device UI portion reserved for ads includes several classified (or tiered or ranked) partitions for ads (for example, a plurality of tiered banners) and the ad management system places ads into each classified partition based on one or more of network, device usage, device or user state and desired discovery level. In some embodiments, the device UI portion reserved for ads includes several classified (or tiered or ranked) partitions for ads (for example, a plurality of tiered banners) and the ad management system places (alternatively prioritizes) ads into each classified partition based on one or more of network, device usage, device or user state and desired discovery level and bids from one or more ad providers.

In some embodiments, service launch object icon features are varied to increase or decrease service discovery (for example, highlight one or more apps, grey-down one or more apps). In some embodiments, ads associated to service launch object have icon features other (for example, different) than the icon features on the service launch object itself.

In some embodiments, service launch object icons are made available according to a priority policy. In some embodiments, a user controls service launch object presence or placement in certain device UI areas, and service provider controls presence and placement in other UI areas. In some embodiments, the device 130 has a permanent UI placement area that user cannot remove or modify service launch object. In some embodiments, the ads are placed in a service provider controlled device UI area, and dynamically change placement (for example, rotate or round-robin based on a random or ranked method) for presentation to a user.

In some embodiments, management system 100 creates a service launch object icon similar to or identical to the standard service or application icon. In some embodiments, management system 100 places the service launch object icon in a UI discovery location or applies notification messaging on, in or near the standard service or application icon or modifies the service launch object icon appearance according to a service discovery priority policy for that service launch object.

In some embodiments, selecting the service launch object icon registers the selection for one or more of the following functions: usage history log, click charging, intercepting the service or application launch and providing service notifications, downloading the associated service or application, launching the service or application.

In some embodiments, a list of device service or application are obtained (for example, a search by UI location manager 132) for on device screen or in application stable. In some embodiments, management system 100 indicates that the service or application is on device to a marketing message management system. In some embodiments, the marketing message management system places service launch object icon for service or application in UI launcher. In some embodiments, the marketing message management system checks a device or user service plan status (for example, state) and if appropriate provides a marketing message to the user for services associated with that service or application. For example the marketing message management system notices the device has the YouTube application installed but does not have a special media streaming plan in place, and generates the marketing message: "would you like to learn more about a special media streaming plan service option?"

In some embodiments, the marketing message management system checks a device or user service plan status (for example, state) and generates a marketing message to the user for services associated with that service or application and the marketing message management system sends marketing messages related to the service or application. In some embodiments, the marketing message management system enters information of the device receiving the marketing message into a differentiated demographics value database indicating that marketing messages for that service or application are more valuable when sent to that device. In some embodiments, the marketing database charges more for sending marketing messages for that application to that device.

In some embodiments, interactions (responses, views, etc.) of a user with marketing messages are entered into a demographics value database for analysis (for example, regression, model fitting, classification, etc.). In some embodiments, the marketing message management system charges more for sending marketing messages for service or application to devices associated (for example, correlated) with analysis database information. In some embodiments, UI location manager 132 receives (for example, accepts) marketing message, finds service or application, places message on, in or near service or application.

In some embodiments, configuration or management of a UI launch area or other discovery management functions is performed by a device management agent, for improved user experience response time (for example, as user controlled UIs).

In some embodiments, configuration or management of UI launch area or other discovery management functions is performed by a device management agent, resulting in device software that is specific to a given OS. In some embodiments, the device management agent (for example, UI location management 132) accepts policies from a policy server (for example, UI location management server 150) to define one or more of UI launcher: launch partition, service launch object classification, configuration, branding, device placement, icons, icon placement, icon features, icon overlay, icon messaging, icon rotation, highlighting, messaging policies, icon launch processes.

In some embodiments, the device management agent (for example, UI location management 132) performs periodic update of service launch object (for example, one or more of service launch object icon, placement, notification messages, classification), or update of service launch object when user first clicks on portal widget. In some embodiments, the device management agent (for example, UI location management 132) downloads service or application (for example, if not available on device) via portal or portal instruction to download from application store or marketplace. In some embodiments, the device management agent (for example, UI location management 132) comprises device UI management policy instructions tied to UI location management console 160 which configures all of above. In some embodiments, UI location management console 160 accepts manager input and provisions device UI management policy instructions.

In some embodiments, the device management agent is assisted by a portal application and portal server API to define a part of policy on portal server rather than managing all on device. In some embodiments, this assistance provides an option for computation complexity sharing and device response time to user.

In some embodiments, the device management agent being assisted by a portal to define a part of a policy on a portal server results in less OS-specific software on device or a longer UI response. In some embodiments, the device management agent being assisted by a portal to define a part of policy on portal server results in considerable OS-specific software and slowed device responsiveness.

In some embodiments, the device management agent being assisted by a portal to define a part of policy on portal server (for example, UI location management server 150) to define one or more of UI launcher: launch partition, service launch object classification, configuration, branding, device placement, icons, icon placement, icon features, icon overlay, icon messaging, icon rotation, highlighting, messaging policies, icon launch processes.

In some embodiments, the device management agent (for example, UI location management 132) being assisted by a portal to define a part of policy on portal server (for example, UI location management server 150) performs periodic update of service launch object (for example, one or more of service launch object icon, placement, notification messages, classification), or update of service launch object when user first clicks on portal widget. In some embodiments, the device management agent (for example, UI location management 132) being assisted by a portal to define a part of policy on portal server (for example, UI location management server 150) downloads service or application (for example, if not available on device) via portal or portal instruction to download from application store or marketplace. In some embodiments, the device management agent (for example, UI location management 132) being assisted by a portal to define a part of policy on portal server (for example, UI location management server 150) comprises device UI management policy instructions tied to UI location management console 160 which configures all of above. In some embodiments, UI location management console 160 accepts manager input and provisions API information.

In some embodiments, the management system 100 is website based and results in minimal OS specific software on device or longer UI response. In some embodiments, the website-based approach provides less OS-specific device software, but has a longer UI response.

In some embodiments, the website based management system 100 manages one or more of UI launcher functionality: launch partition, service launch object classification, configuration, branding, device placement, icons, icon placement, icon features, icon overlay, icon messaging, icon rotation, highlighting, messaging policies, icon launch processes.

In some embodiments, the website based management system 100 performs periodic update of service launch object (for example, one or more of service launch object icon, placement, notification messages, classification), or update of service launch object when user first clicks on portal widget. In some embodiments, the website based management system 100 downloads from application store or marketplace. In some embodiments, the website based management system 100 comprises device UI management policy instructions tied to UI location management console 160 which configures all of above. In some embodiments, UI location management console 160 accepts manager input and provisions device UI management policy instructions.

In some embodiments, UI location management console 160 displays a device view for manager (for example, carrier, service provider, third party, service or application developer) to drag and drop icons or to drag and drop icons into discovery priority bin for one or more of the following management location options: device management agent based with policy download, portal based with API server log in, or website based. In some embodiments, UI location management console 160 displays device view for manager to specify messaging, or messaging taken from sponsor sandbox or for manager to drags and drops icons into messaging frequency policy bin for one or more of the management location options: device management agent based with policy download, portal based with API server log in, or website based.

In some embodiments, a policy to control (for example, one or more of: allow, block, warn, throttle, background, etc.) a service or application is combined with the policy to present (for example, display) of service launch object (for example, through service launch object icon).

In some embodiments, after a service or application that is attempted is identified, the application is offered as a service launch object in the "unpaid services," "paid services," or "free trial" offers. In some embodiments, when a user selects an unpaid service or application, a serve up service offer notification message is presented to the user. In some embodiments, the service launch object icon is used to get the user to try or buy services. In some embodiments, the device shares with a server that a service or application was attempted under a plan that did not cover the service or application. In some embodiments, after the device shares with a server that a service or application was attempted under a plan that did not cover the service or application, the server creates an offer notification message and instructs device to offer service or application in free trial area of service UI. In some embodiments, after the device shares with a server that a service or application was attempted under a plan that did not cover the service or application, a service launch object icon associated with the service or application is included in launcher.

In some embodiments, statistics are collected on one or more top applications tried but not paid for. In some embodiments, a user enters new trial plan by hand.

In some embodiments, the device management system 170 highlights (for example, with notification messaging) to devices where users have tried to install. In some embodiments, the device management system 170 or UI location manager 132 perform automated association of application with application specific policies and notification for free trial. In some embodiments, the device management system 170 or UI location manager 132 perform automated association of application notification for a bulk bucket free trial ("click here for a free trial of a service plan that will allow 'textstringxyz' app").

In some embodiments, user friendly services or applications increase revenues by expanding data users or expanding data devices. In some embodiments, user friendly services or applications increase value for one or more of service providers, access carriers, OEMs, third party over-the-top service or application providers, chipset providers and OS providers.

In some embodiments, a device is configured for select or trial or sponsored data access prior to delivery to a user. In some embodiments, a device is configured for select or trial or sponsored data access prior to delivery to a user, and the user does not need to configure or pay for partial service access. In some embodiments, basic device access is sponsored right out of the box and the user does not need to do anything to activate service. In some embodiments, from this sponsored out of the box condition, the user has certain "free" services that are sponsored by the service provider or third party. In some embodiments, the sponsored right out of the box devices include one or more of: sponsored website and application connection services, access to the carrier store, a limited amount of application specific services and bulk Internet access services that are provided on a trial (or limited or capped) basis. In some embodiments, the consumer is provided with an intuitive service or application user interface (for example, a permanent services discovery area on the device UI) where the user can instantly select from any number of service plans that are configured by the service provider.

In some embodiments, the arrangement of the permanent services discovery area on the device UI is OTA-configurable by the device management system 170 controlled by the carrier. In some embodiments, the enforcement of the required network control, charging or notification policies required to support service offerings, including one or more of sponsored and paid service offerings, is OTA-configurable by the device management system 170 controlled by the carrier. This policy enforcement and configuration capability is far beyond anything else in the market or on the drawing boards in the carrier network equipment world.

In some embodiments, over-the-top services or applications are monetized by managing application or service discovery placement and advertising. In some embodiments, an over-the-top service or application for a device group is sponsored, where the over-the-top service provider or application developer bids on earning a service discovery position for their service or application.

In some embodiments, a portion of the device home screen or other portions of the device UI are remotely configured or re-configured as a permanent carrier controlled service or application discovery UI environment. In some embodiments, a portion of the device home screen or other portions of the device UI are remotely configured or re-configured as a permanent carrier controlled service or application discovery UI environment (for example, dynamically or periodically or state based) by an OTA device management system 170. In some embodiments, an OTA device management system 170 configuration controls what the user can modify and what they cannot.

In some embodiments, the service or application icons displayed in the permanent discovery area are used to display a service or application launch opportunity the carrier wishes to provide the user.

In some embodiments, when the user selects a service launch object icon in the discovery area, the device inserts notification messages prior to, concurrently or after launching the service or application. In some embodiments, the notification messages include service plan offers customized to the service or application, service usage warnings (for example, service or application uses a lot of data, or service or application causes high roaming costs, etc.), offers for a related service or application, etc. In some embodiments, notification messages associated with a service launch object icon launch are OTA-configured.

In some embodiments, a network entity of management system 100 provides updates to the service launch object management (for example, UI discovery, placement, notification message, etc.). In some embodiments, a network entity of management system 100 provides a partial (or full) software upgrade for managing a service launch object. In some embodiments, a network entity of management system 100 provides updates to the policy or policy software or policy parameters associated with a service launch object. In some embodiments, a network entity of management system 100 provides a policy software updates to device 130. In some embodiments, a network entity of management system 100 provides service launch object management (for example, UI discovery policy) software updates to device 130. In some embodiments, a network entity of management system 100 provides a partial of full software upgrade (including new device software) to enable or update service launch object management (for example, UI discovery policy) to device 130.

In some embodiments, the service or application icons are re-arranged (for example, dynamically re-classified, re-ranked, re-prioritized, re-sorted) according to a discovery priority policy set by the device management system 170. In some embodiments, the re-arrangement is static between discovery policy updates between the device management system 170 and the device. In some embodiments, the re-arrangement is dynamic between policy updates between the device management system 170 and the device, wherein the arrangement of the service or application is modified periodically. In some embodiments, the re-arrangement is based on one or more of: interactions (for example, how many views, clicks, selections, voice commands) of the user with the UI launch area, whether or not the service launch object icon has been selected or a number of selections, how much time has elapsed, the geography the device is in, the network the device is connected to, network state, the time of day, the applications the user has recently been using, the websites the user has recently been using, cognitive state of the device, device parameters, user parameters (for example, profile, preferences), etc. In some embodiments, each service launch object icon has a discovery placement priority policy so that some service launch object are always displayed in a high discovery location, some service launch object are often displayed in a high discovery location, and some service launch object are rarely or never displayed in a high discovery location.

In some embodiments, a subset of service launch object icon within the launch area have a marketing message placed on it according to a service discovery policy. In some embodiments, the marketing message is defined by the service provider or entered into the service provider system by the service or application sponsor.

In some embodiments, each service launch object icon has a messaging priority policy so that some service launch object have frequent discovery messages, some service launch object have less frequent service discovery messages, and some service launch object rarely or never get service discovery messages. In some embodiments, the frequency of service launch object discovery messages is based on one or more of: interactions (for example, how many views, clicks, selections, voice commands) of the user with the UI launch area, whether or not the service launch object icon has been selected or a number of selections, how much time has elapsed, the geography the device is in, the network the device is connected to, network state, the time of day, the applications the user has recently been using, the websites the user has recently been using, cognitive state of the device, device parameters, user parameters (for example, profile, preferences), etc.

In some embodiments, management system 100 manages one ore more of: which or how many service discovery message the service provider wants displayed on service launch object icon at a given time (for example, number of simultaneous messages, dwell intervals, time spacing, etc.), how many service discovery messages should be displayed as a function of time, service discovery messages as a function of one or more: time of day, geography, network state, device cognitive state, user state, user interaction with the device, etc.

In some embodiments, the management system 100 locates a service launch object that has been downloaded to the device by the user and places service launch object icons in the launch area. In some embodiments, placing user-downloaded service launch object icons in the launch area is advantageous when the carrier offers services associated with the service or application that the carrier desires to promote. In some embodiments, this is advantageous if the service or application sponsor is willing to pay the carrier for increased discovery priority when the user has downloaded the service or application.

In some embodiments, the management system 100 locates a user service or application that has been downloaded to the device, identifies the location in the UI where the service launch object icon has been placed by the user, and provide service or application marketing messages in, on, or near the service launch object icon. In some embodiments, a marketing message is defined by the service provider or entered into the service provider system (for example, a service design center) by the service or application sponsor.

In some embodiments, each service launch object icon defined by the service provider or entered into the service provider system has a messaging priority policy so that some service launch object have frequent discovery messages, some service launch object have less frequent service discovery messages, and some service launch object rarely or never get service discovery messages.

In some embodiments, the frequency of service launch object discovery messages is defined by the service provider or entered into the service provider system and is based on one or more of: interactions (for example, how many views, clicks, selections, voice commands) of the user with the UI launch area, whether or not the service launch object icon has been selected or a number of selections, how much time has elapsed, the geography the device is in, the network the device is connected to, network state, the time of day, the applications the user has recently been using, the websites the user has recently been using, cognitive state of the device, device parameters, user parameters (for example, profile, preferences), etc. In some embodiments, the service provider (or entered into the service provider system) manages one ore more of: which or how many service discovery message the service provider wants displayed on service launch object icon at a given time (for example, number of simultaneous messages, dwell intervals, time spacing, etc.), how many service discovery messages should be displayed as a function of time, service discovery messages as a function of one or more: TOD, geography, network state, device cognitive state, user state, user interaction with the device, etc.

In some embodiments, the management system 100 locates a user service or application that has been downloaded to the device, identifies the location in the UI where the service launch object icon has been placed by the user, and overlays graphics or text or sounds (for example, a modified icon) in, on, or near the service launch object icon to provide one or more of: highlight the discovery level of the service launch object (or associated service or application) to the user, indicate whether the service or application can access the network (for example, wireless wide-area network (WWAN)) given the services available to the user (for example, services the user has elected to pay for), indicate whether the service or application is free or is charged to a user bucket, indicate whether the service or application currently has access to the network (for example, WWAN or WiFi) or not (for example, roaming policies can be set up according to applications, network policies can be set up according to application [4G, 3G, 2G, WiFi, etc.], QoS or congestion policies can be set up according to applications, etc.).

In some embodiments, management system 100 is configured with a device management secure back-end portal controlled by the carrier.

In some embodiments, the management system 100 device management secure back-end portal has a sandbox capability that allows service or application sponsors (or developers) to log in and pay for, or bid on one or more of the service or application discovery services described above. In some embodiments, the system provides for bidding on discovery location, message frequency, views, clicks, etc.

In some embodiments, the user gets more control of the device UI when the user pays more (for example, buys up or purchases an upsell service). In some embodiments, the user gets less control of the device UI in exchange for a service plan discount from the service provider. In some embodiments, higher levels of service plan (for example, more expensive plans, or by accumulating rewards from service or application usage) provide higher levels of UI customization. In some embodiments, the user gets a discount or a sponsored service (for example, subsidized service or application access) in exchange for allowing the service provider (or some other network entity, such as an application provider) to control the device UI. In some embodiments, the user receives a discount on device service to turn over a UI portion or partition of the device.

In some embodiments, two or more network entities (for example, a carrier and an application developer) share the revenue for an over-the-top service. In some embodiments, two or more network entities (for example, carrier and application developer) share the revenue for an over-the-top service (for example, a service launch object associated to a service or application or content), where one entity provides the service, application or content and the other entity provides the access.

In some embodiments, the device UI changes as user changes service plan. In some embodiments, the device UI shows free service or application until the user tries the service or application. In some embodiments, after the user tries the service or application, the service launch object shows entry level paid service or application. In some embodiments, after the user tries the entry level paid service or application, the service launch object shows upgrade service or application (for example, upsells). In some embodiments, if the usage of service or application (or revenue) falls back, the service launch object shows a lower cost alternative (for example, free service or application again). In some embodiments, the management system 100 change offered service launch object (or associated service or application) based on the available service launch object on the device.

In some embodiments, service plans are sorted from lowest to highest cost data plans based on (or normalized) a per unit time basis based on a number of previous weeks of usage. In some embodiments, only upsell (or buy up) service plans are shown in the sorted list.

In some embodiments, a user or network entity has several options for sponsored data and an auction (or bidding engine) selects the winning service.

In some embodiments, a service or application provider bids for UI discovery or placement (based on priority, user demographics, network state, device usage state, device cognitive state) over one or more geographies (for example, one or more area codes or cities) or over one or more geography tiers (nationwide, statewide, regional, sub-regional, address plus radius). In some embodiments, higher geography tiers receive a bid discount (for example, nationwide has a lower normalized cost than statewide).

In some embodiments, the service launch object provides control of the service or application. In some embodiments, the service launch object intercepts and controls the service or application. In some embodiments, the service provider (or OEM) takes over the service or application by installing a service launch object associated to the service or application. In some embodiments, the service launch object is associate to multiple service or application and has a table of service or application with policy entries for one or more of the associated service or application. In some embodiments, the policies comprise one or more of: hold launch, notify (user or network entity) of launch, acknowledge selection of service or application, launch service or application and log acknowledgement in customer care, notify in parallel to launch, block launch, block launch and notify user or network entity, notify, acknowledge (for example, log selection).

In some embodiments, the notification associated to the service or application associated to the service launch object comprise one or more of the following types of notification: need a service plan, selected application is expensive on this network, selected application is expensive when roaming, an advertisement associated to service or application (typically in parallel, but could be in series), offering alternate applications, offering related applications, offering related activity, offering related merchandise, combine with location, state, etc. information. In some embodiments, the notification associated to the service or application associated to the service launch object comprise informing a user of fraud. In some embodiments, the service is discontinued or discounted or service use is accelerated based on fraud. In some embodiments, the notification ranks service or applications according to what is about to run out. In some embodiments, the notification ranks service or applications according to what is about to run out and give an option to click down.

In some embodiments, the service provider manages location management service or application (for example, access services).

In some embodiments, the service launch object icon is the standard (wherein standard could refer to the generic, normal or typical) icon, and the management system 100 provides one or more of UI placement, location discovery (for example, including selecting portions in one or more UI partitions or tiers or classification) and network entity based policies (or directly managed by network entity) for the standard application icon.

In some embodiments, a service or application is launched when a network state change occurs, an entity of management system 100 obtains usage counts to determine that a service or application is in use, searches through table (for example, for policy instructions associated to service or application) associated with service or application in use, and enforces policy (for example, shut down service or application or keep service or application operating and notify user in parallel). In some embodiments, a network state changes after a service or application is launched, a subset of the service or application included in the active table are forced to quit and to re-launch on new network state.

In some embodiments, for bidding on UI location (placement, discovery level, etc.) of service or application associated to service launch object comprises a bid table. In some embodiments, the bid table includes one or more entries for: spots, graphics, text, animation per entry. In some embodiments, bid table entries have time service launch objects. In some embodiments, bid table entries have a minimum time window. In some embodiments, bid table entries change with time of day. In some embodiments, bid table entries have entries change with device usage state. In some embodiments, bid table entries have entries change with geo. In some embodiments, bid table entries include one or more of: bid on one or more spots, bid on one or more time service launch objects, bid on one or more time of day, bid on one or more geos. In some embodiments, the service launch object are swapped based on one or more of: changes is geo, network state, device usage state, etc.

In some embodiments, the bid is for a pre-configured geo. In some embodiments, the bid is on geographic location (city, state, etc.) or zip with radius. In some embodiments, the user of bidding platform pays for one or more of: per display, per unit time, or per click. In some embodiments, the base pay is for a unit time. In some embodiments, payment increased per view (for example, with a limit). In some embodiments, additional payment per click (for example, with a limit or cap). In some embodiments, pay increases for animation, etc.

In some embodiments, bulk buys (for example, discounts, rebates, coupons, etc.) are provider for large geographic areas (for example, nationwide). In some embodiments, bidder pays more for geographic specific bids. In some embodiments, bids have TOD policies. In some embodiments, bids have device usage (or network) state policies. In some embodiments, table entry in a given geographic and time of day goes to highest bidder. In some embodiments, the bid includes a minimum time window.

In some embodiments, bid winner algorithms as based on geographic level (for example, population or area size or level) selection relative to bid offer. In some embodiments, bidder screen provides selection of geographic areas to bid on and high bidder wins. In some embodiments, the highest nationwide bidder (for example, regardless of regional or local bidders). In some embodiments, regional highest bidder is considered if higher than a nationwide bidder by a target amount (for example, percentage or threshold, etc.). In some embodiments, location specific bidder is considered if higher than a regional (or nationwide) bidder by a desired target amount. In some embodiments, a device usage (or network or device or user) state specific bidder is considered if higher than larger geographic bidders by a target amount. In some embodiments, a previous bid winner is shuffle down if knocked down by higher bid (or higher by a give percentage or threshold) for higher position. In some embodiments, the bid winner algorithm is based on maximizing the revenue from bid pool or devices.

In some embodiments, bidding includes one or more spots including: spot for search, spot for featured sponsored, spot for ads, spots for coupons, spot for maps, etc. In some embodiments, the bidding includes bid types, for example, bid on specialized spots or bid on general purpose spots (for example, based on target user, or device, or geographic location, or network state parameters). In some embodiments, select targeted time or geography or state rules for special spots (vs. general purpose spots). In some embodiments, the bidding platform includes an area (or portion of device UI) for OEM customization. In some embodiments, the bidding platform includes an area (or portion of device UI) for user customization. In some embodiments, the area for OEM or user customization may be viewed on a service design center (SDC) screen.

In some embodiments, the portion of the device UI reserved for the launcher is configurable (for example, left, center right, small, medium, large, upper, middle, lower). In some embodiments, the portion of the device UI reserved for the launcher is SDC or OTA-configurable. In some embodiments, the device is configured to include a UI menu for configurable discovery management display or launcher. In some embodiments, the device includes a default launcher, for example, for (first) power up, and then user can subsequently change. In some embodiments, the default launcher comes back every power cycle or comes back after a set time or comes back after sleep. In some embodiments, the return to default launcher is SDC or OTA-configurable. In some embodiments, the launcher configuration is viewable in SDC screen.

In some embodiment place a special identifier near the launcher (for example, make a shim below launcher) so that launcher area is permanent. In some embodiments, the UI portion includes an enhanced launcher that recognizes permanent areas and gives user control of all other areas when they download the enhanced launcher.

In some embodiments, a user or network entity can drag icons from launcher to standard UI display (or screen). In some embodiments, the icons could be converted (or reverted) between real icons or special launcher icons. In some embodiments, the icons could be converted (or reverted) between real icons or special launcher icons when the icons are dragged between the launcher and the standard UI display.

In some embodiments, a network system performs a method comprising: obtaining information to assist in identifying a plurality of portions of a user interface of a wireless device, the wireless device communicatively coupled to the network system over a wireless access network; obtaining an object placement policy, the object placement policy comprising a first set of one or more rules for identifying a particular portion of the plurality of portions of the user interface of the wireless device in which to place one or more objects; determining a differentiating attribute for the particular portion of the user interface; obtaining the one or more objects; based on the object placement policy, determining configuration information, the configuration information at least configured to assist the wireless device in placing the one or more objects in the particular portion of the user interface; and sending the configuration information to the wireless device over the wireless access network. In some embodiments, obtaining the object placement policy comprises obtaining the first set of one or more rules from a service design center. In some embodiments, obtaining the object placement policy comprises obtaining the first set of one or more rules from memory. In some embodiments, obtaining the object placement policy comprises obtaining the first set of one or more rules from an entity associated with at least one of the one or more objects.

In some embodiments, at least one of the one or more objects is a service launch object. In some embodiments, at least one of the one or more objects is an advertisement.

In some embodiments, the first set of one or more rules is configured to establish an ordering within the plurality of portions. In some embodiments, the plurality of portions includes a first portion and a second portion, and the first set of one or more rules is configured to establish the first portion as a higher priority portion than the second portion.

In some embodiments, at least one of the one or more objects is associated with one or more of a particular application program, a particular service, a particular content item, and a particular advertisement. In some embodiments, at least one of the one or more service launch objects is an icon. In some embodiments, at least one of the one or more service launch objects is a banner advertisement. In some embodiments, at least one of the one or more service launch objects is a particular icon for launching a particular application program. In some embodiments, at least one of the one or more service launch objects is a particular icon for launching a particular service. In some embodiments, at least one of the one or more service launch objects is a particular icon for launching a particular content item. In some embodiments, at least one of the one or more service launch objects comprises an advertisement. In some embodiments, at least one of the one or more service launch objects is configured to launch a purchase offer.

In some embodiments, obtaining information to assist in identifying the plurality of portions of the user interface of the wireless device comprises obtaining the information from an entity. In some embodiments, the entity is an operator of the wireless access network. In some embodiments, obtaining information to assist in identifying the plurality of portions of the user interface of the wireless device comprises obtaining the information from memory. In some embodiments, obtaining information to assist in identifying the plurality of portions of the user interface of the wireless device comprises obtaining the information from the wireless device. In some embodiments, obtaining information to assist in identifying the plurality of portions of the user interface of the wireless device comprises obtaining the information from an entity associated with at least one of the one or more objects. In some embodiments, obtaining information to assist in identifying the plurality of portions of the user interface of the wireless device comprises obtaining the information from a pre-determined configuration.

In some embodiments, the configuration information comprises a software build. In some embodiments, the software build comprises an update to a user interface software build.

In some embodiments, at least one of the one or more objects is a particular icon configured to launch a particular software application, and the configuration information is further configured to assist the wireless device in associating the particular icon with the particular software application.

In some embodiments, the plurality of portions of the user interface includes a partition of a screen of the wireless device. In some embodiments, the plurality of portions of the user interface includes a particular screen of a multi-screen user interface display. In some embodiments, the plurality of portions of the user interface comprises a plurality of partitions of a multi-screen user interface display. In some embodiments, the plurality of portions of the user interface comprises a plurality of partitions. In some embodiments, the plurality of partitions is classified based on ease of discovery to a user of the wireless device. In some embodiments, classifying comprises one or more of prioritizing, ranking, ordering, sorting, and establishing tiers.

In some embodiments, at least one of the one or more objects is associated with an entity comprising one or more of a user interface location manager, an original equipment manufacturer, a carrier, an access carrier, a service provider, and an object provider.

In some embodiments, determining the differentiating attribute or characteristic of the portion of the user interface comprises determining a characteristic to assist a user in identifying the particular portion of the user interface. In some embodiments, the differentiating attribute comprises one or more of a border, a window, a color, a wallpaper, a background, a texture, a transparency, and a brightness.

In some embodiments, the network system obtains information about a network state and obtains the one or more objects for placement in the particular portion of the user interface by obtaining the one or more objects based on the information about the network state. In some embodiments, the network state is one or more of a network type, a network cost, a network service plan, a network latency, and a network quality-of-service level. In some embodiments, the network type is one or more of WiFi, cellular, home, and roaming.

In some embodiments, the network system obtains information about a device state and obtains the one or more objects for placement in the particular portion of the user interface by obtaining the one or more objects based on the information about the device state. In some embodiments, the device state comprises one or more of a current usage measure, a past usage measure, a current device location, a past device location, a current user interaction state, a past user interaction state, a current device cognitive state, and a past device cognitive state.

In some embodiments, the network system obtains information about a user and obtains the one or more objects for placement in the particular portion of the user interface comprises obtaining the one or more objects based on the information about the user. In some embodiments, the information about the user comprises one or more of a user profile, a user preference, a current behavior, or a past behavior.

In some embodiments, the configuration information assists the wireless device in preventing a user from modifying the particular portion of the user interface or a contents of the particular portion of the user interface.

In some embodiments, at least one of the one or more objects is associated with a particular service or a particular application, and wherein the configuration information is further configured to assist the wireless device in one or more of: enabling or launching the particular service or the particular application when a user selects the object, and providing additional management functions to the particular service or the particular application when the user selects the object. In some embodiments, the additional management functions include one or more of providing service usage information, allowing object modification, and providing object notification messages. In some embodiments, allowing object modification comprises allowing modifications to one or more of object placement, object positioning, and object classification.

In some embodiments, the network system classifies the one or more objects, and the configuration information is based on the classification of the one or more objects.

In some embodiments, the network system provides a view of the user interface of the wireless device to a network system manager.

In some embodiments, identifying the particular portion of the user interface of the wireless device comprises obtaining identifying information from a service design center. In some embodiments, determining the differentiating attribute of the identified portion of the user interface comprises obtaining attribute information from a service design center.

In some embodiments, the network system obtains the one or more objects for placement in the particular portion of the user interface by selecting the one or more objects based on a second set of one or more rules.

In some embodiments, at least one of the one or more objects is associated with a particular entity of a plurality of entities, and further comprising: obtaining bids from one or more of the plurality of entities, including the particular entity; and identifying the particular entity as a winning bidder.

INCORPORATION BY REFERENCE

This document incorporates by reference for all purposes the following non-provisional U.S. patent applications: application Ser. No. 12/380,778, filed Mar. 2, 2009, entitled VERIFIABLE DEVICE ASSISTED SERVICE USAGE BILLING WITH INTEGRATED ACCOUNTING, MEDIATION ACCOUNTING, AND MULTI-ACCOUNT, now U.S. Pat. No. 8,321,526 (issued Nov. 27, 2012); application Ser. No. 12/380,780, filed Mar. 2, 2009, entitled AUTOMATED DEVICE PROVISIONING AND ACTIVATION, now U.S. Pat. No. 8,839,388 (issued Sep. 16, 2014); application Ser. No. 12/695,019, filed Jan. 27, 2010, entitled DEVICE ASSISTED CDR CREATION, AGGREGATION, MEDIATION AND BILLING, now U.S. Pat. No. 8,275,830 (issued Sep. 25, 2012); application Ser. No. 12/695,020, filed Jan. 27, 2010, entitled ADAPTIVE AMBIENT SERVICES, now U.S. Pat. No. 8,406,748 (issued Mar. 26, 2013); application Ser. No. 12/694,445, filed Jan. 27, 2010, entitled SECURITY TECHNIQUES FOR DEVICE ASSISTED SERVICES, now U.S. Pat. No. 8,391,834 (issued Mar. 5, 2013); application Ser. No. 12/694,451, filed Jan. 27, 2010, entitled DEVICE GROUP PARTITIONS AND SETTLEMENT PLATFORM, now U.S. Pat. No. 8,548,428 (issued Oct. 1, 2013); application Ser. No. 12/694,455, filed Jan. 27, 2010, entitled DEVICE ASSISTED SERVICES INSTALL, now U.S. Pat. No. 8,402,111 (issued Mar. 19, 2013); application Ser. No. 12/695,021, filed Jan. 27, 2010, entitled QUALITY OF SERVICE FOR DEVICE ASSISTED SERVICES, now U.S. Pat. No. 8,346,225 (issued Jan. 1, 2013); application Ser. No. 12/695,980, filed Jan. 28, 2010, entitled ENHANCED ROAMING SERVICES AND CONVERGED CARRIER NETWORKS WITH DEVICE ASSISTED SERVICES AND A PROXY, now U.S. Pat. No. 8,340,634 (issued Dec. 25, 2012); application Ser. No. 13/134,005, filed May 25, 2011, entitled SYSTEM AND METHOD FOR WIRELESS NETWORK OFFLOADING, now U.S. Pat. No. 8,635,335 (issued Jan. 21, 2014); application Ser. No. 13/134,028, filed May 25, 2011, entitled DEVICE-ASSISTED SERVICES FOR PROTECTING NETWORK CAPACITY, now U.S. Pat. No. 8,589,541 (issued Nov. 19, 2013); application Ser. No. 13/229,580, filed Sep. 9, 2011, entitled WIRELESS NETWORK SERVICE INTERFACES, now U.S. Pat. No. 8,626,115 (issued Jan. 7, 2014); application Ser. No. 13/237,827, filed Sep. 20, 2011, entitled ADAPTING NETWORK POLICIES BASED ON DEVICE SERVICE PROCESSOR CONFIGURATION, now U.S. Pat. No. 8,832,777 (issued Sep. 9, 2014); application Ser. No. 13/239,321, filed Sep. 21, 2011, entitled SERVICE OFFER SET PUBLISHING TO DEVICE AGENT WITH ON-DEVICE SERVICE SELECTION, now U.S. Pat. No. 8,898,293; application Ser. No. 13/248,028, filed Sep. 28, 2011, entitled ENTERPRISE ACCESS CONTROL AND ACCOUNTING ALLOCATION FOR ACCESS NETWORKS, now U.S. Pat. No. 8,924,469; application Ser. No. 13/247,998, filed Sep. 28, 2011, entitled COMMUNICATIONS DEVICE WITH SECURE DATA PATH PROCESSING AGENTS, now U.S. Pat. No. 8,725,123 (issued May 13, 2014); application Ser. No. 13/248,025, filed Sep. 28, 2011, entitled SERVICE DESIGN CENTER FOR DEVICE ASSISTED SERVICES, now U.S. Pat. No. 8,924,543; application Ser. No. 13/253,013, filed Oct. 4, 2011, entitled SYSTEM AND METHOD FOR PROVIDING USER NOTIFICATIONS, now U.S. Pat. No. 8,745,191 (issued Jun. 3, 2014); application Ser. No. 13/309,556, filed Dec. 1, 2011, entitled END USER DEVICE THAT SECURES AN ASSOCIATION OF APPLICATION TO SERVICE POLICY WITH AN APPLICATION CERTIFICATE CHECK, now U.S. Pat. No. 8,893,009; application Ser. No. 13/309,463, filed Dec. 1, 2011, entitled SECURITY, FRAUD DETECTION, AND FRAUD MITIGATION IN DEVICE-ASSISTED SERVICES SYSTEMS, now U.S. Pat. No. 8,793,758 (issued Jul. 29, 2014); and application Ser. No. 13/441,821, filed Apr. 6, 2012, entitled MANAGING SERVICE USER DISCOVERY AND SERVICE LAUNCH OBJECT PLACEMENT ON A DEVICE.

This document incorporates by reference for all purposes the following provisional patent applications: Provisional Application No. 61/206,354, filed Jan. 28, 2009, entitled SERVICES POLICY COMMUNICATION SYSTEM AND METHOD; Provisional Application No. 61/206,944, filed Feb. 4, 2009, entitled SERVICES POLICY COMMUNICATION SYSTEM AND METHOD; Provisional Application No. 61/207,393, filed Feb. 10, 2009, entitled SERVICES POLICY COMMUNICATION SYSTEM AND METHOD; and Provisional Application No. 61/207,739, entitled SERVICES POLICY COMMUNICATION SYSTEM AND METHOD, filed Feb. 13, 2009; Provisional Application No. 61/270,353, filed on Jul. 6, 2009, entitled DEVICE ASSISTED CDR CREATION, AGGREGATION, MEDIATION AND BILLING; Provisional Application No. 61/275,208 filed Aug. 25, 2009, entitled ADAPTIVE AMBIENT SERVICES; and Provisional Application No. 61/237,753, filed Aug. 28, 2009, entitled ADAPTIVE AMBIENT SERVICES; Provisional Application No. 61/252,151, filed Oct. 15, 2009, entitled SECURITY TECHNIQUES FOR DEVICE ASSISTED SERVICES; Provisional Application No. 61/252,153, filed Oct. 15, 2009, entitled DEVICE GROUP PARTITIONS AND SETTLEMENT PLATFORM; Provisional Application No. 61/264,120, filed Nov. 24, 2009, entitled DEVICE ASSISTED SERVICES INSTALL; Provisional Application No. 61/264,126, filed Nov. 24, 2009, entitled DEVICE ASSISTED SERVICES ACTIVITY MAP; Provisional Application No. 61/348,022, filed May 25, 2010, entitled DEVICE ASSISTED SERVICES FOR PROTECTING NETWORK CAPACITY; Provisional Application No. 61/381,159, filed Sep. 9, 2010, entitled DEVICE ASSISTED SERVICES FOR PROTECTING NETWORK CAPACITY; Provisional Application No. 61/381,162, filed Sep. 9, 2010, entitled SERVICE CONTROLLER INTERFACES AND WORKFLOWS; Provisional Application No. 61/384,456, filed Sep. 20, 2010, entitled SECURING SERVICE PROCESSOR WITH SPONSORED SIMS; Provisional Application No. 61/389,547, filed Oct. 4, 2010, entitled USER NOTIFICATIONS FOR DEVICE ASSISTED SERVICES; Provisional Application No. 61/385,020, filed Sep. 21, 2010, entitled SERVICE USAGE RECONCILIATION SYSTEM OVERVIEW; Provisional Application No. 61/387,243, filed Sep. 28, 2010, entitled ENTERPRISE AND CONSUMER BILLING ALLOCATION FOR WIRELESS COMMUNICATION DEVICE SERVICE USAGE ACTIVITIES; Provisional Application No. 61/387,247, filed September 28, entitled SECURED DEVICE DATA RECORDS, 2010; Provisional Application No. 61/407,358, filed Oct. 27, 2010, entitled SERVICE CONTROLLER AND SERVICE PROCESSOR ARCHITECTURE; Provisional Application No. 61/418,507, filed Dec. 1, 2010, entitled APPLICATION SERVICE PROVIDER INTERFACE SYSTEM; Provisional Application No. 61/418,509 filed Dec. 1, 2010, entitled SERVICE USAGE REPORTING RECONCILIATION AND FRAUD DETECTION FOR DEVICE ASSISTED SERVICES; Provisional Application No. 61/420,727, filed Dec. 7, 2010, entitled SECURE DEVICE DATA RECORDS; Provisional Application No. 61/422,565, filed Dec. 13, 2010, entitled SERVICE DESIGN CENTER FOR DEVICE ASSISTED SERVICES; Provisional Application No. 61/422,572, filed Dec. 13, 2010, entitled SYSTEM INTERFACES AND WORKFLOWS FOR DEVICE ASSISTED SERVICES; Provisional Application No. 61/422,574, filed Dec. 13, 2010, entitled SECURITY AND FRAUD DETECTION FOR DEVICE ASSISTED SERVICES; Provisional Application No. 61/435,564, filed Jan. 24, 2011, entitled FRAMEWORK FOR DEVICE ASSISTED SERVICES; Provisional Application No. 61/472,606, filed Apr. 6, 2011, entitled MANAGING SERVICE USER DISCOVERY AND SERVICE LAUNCH OBJECT PLACEMENT ON A DEVICE; Provisional Application No. 61/550,906, filed Oct. 24, 2011, entitled SECURITY FOR DEVICE-ASSISTED SERVICES; Provisional Application No. 61/589,830, filed Jan. 23, 2012, entitled METHODS AND APPARATUS TO PRESENT INFORMATION ABOUT VOICE, MESSAGING, AND DATA SERVICES ON WIRELESS MOBILE DEVICES; Provisional Application No. 61/610,876, filed Mar. 14, 2012, entitled METHODS AND APPARATUS FOR APPLICATION PROMOTION AND SPONSORSHIP; and Provisional Application No. 61/610,910, filed Mar. 14, 2012, entitled WIFI ACTIVATION BACKUP PROCESS.

We claim:

1. A method performed by a network system communicatively coupled to a wireless user device over a wireless access network, the method comprising:
   obtaining, by the network system, information to assist in identifying a portion of a user interface of the wireless user device;
   determining, by the network system, one or more attributes of the identified portion of the user interface of the wireless user device;
   obtaining, by the network system, based on the determined one or more attributes of the identified portion of the user interface, one or more service launch objects for placement in the identified portion of the user interface of the wireless user device; and
   sending, by the network system to the wireless user device over the wireless access network, configuration information to assist the wireless user device in placing the one or more service launch objects in the identified portion of the user interface of the wireless user device.

2. The method of claim 1, wherein the determined one or more attributes of the identified portion of the user interface include one or more of a color, a wallpaper, a transparency, a wall, a window, a texture, or a border of the identified portion of the user interface.

3. The method of claim 1, wherein the identified portion of the user interface provides a plurality of service launch partitions, and wherein the one or more service launch objects placed in one of the plurality of service launch partitions indicate to a user of the wireless user device that the one or more service launch objects are members of a type of service.

4. The method of claim 1, wherein the identified portion of the user interface provides a plurality of service launch partitions, and wherein one of the plurality of service launch partitions displays user options for the one or more service launch objects for default sponsored network services, default websites, default applications or default content.

5. The method of claim 1, wherein the identified portion of the user interface provides a plurality of service launch partitions, and wherein one of the plurality of service launch partitions displays user options for the one or more service launch objects for user selected sponsored services.

6. The method of claim 1, wherein the identified portion of the user interface provides a plurality of service launch partitions, and wherein one of the plurality of service launch partitions includes displaying user options for the one or more service launch objects for paid services signed up for by a user of the wireless user device.

7. The method of claim 1, wherein the one or more service launch objects include one or more network destinations.

8. A network system configured to communicate with a wireless user device over a wireless access network, the network system comprising:

a processor configured to:
- obtain information to assist in identifying a portion of a user interface of the wireless user device;
- determine one or more attributes of the identified portion of the user interface of the wireless user device;
- obtain, based on the determined one or more attributes of the identified portion of the user interface, one or more service launch objects for placement in the identified portion of the user interface of the wireless user device; and
- send, to the wireless user device over the wireless access network, configuration information to assist the wireless user device in placing the one or more service launch objects in the identified portion of the user interface of the wireless user device.

9. The network system of claim 8, wherein the determined one or more attributes of the identified portion of the user interface include one or more of a color, a wallpaper, a transparency, a wall, a window, a texture, or a border of the identified portion of the user interface.

10. The network system of claim 8, wherein the identified portion of the user interface provides a plurality of service launch partitions, and wherein the one or more service launch objects placed in one of the plurality of service launch partitions indicate to a user of the wireless user device that the one or more service launch objects are members of a type of service.

11. The network system of claim 8, wherein the identified portion of the user interface provides a plurality of service launch partitions, and wherein one of the plurality of service launch partitions displays user options for the one or more service launch objects for default sponsored network services default websites, default applications or default content.

12. The network system of claim 8, wherein the identified portion of the user interface provides a plurality of service launch partitions, and wherein one of the plurality of service launch partitions displays user options for the one or more service launch objects for user selected sponsored services.

13. The network system of claim 8, wherein the identified portion of the user interface provides a plurality of service launch partitions, and wherein one of the plurality of service launch partitions includes displaying user options for the one or more service launch objects for paid services signed up for by a user of the wireless user device.

14. The network system of claim 8, wherein the one or more service launch objects include one or more network destinations.

15. A method for use in a system including a network system communicatively coupled to a wireless user device over a wireless access network, the method comprising:
- obtaining, by the network system, information to assist in identifying a portion of a user interface of the wireless user device;
- determining, by the network system, one or more attributes of the identified portion of the user interface of the wireless user device;
- obtaining, by the network system, based on the determined one or more attributes of the identified portion of the user interface, one or more service launch objects for placement in the identified portion of the user interface of the wireless user device;
- sending, by the network system to the wireless user device over the wireless access network, configuration information to assist the wireless user device in placing the one or more service launch objects in the identified portion of the user interface of the wireless user device;
- receiving, by the wireless user device from the network system over the wireless access network, the configuration information;
- placing, by the wireless user device, using the configuration information, the one or more service launch objects in the identified portion of the user interface of the wireless user device; and
- displaying, by the wireless user device, on a display of the wireless user device, the user interface including the identified portion of the user interface having the one or more service launch objects.

16. The method of claim 15, wherein the determined one or more attributes of the identified portion of the user interface include one or more of a color, a wallpaper, a transparency, a wall, a window, a texture, or a border of the identified portion of the user interface.

17. The method of claim 15, wherein the identified portion of the user interface provides a plurality of service launch partitions, and wherein the one or more service launch objects placed in one of the plurality of service launch partitions indicate to a user of the wireless user device that the one or more service launch objects are members of a type of service.

18. The method of claim 15, wherein the identified portion of the user interface provides a plurality of service launch partitions, and wherein one of the plurality of service launch partitions displays user options for the one or more service launch objects for default sponsored network services, default websites, default applications or default content.

19. The method of claim 15, wherein the identified portion of the user interface provides a plurality of service launch partitions, and wherein one of the plurality of service launch partitions displays user options for the one or more service launch objects for user selected sponsored services.

20. The method of claim 15, wherein the identified portion of the user interface provides a plurality of service launch partitions, and wherein one of the plurality of service launch partitions includes displaying user options for the one or more service launch objects for paid services signed up for by a user of the wireless user device.

* * * * *